(12) United States Patent
Beauchamp et al.

(10) Patent No.: US 10,416,300 B2
(45) Date of Patent: Sep. 17, 2019

(54) SUPPRESSING CYCLICALLY TIME-VARYING RADAR SIGNATURES

(71) Applicant: COLORADO STATE UNIVERSITY RESEARCH FOUNDATION, Fort Collins, CO (US)

(72) Inventors: Robert M. Beauchamp, Pasadena, CA (US); Chandrasekaran Venkatachalam, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 16/085,517

(22) PCT Filed: Sep. 1, 2017

(86) PCT No.: PCT/US2017/049934
§ 371 (c)(1),
(2) Date: Sep. 14, 2018

(87) PCT Pub. No.: WO2018/093445
PCT Pub. Date: May 24, 2018

(65) Prior Publication Data
US 2019/0094351 A1    Mar. 28, 2019

Related U.S. Application Data

(60) Provisional application No. 62/382,353, filed on Sep. 1, 2016.

(51) Int. Cl.
*G01S 13/58* (2006.01)
*G01S 13/524* (2006.01)
(Continued)

(52) U.S. Cl.
CPC ........ *G01S 13/5244* (2013.01); *F03D 7/0224* (2013.01); *G01S 7/2923* (2013.01);
(Continued)

(58) Field of Classification Search
CPC .. G01S 13/5244; G01S 13/538; G01S 13/582; G01S 13/88; G01S 7/2923;
(Continued)

(56) References Cited

U.S. PATENT DOCUMENTS

| 6,529,157 B1 | 3/2003 | Mensa et al. |
| 8,949,097 B2 | 2/2015 | Craig et al. |

(Continued)

FOREIGN PATENT DOCUMENTS

WO    WO1994/24582    10/1994

OTHER PUBLICATIONS

International Search Report and Written Opinion of PCT/US2017/049934, dated May 1, 2018, (9 pgs).

*Primary Examiner* — Timothy A Brainard
(74) *Attorney, Agent, or Firm* — Maschoff Brennan; Paul G. Johnson

(57) ABSTRACT

A method begins by one or more processing modules of one or more computing devices of a radar system determining whether a radar signature varies cyclically with time, and when the radar signature varies cyclically with time the method continues with the one or more processing modules collecting state telemetry information for the radar signature, along with a signal representation for the radar system. The state telemetry information includes rotation angle, yaw angle and rotation rate for the object responsible for the observed radar signature and the signal representation for the radar system includes data sufficient to determine an I/Q signal for the radar system. The method then determines a characterized radar signature for the object responsible for the radar signature and based on the state telemetry and the signal representation, substantially removes the radar signature from radar data.

32 Claims, 54 Drawing Sheets

(51) Int. Cl.
  *G01S 7/292* (2006.01)
  *G01S 7/41* (2006.01)
  *G01S 13/88* (2006.01)
  *F03D 7/02* (2006.01)
  *G01S 13/538* (2006.01)

(52) U.S. Cl.
  CPC .............. *G01S 7/414* (2013.01); *G01S 7/415* (2013.01); *G01S 13/582* (2013.01); *G01S 13/88* (2013.01); *F05B 2260/99* (2013.01); *F05B 2270/805* (2013.01); *G01S 13/538* (2013.01); *Y02B 10/30* (2013.01)

(58) Field of Classification Search
  CPC ........ G01S 7/414; G01S 7/415; F03D 7/0224; F05B 2260/99; F05B 2270/805; Y02B 10/30
  USPC ......................................................... 342/159
  See application file for complete search history.

(56) References Cited

U.S. PATENT DOCUMENTS

| | | |
|---|---|---|
| 9,404,371 B1 | 8/2016 | McDonald et al. |
| 9,441,610 B1 * | 9/2016 | Bachmann ............ F03D 7/0268 |
| 2009/0202347 A1 | 8/2009 | Rugger |
| 2012/0195756 A1 | 8/2012 | Arlt et al. |

* cited by examiner

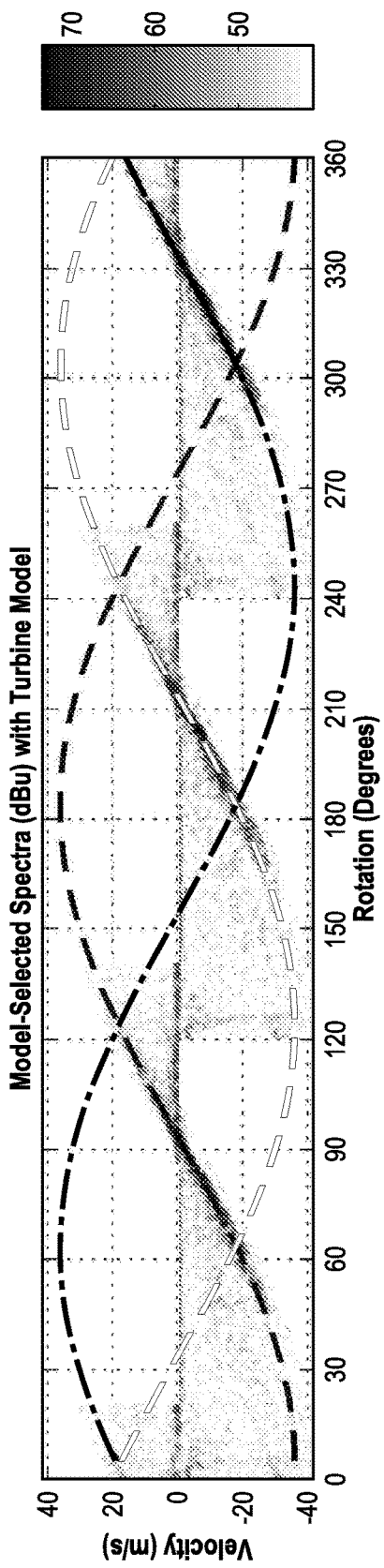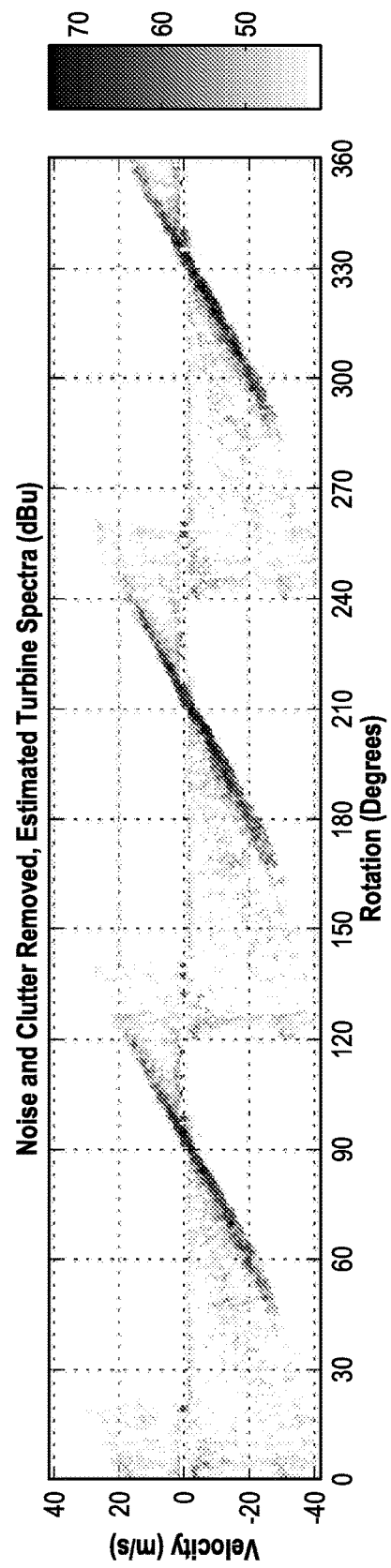
FIG. 18C
FIG. 18D

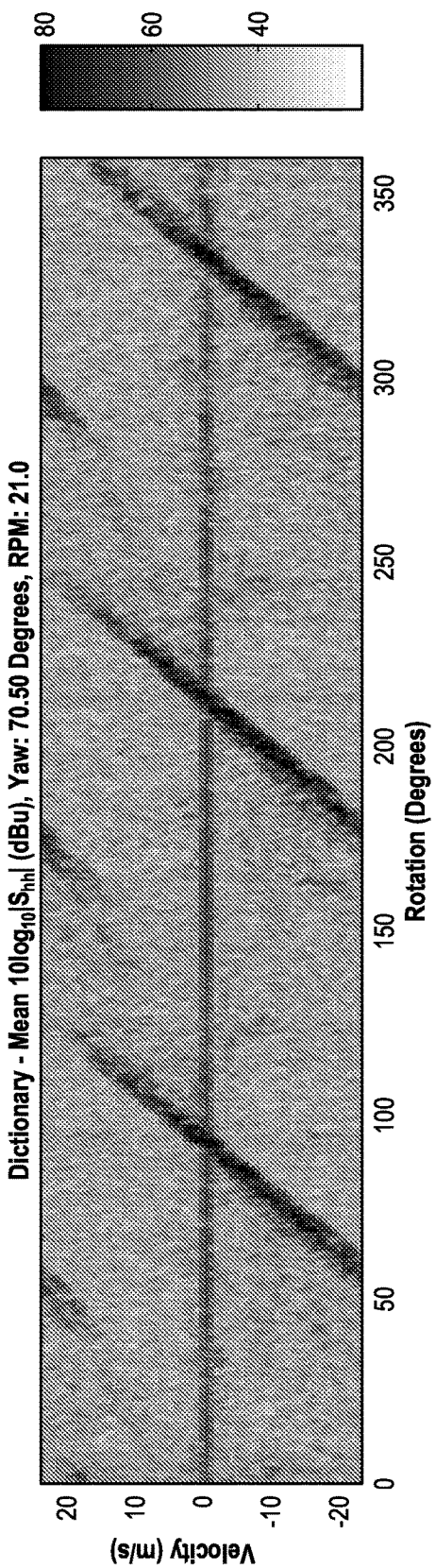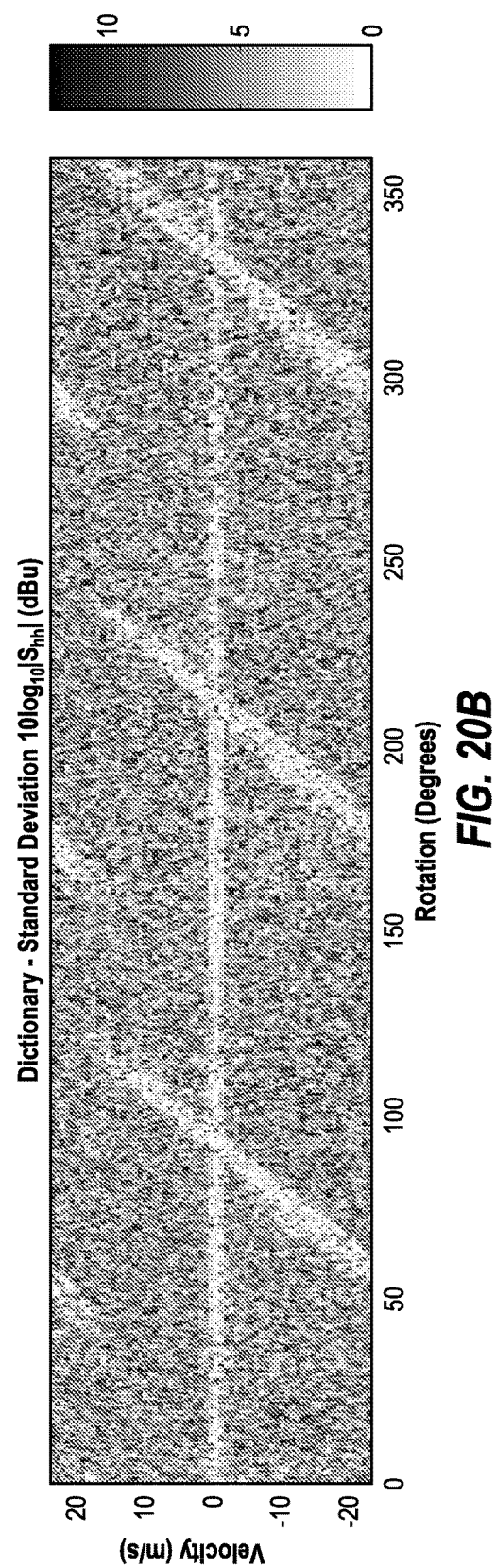

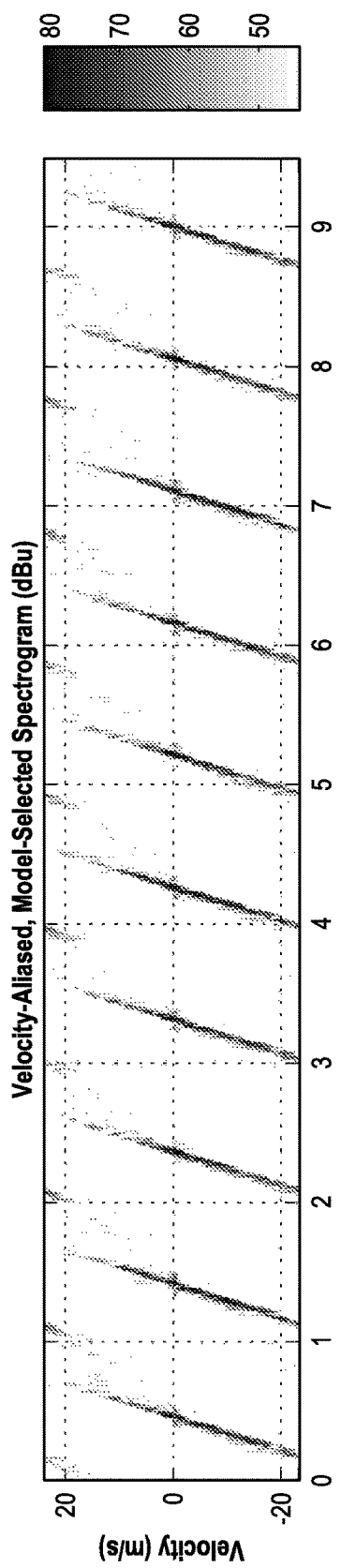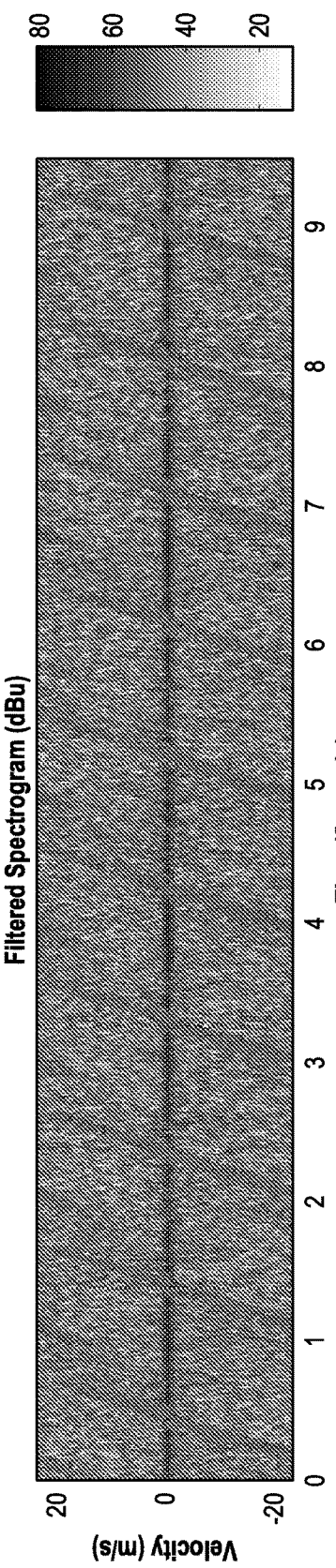
FIG. 25C
FIG. 25D

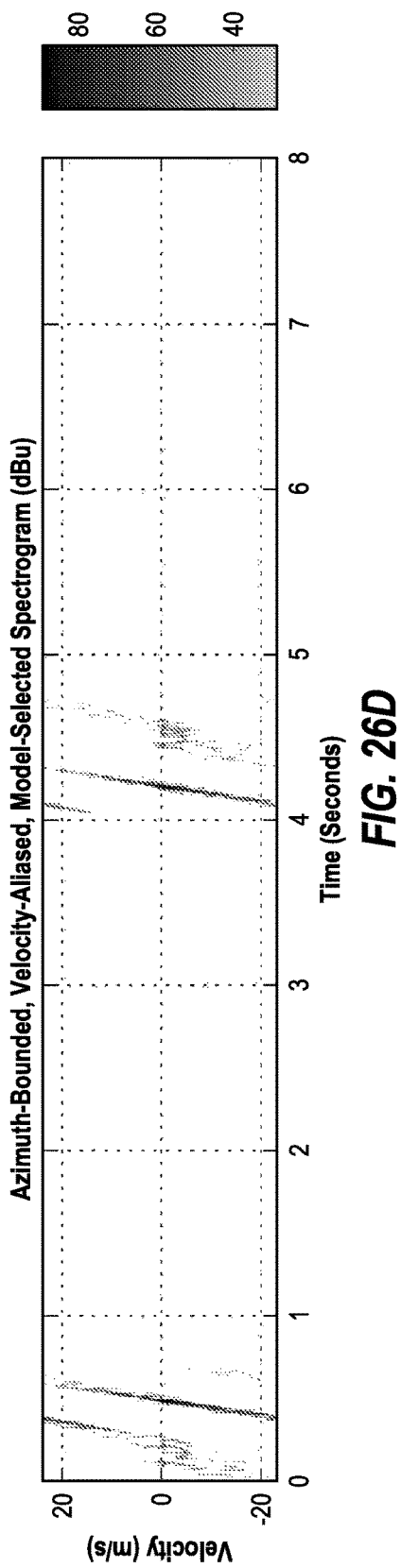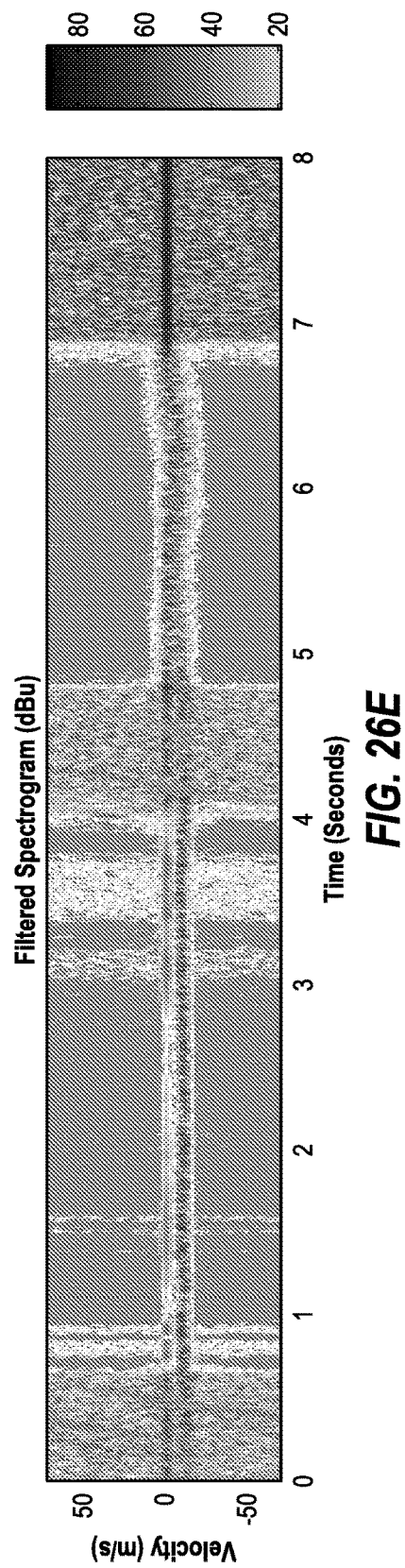

SUPPRESSING CYCLICALLY TIME-VARYING RADAR SIGNATURES

CROSS-REFERENCE TO RELATED APPLICATION

This PCT Patent Application claims priority pursuant to 35 U.S.C. § 119(e) to U.S. Provisional Application No. 62/382,353, entitled "SYSTEM AND METHOD FOR MITIGATING WIND TURBINE RADAR SIGNATURE", filed Sep. 1, 2016, which is hereby incorporated herein by reference in its entirety and made part of the present PCT Patent Application for all purposes.

FIELD

Some embodiments relate to suppression of radar signatures having statistical properties that vary cyclically with time.

BACKGROUND

Unless otherwise indicated herein, the materials described herein are not prior art to the claims in the present application and are not admitted to be prior art by inclusion in this section.

Wind turbines are dynamic radar scatterers which are considered undesirable "clutter" to operational radar systems. The radar clutter caused by operating wind turbines within a radar's line of sight can restrict the construction and deployment options of wind turbines and/or reduce an affected radar systems operational effectiveness. The rotation and the diversity of a wind turbine's possible operating states results in a radar signature having statistical properties that vary cyclically with time. The rotation can manifest as a non-zero Doppler signature to a radar system, such that when observed for a typical radar integration period (e.g., tens of milliseconds) the turbine's signature has characteristics similar to weather and aircraft.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to the suppression of radar signatures exhibiting deterministic properties, such as, for example, those having statistical properties that vary cyclically with time. Knowledge of the state telemetry for an object responsible for a radar signature exhibiting these properties can be used to suppress the object's radar signature. For some of the example embodiments the object responsible for a subject radar signature is a wind turbine, however it is understood that the teachings herein can be applied to the suppression of radar signatures for any deterministic process, including, but not limited to radars for weather applications, air surveillance and synthetic aperture radars. In some radar observations multiple radar signatures exhibit deterministic processes that can be combined and removed from radar data.

In an example embodiment, a method for suppressing an observed radar signature is aided by state telemetry information provided by the object responsible for the observed radar signature. The controller for the object, in this case a wind turbine, provides the state telemetry, such as rotation angle, radar-relative yaw angle, rotation rate and, when available, the blade angle for the radar system. The radar system is then able to determine an expected radar signature for the object that can be used to remove the radar signature from relevant radar data.

In another example embodiment, expected radar signatures for an object are determined using a lookup table comprising a plurality of dictionaries where each dictionary is based on a prior observation of the object in a particular state.

In yet another example embodiment, a model can be used to approximate the expected radar signature of an object in a particular state and used to remove the radar signature from observed radar data.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices. The invention will be described and explained with additional specificity and detail through the use of the accompanying drawing, in which:

FIGS. 18A-18E provides observations of flash signature for a representative wind turbine in accordance with an embodiment;

FIGS. 20A-20D show fixed-pointing observations of a representative wind turbine in a near constant state;

FIGS. 25A-25D provide another representative modeled radar signature in accordance with an embodiment;

FIGS. 26A-26E provide scanning observations of a representative wind turbine coincident with snow;

DETAILED DESCRIPTION OF SOME EXAMPLE EMBODIMENTS

Figure 1:
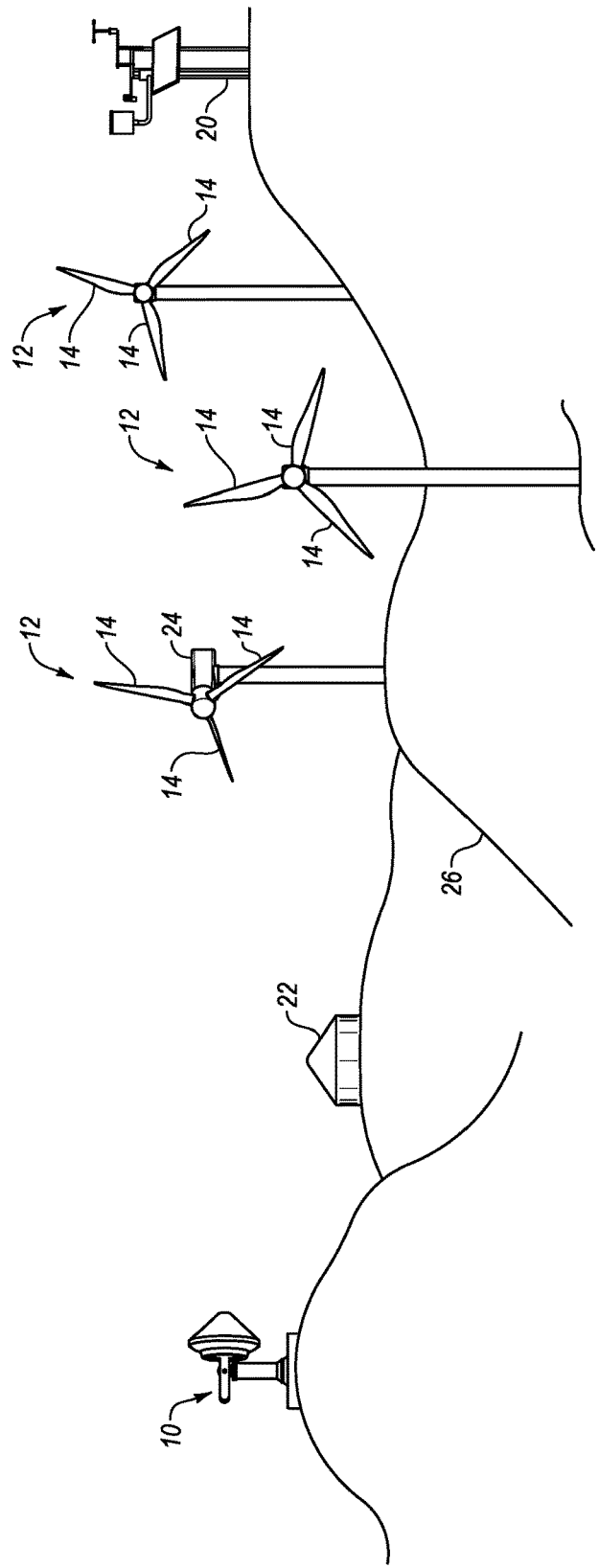
FIG. 1 is a schematic illustration of a radar system operating in the presence of wind turbines.

FIG. 1 is a schematic illustration of a radar system operating in the presence of wind turbines that includes a stationary radar 10 with a number of wind turbines 12 incorporating turbine blades 14 and controller 24. Fixed ground-based objects capable of providing radar signatures, such as building 22, meteorological station 20, and varying terrain 26 are also illustrated, demonstrating a high clutter radar environment. Wind turbines 12 are dynamic radar scatterers that reflect a time varying radar signature as blades 14 rotate in various configurations. As such, wind turbines provide undesirable "clutter" to operational radar systems such as stationary radar 10. In some embodiments, the time-varying radar signature of each of the wind turbines 12 and/or other deterministic processes may be modeled and/or suppressed to reduce clutter in radar data of the radar 10, as described in more detail herein.

Figure 3:
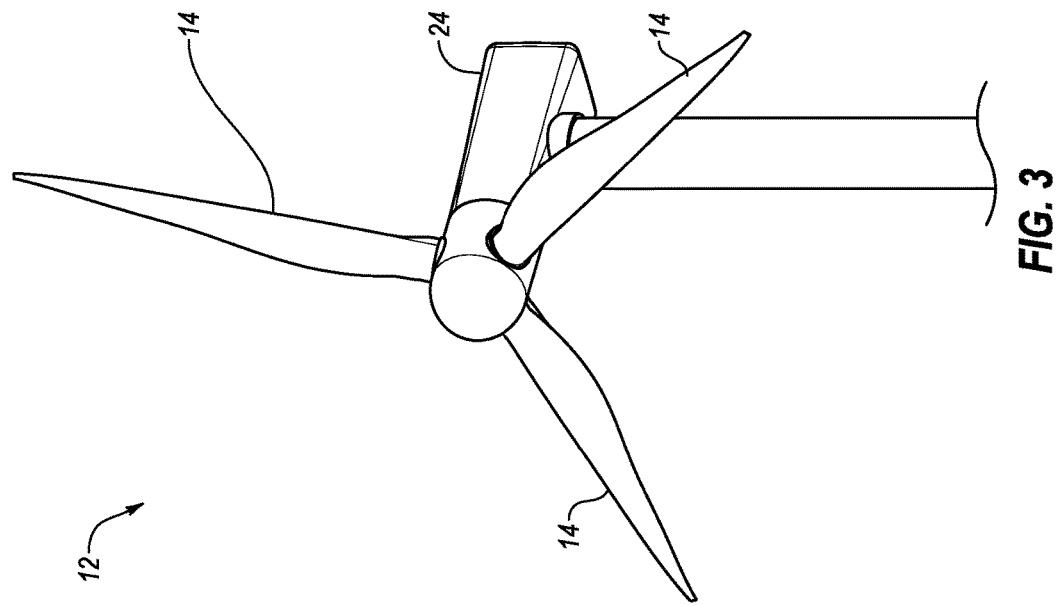
FIGS. 2 and 3 are perspective views of a representative wind turbine with contrasting blade pitch.
Figure 2:
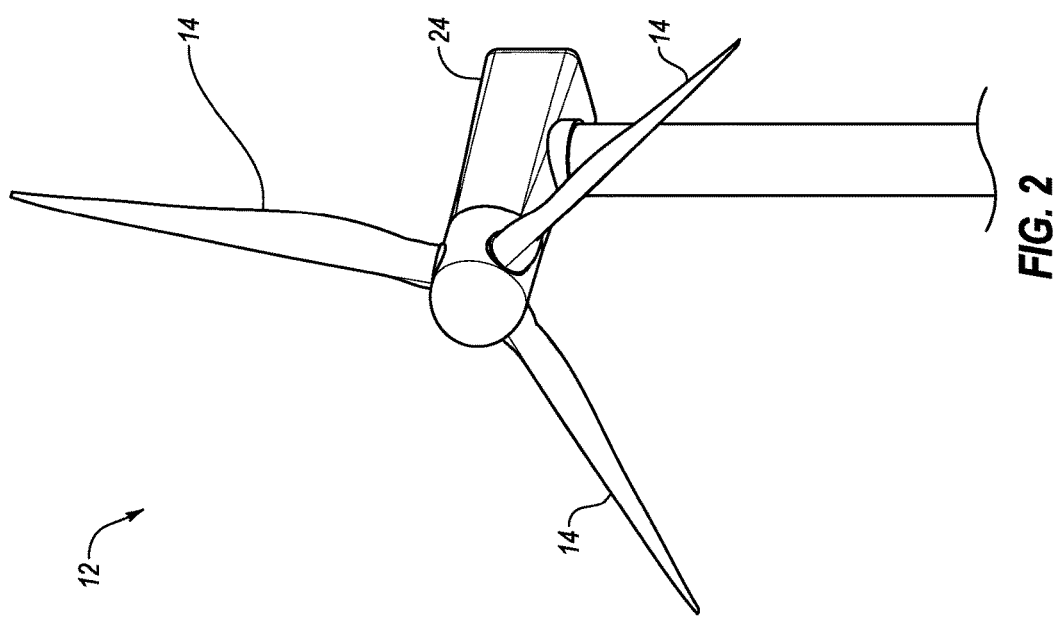

FIGS. 2 and 3 are perspective views of a representative wind turbine 12 that may include or correspond to the wind turbines 12 of FIG. 1. In FIG. 2 the blades 14 of the wind turbine 12 are pitched 90 degrees, meaning a leading edge of each of the blades 14 is pointing into the wind corresponding to a standby state. In FIG. 3 the blades 14 are pitched to increase power output during operation. The geometry of a wind turbine determines its scattering characteristics (i.e., its radar cross-section, or RCS), and therefore, the turbine's RCS is deterministic. Determination of the relationship between an observed turbine's radar signature and the turbine's state telemetry is aided by Doppler velocity measurements, thus the unambiguous Doppler velocity range of the radar may be maximized. The unambiguous Doppler velocity range is calculated as $$v_a = \pm \frac{\lambda}{4T_s}, \quad (1)$$

where $\lambda$ is the radar's wavelength and $T_s$ is the pulse repetition period.

To analyze a wind turbine's signature, spectral methods may be used on a single polarization. From the IQ time series (x), the spectrogram may be calculated as follows:

$$S[t, k] = \frac{1}{N} \left| \sum_{n=0}^{N-1} x[t+n]w[n]e^{-j2\pi kn/N} \right|^2. \quad (2)$$

Figure 4:
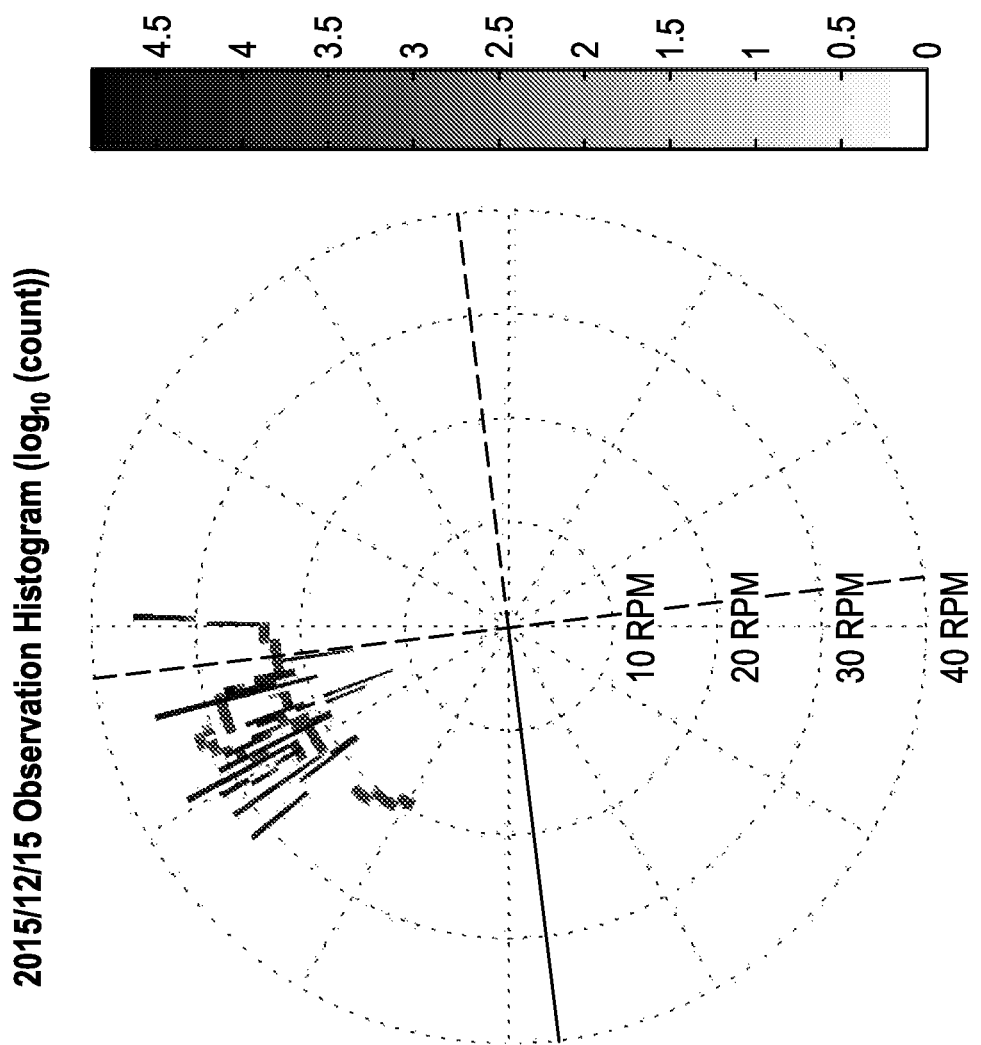
FIG. 4 provides a histogram of radar observations of a representative wind turbine yaw direction and rotation rate over a sample period.

FIG. 4 provides a histogram of radar observations of a representative wind turbine's cardinal yaw direction and rotation rate over a sample period. Observations and/or simulations in this and some other figures may be of a representative wind turbine implemented as a CART3. However, embodiments described herein may be applied to other wind turbines and more generally to other objects that may be represented as deterministic processes.

Figure 5:
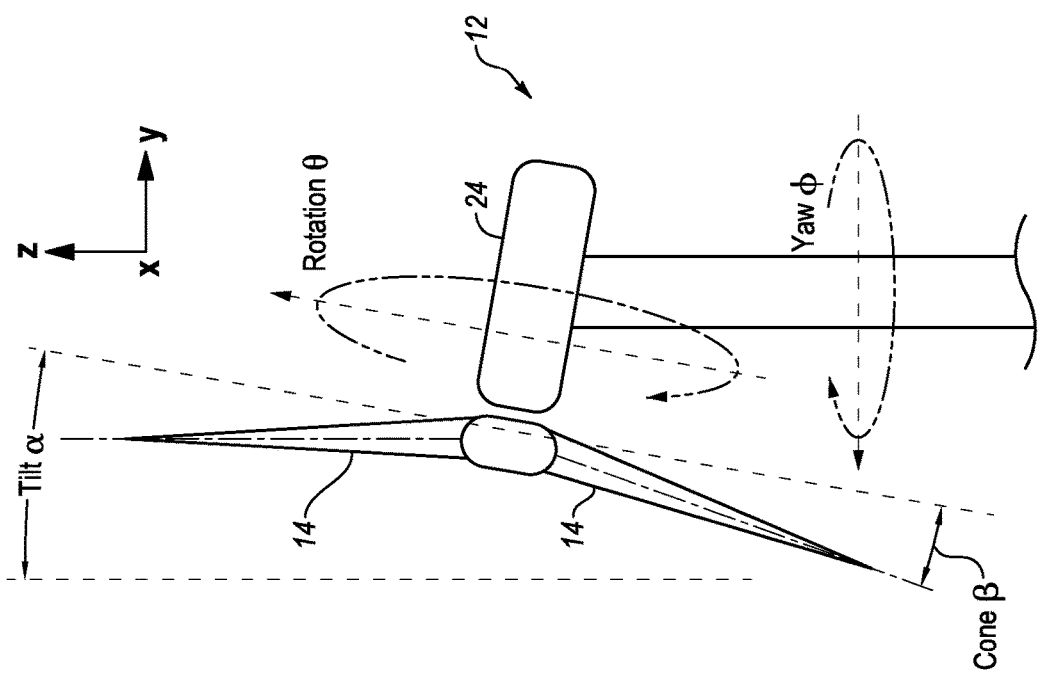
FIG. 5 provides a perspective view of a representative wind turbine.

To effectively compare the telemetry from the representative wind turbine with the observations from radar, the alignment and synchronization of both systems' clocks is verified. Rotation rate estimates and the turbine's reported rotation rate, such as that shown in FIG. 6, can be used for a period where the blades are decelerating. A radar-based rotation rate estimate is derived from the time differences between peak zero-Doppler power observations for each wind turbine blade (i.e., nominally 120 degrees of rotation), following $\Delta\theta/\Delta t$. Similarly, the rotation rate can be estimated using the time periods between zero-crossings of the turbine blades' reported positions. Temporal alignment may also be confirmed by verifying that the selected time-offset between the system clocks yields a minimum variance of all the spectral observations at a fixed state. FIG. 5 provides a perspective view of a representative wind turbine, illustrating typical state variables. Although FIG. 5 illustrates a two blade turbine the relevant variables are applicable directly to the 3 blade turbine of FIGS. 2 and 3, as well as other configurations.

Figure 6:
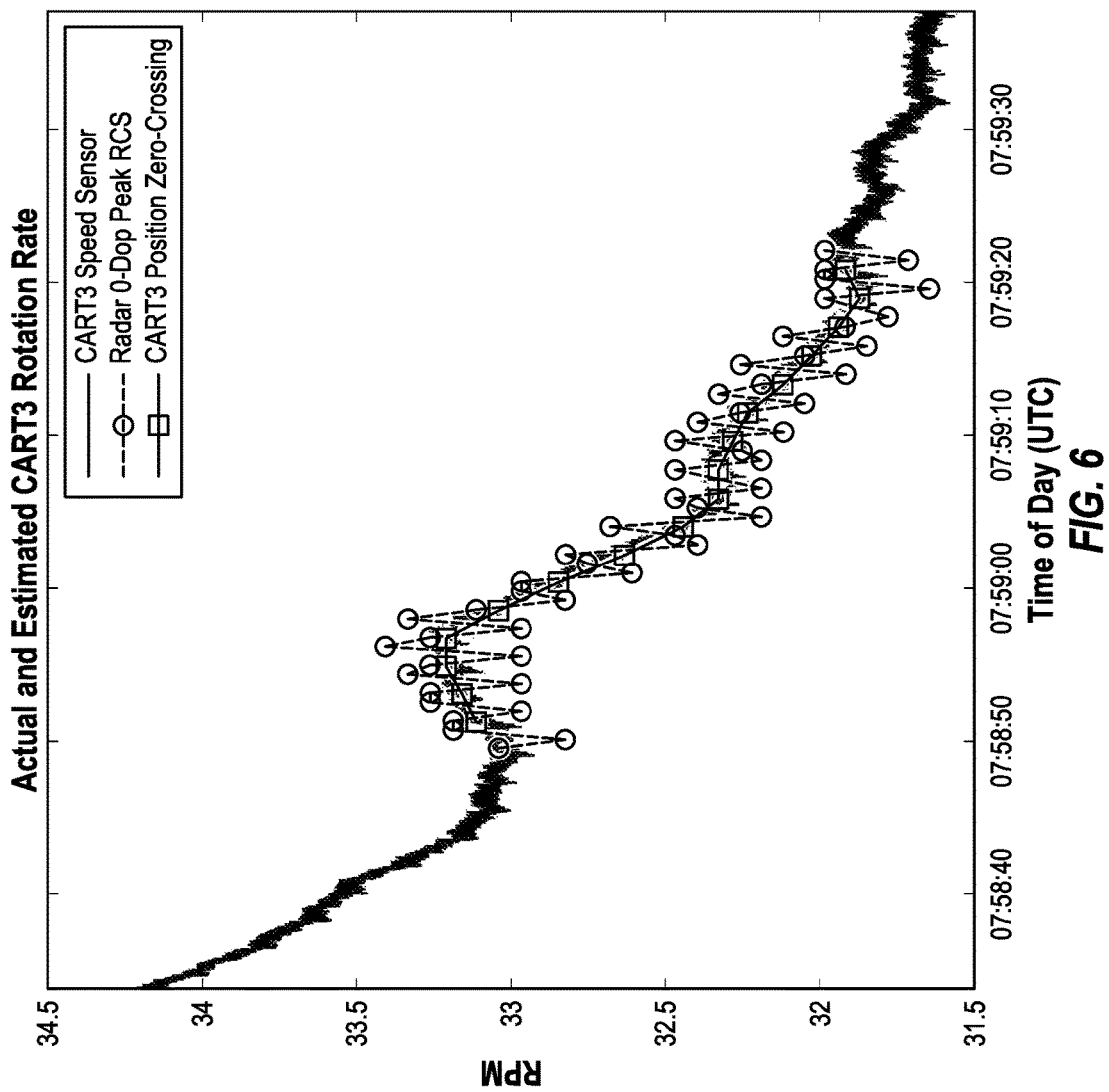
FIG. 6 shows temporal alignment of observations using the estimated rotation rate from radar observations and a representative wind turbine's telemetry.

Considering a point on a turbine's blade 14, a model for the position and velocity of this point can be derived through Euler coordinate transformations. All of the coordinate transformations act on the coordinate system located at the blades' center of rotation (the turbine's hub). The point's position can be determined for any yaw ($\phi$), blade tilt ($\alpha$), cone angle ($\beta$) and absolute rotation angle ($\theta$) following $$p = [p_x \, p_y \, p_z]^T = R_\phi R_\alpha R_\theta R_\beta [0 \, 0 \, r]^T, \qquad (3)$$

where T is the matrix transpose and R the Euler rotation matrices for four parameters applied to a point at radius r. The rotation angle of blade 14 starts at top-dead-center (i.e., $\theta=0$ is along the z-axis). The angles and sign conventions are illustrated in FIG. 5. FIG. 6 shows the temporal alignment of observations using the estimated rotation rate from radar observations and a representative wind turbine's telemetry.

The Euler rotation matrices for each variable are presented next, and each accounts for its rotation sign convention. (Assuming the radar observer is located on the negative y-axis.) The yaw angle increases clockwise about the z-axis:

$$R_\phi = \begin{bmatrix} \cos\phi & \sin\phi & 0 \\ -\sin\phi & \cos\phi & 0 \\ 0 & 0 & 1 \end{bmatrix}. \qquad (4)$$

The blade tilts clockwise about the x-axis:

$$R_\alpha = \begin{bmatrix} 1 & 0 & 0 \\ 0 & \cos\alpha & \sin\alpha \\ 0 & -\sin\alpha & \cos\alpha \end{bmatrix}. \qquad (5)$$

The rotation angle increases in a counter-clockwise direction about the y-axis:

$$R_\theta = \begin{bmatrix} \cos\theta & 0 & \sin\theta \\ 0 & 1 & 0 \\ -\sin\theta & 0 & \cos\theta \end{bmatrix}. \qquad (6)$$

The cone angle is accounted for by a counter-clockwise rotation about the x-axis:

$$R_\beta = \begin{bmatrix} 1 & 0 & 0 \\ 0 & \cos\beta & -\sin\beta \\ 0 & \sin\beta & \cos\beta \end{bmatrix}. \qquad (7)$$

After the associated rotation transforms are applied, the position of the blade's point (referenced to the hub) is $$p = \tilde{r} \begin{bmatrix} \cos\beta[\cos\phi\sin\theta + \sin\phi\sin\alpha\cos\theta] - \sin\phi\cos\alpha\sin\beta \\ \cos\beta[\cos\phi\sin\alpha\cos\theta - \sin\phi\sin\theta] - \cos\phi\cos\alpha\sin\beta \\ \sin\alpha\sin\beta + \cos\alpha\cos\theta\cos\beta \end{bmatrix}, \qquad (8)$$

where $\tilde{r}$ is the radius to the point. If this point on the blade represents the blade's scattering phase center and if we consider far-field radar observations with the radial parallel to the negative y-axis, the radial distance (with the origin at the center of rotation) is:

$$p_r = p_y = -\tilde{r} \cos\beta[\sin\phi \sin\theta - \cos\phi \sin\alpha \cos\theta] + \cos\phi \cos\alpha \sin\beta \qquad (9)$$

Note: the sign convention is that negative distances are closer to the radar.

The change in radial position as a function of the rotation angle (and for a fixed radius $\tilde{r}$) can be determined from the derivative of the position with respect to $\theta$:

$$\frac{\partial p_r}{\partial \theta} = -\tilde{r}\cos\beta[\sin\phi\cos\theta + \cos\phi\sin\alpha\sin\theta]. \qquad (10)$$

The radial velocity, again assuming $\tilde{r}$ is constant in $\theta$, is a function of the change in rotation with respect to time:

$$\frac{\partial \theta}{\partial t} \text{ or } \dot{\theta}.$$

The observed radial velocity for the point is then $$v_r = \frac{\partial p_r}{\partial \theta}\frac{\partial \theta}{\partial t} = -\dot{\theta}\tilde{r}\cos\beta[\sin\phi\cos\theta + \cos\phi\sin\alpha\sin\theta], \qquad (11)$$

which follows the radar's velocity convention, with negative velocities moving toward the radar.

The radar's elevation angle with respect to the turbine ($\psi$) can also be accounted for, giving $$p_r = -\tilde{r}\cos(\psi)[\cos\beta[\sin\phi\sin\theta - \cos\phi\sin\alpha\cos\theta] + \cos\phi\cos\alpha\sin\beta] + \qquad (12)$$
$$\tilde{r}\sin(\psi)[\sin\alpha\sin\beta + \cos\alpha\cos\theta\cos\beta] \text{ and}$$

$$v_r = -\dot{\theta}\tilde{r}\cos\beta[\cos\psi(\sin\phi\cos\theta + \cos\phi\sin\alpha\sin\theta) + \sin\psi\cos\alpha\sin\theta]. \qquad (13)$$

In an example implementation, the wind turbine has steel blades with no cone angle (i.e., $\beta=0$), and a tilt angle of 3.77 degrees. Other designs can have other material(s) and/or geometry. The yaw, rotation angle, and rotation rate can be directly applied from the turbine's state telemetry. A demonstration and comparison of a model of representative wind turbine blade tips' velocities to the radar signature observations, can be seen in FIGS. 7A-7E, which show velocity model estimates overlaid on radar observations during a rotation rate ramp-up event. Note, the radius $\tilde{r}$ used here is the radius to the representative wind turbine's blade tip, in this case 20 meters.

For relatively large wind turbine systems with composite blades, gravity and wind-loading forces exacerbate the effects of the dynamic bending moments along the blade's length. The geometry of the blades in these and other embodiments may be a complex, dynamic system. Blade flex due to gravity can be modeled by introducing a rotation angle dependence to $\beta$ (or $\alpha$). Blade flex due to wind loading can be added (potentially with a loose dependence on the rotation rate), and stochastic vibration can also be included here. In reality, $\tilde{r}$ is dependent on $\alpha$, $\beta$, $\phi$, and $\theta$, as the phase center's position on the blade changes due to shifts in the illuminated surface. The time derivative of $\tilde{r}$ may be nontrivial and is a function of the blade's geometry as well as the relative position of the turbine with respect to the radar. The distance to the phase center may also have an additional modulation term that is a result of a non-singular volume. (Even if the blade rotates by $$\frac{d\theta}{dt},$$

the phase center may appear to rotate by $$\frac{d\theta'}{dt} \neq \frac{d\theta}{dt},$$

as a result of the changing aspect of the radar wave's projection on the moving blade.)

Referring to FIG. 7, even when a blade tip's physical radius is used the scattering phase center observed by the radar may not identify the blade tip's actual location. A scatterer's radius ($\hat{r}$) can be estimated from radar observations. For the representative wind turbine estimates are shown in FIG. 8 for all available yaw and RPM combinations where observations are available over the complete range of rotation angles (i.e., from 0 to 360 degrees). The scatterer's radius is estimated for each yaw/RPM state combination by determining the radius that maximizes the total spectral power within a model's selected region. From this, an effective radius can be estimated and used for modeling a given wind turbine's signature. In some embodiments, the described model only estimates the "tip halo" velocity. Additional constraints may be required to adequately capture the blade "flash" and echoes from the blade surface at lower velocities. In addition, the instantaneous velocity observed may require a range of velocities (i.e., a spectral width) to account for any spectral broadening or variation in the velocity during the radar's observation window. These considerations will be discussed in more detail later herein. A given wind turbine's RCS may be characterized with a high degree of accuracy for a given state. The difficulties in wind turbine characterization are the time-varying and ambiguous state of the turbine from the point of view of a radar observer. A single turbine, multiple turbines, or partial wind turbines may exist in a range-volume cell, depending on the wind farm's and radar's configuration. Within a full wind turbine rotation period, it is expected that six "flashes" will be observed: three flashes from the blades at the top position and three from the blades at the bottom position. If Doppler aliasing does not occur, the blade flashes from the top and bottom of the rotation will have similar velocity magnitudes but opposing velocity signs.

In some embodiments, X-band radar observations, in the form of spectrograms, may be directly related to a turbine's state (e.g., as reported by the turbine's telemetry). In these and other embodiments, the primary state parameters of interest may include the turbine's rotation angle, rotation rate, and the radar-relative yaw angle. As noted earlier, the blade pitch for each blade may also be reported but it is typically found to be fixed for the controller configuration used in the representative wind turbine except during ramp-up and ramp-down from or to an idle state.

Characterization of wind turbines without state telemetry has demonstrated that for short periods of time, a wind turbine's signature was well represented as a deterministic process (in this case a cyclostationary process), and the spectral observations of the turbine are periodically correlated. Without state telemetry, time has been used as the independent variable for characterization and analysis. Time has been used as a proxy for the rotation angle under the cyclostationary assumption. With state telemetry, this assumption is not required, and the cyclostationary properties of a wind turbine's signature can be independently validated. A given wind turbine's RCS (and thus the echo power) is expected to be cyclostationary with the rotation angle. The temporal analysis assumes that a wind turbine's state is constant (except for the rotation angle), allowing time (t) and the rotation to be interchanged:

$$\theta = \dot{\theta}t. \quad (14)$$

For a time-varying rotation rate, a process remains cyclostationary with respect to the turbine's rotation angle but will no longer be cyclostationary with respect to time. The relationship between time and the rotation angle is used for comparisons between spectra (S). (For the estimation of the spectra, time remains the independent variable.) This is done in order to simplify estimation of the spectra (where t is uniformly sampled), as well as to promote cross-comparisons during the analysis (e.g., a common "velocity" axis). The discrete Fourier transform used to generate the spectra could use θ instead of t, giving a normalized, pseudo-"velocity" axis across different rotation rates (see Equation 14).

In one example, the cyclostationarity of the wind turbine with respect to time is verified under near-constant operating states. The cyclostationarity of the turbine's signature will also be considered with respect to the absolute rotation angle (i.e., the variable time represents with all states constant except the rotation angle). Temporal correlation is compared to the rotation correlation structure for the representative wind turbine given a constant yaw and blade pitch. A 0.5-degree bin is used for estimation of the rotation angle correlation. The dual-polarization signature correlation structures are also evaluated.

Figure 9A:
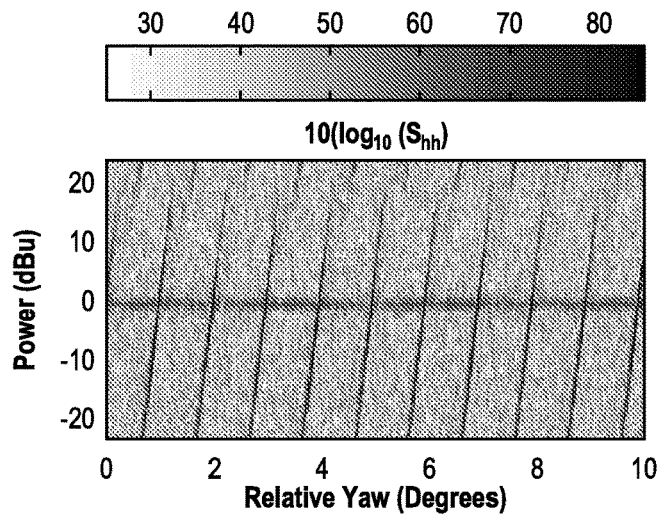
FIGS. 9A-9I show correlation of a representative wind turbine radar signature as a function of the rotation angle and time.
Figure 9B:
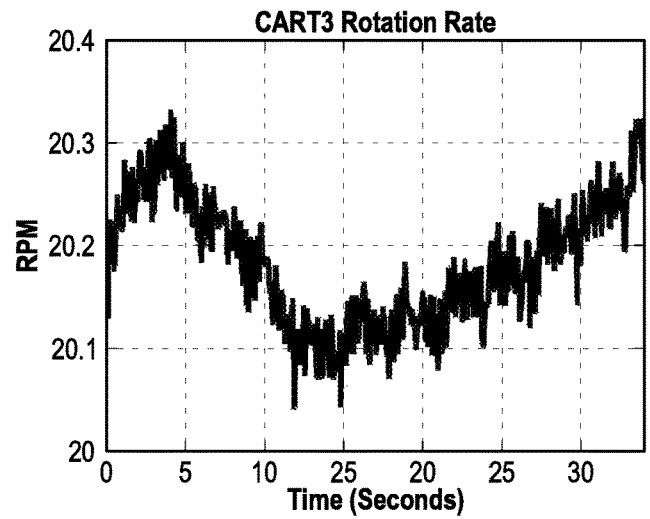
Figure 9C:
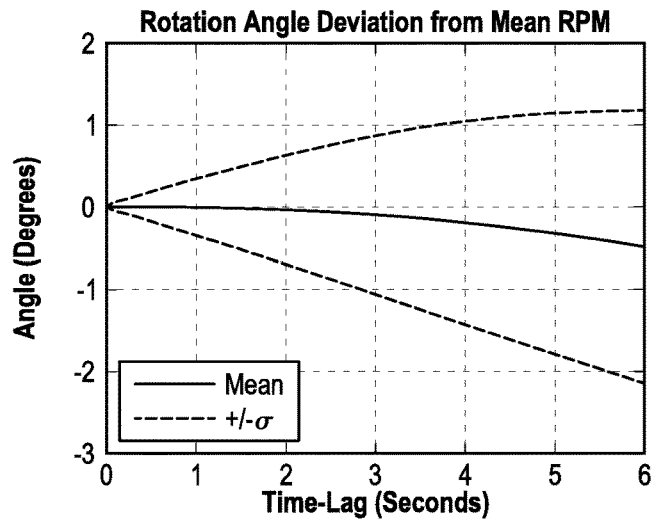
Figure 9D:
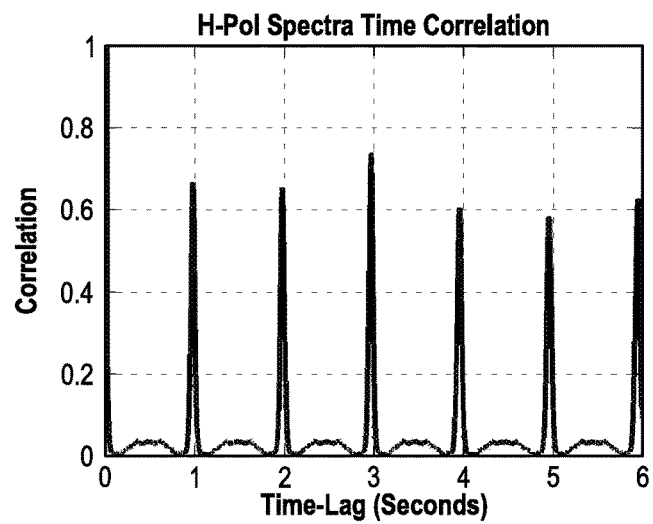
Figure 9E:
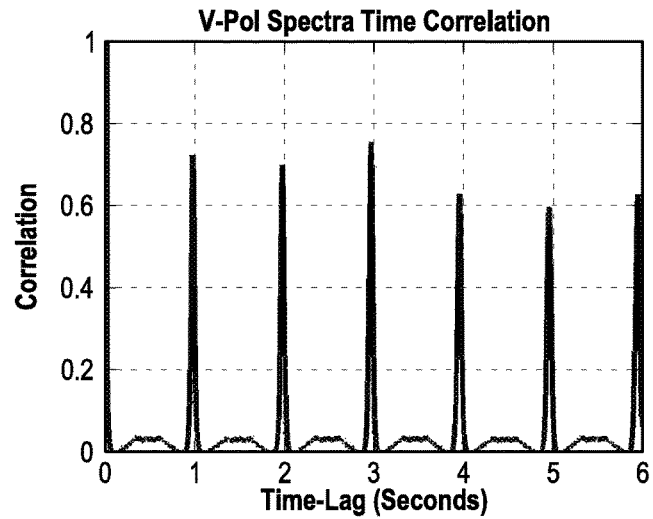
Figure 9F:
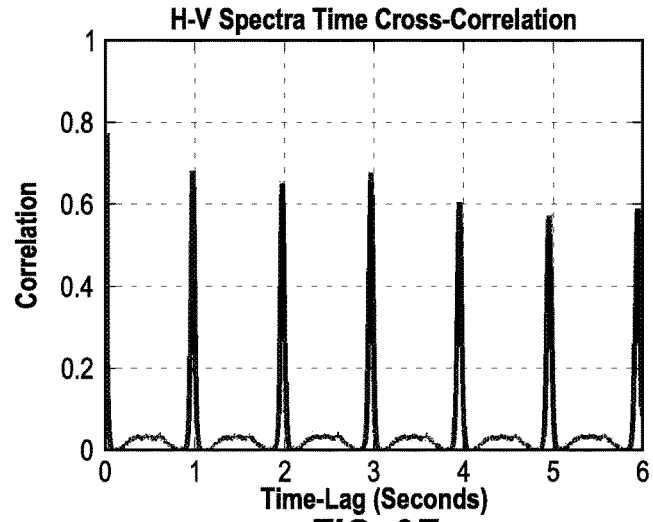
Figure 9G:
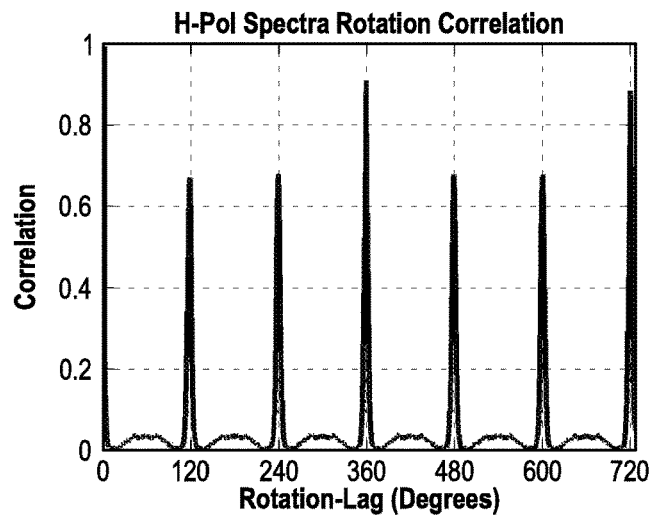
Figure 9H:
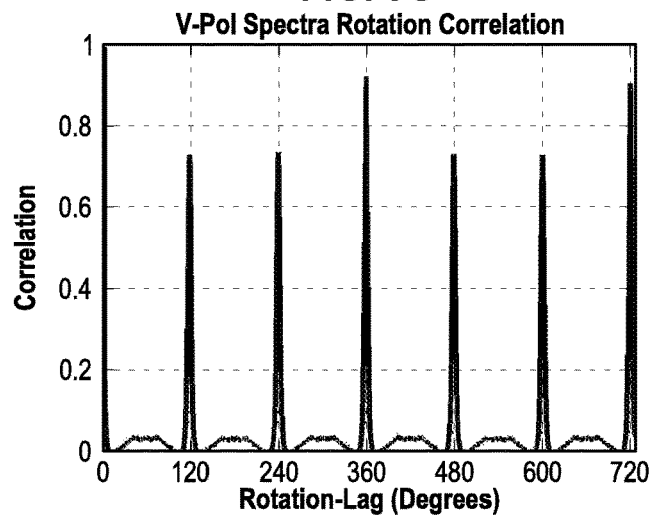
Figure 9I:
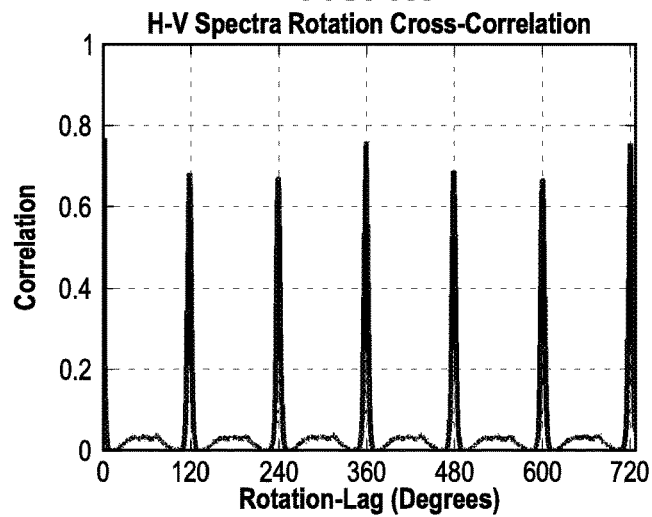
Figure 10A:
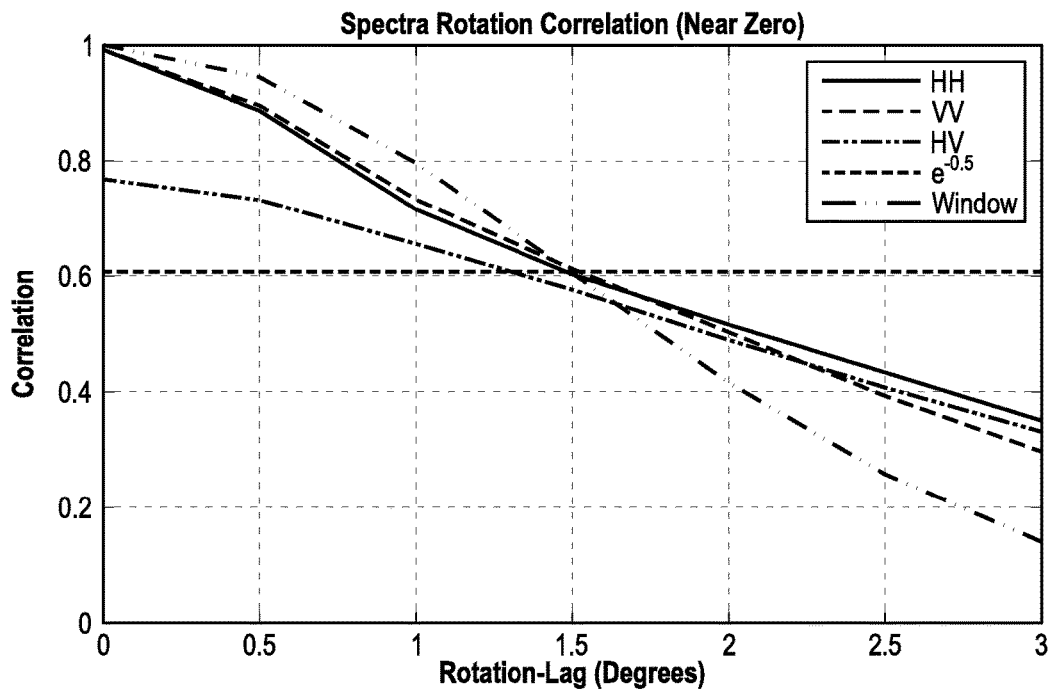
FIGS. 10A and 10B show a sample correlation of a representative wind turbine radar signature as a function of rotation angle.
Figure 10B:
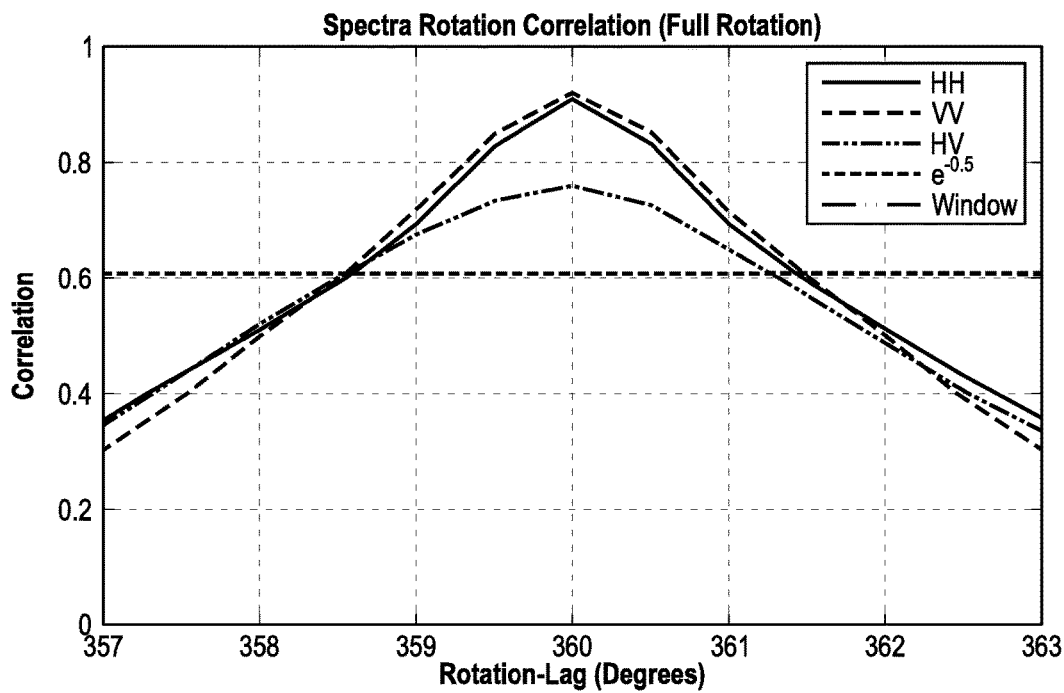
Figure 11A:
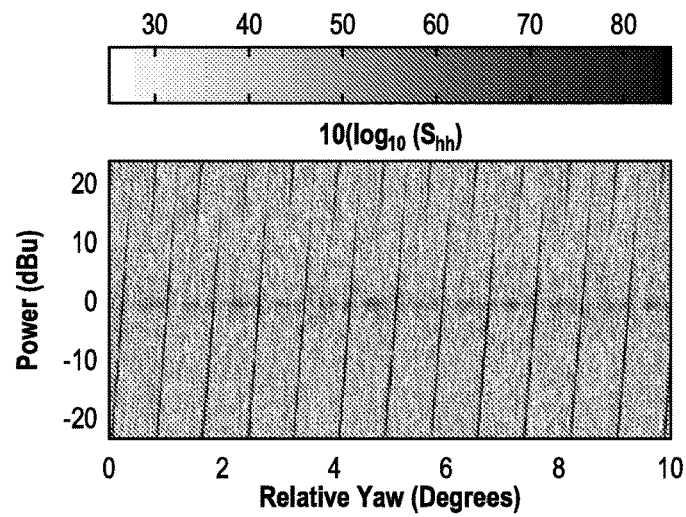
FIGS. 11A-11I show the temporal and rotation correlation of a representative wind turbine radar signature during a rotation rate ramp event.
Figure 11B:
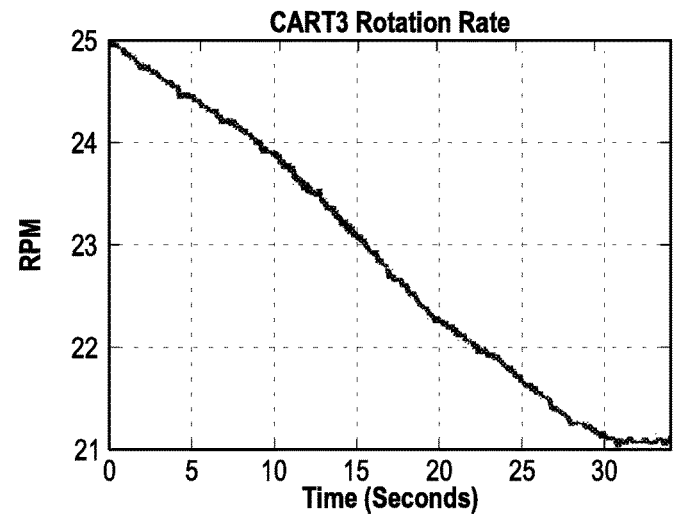
Figure 11C:
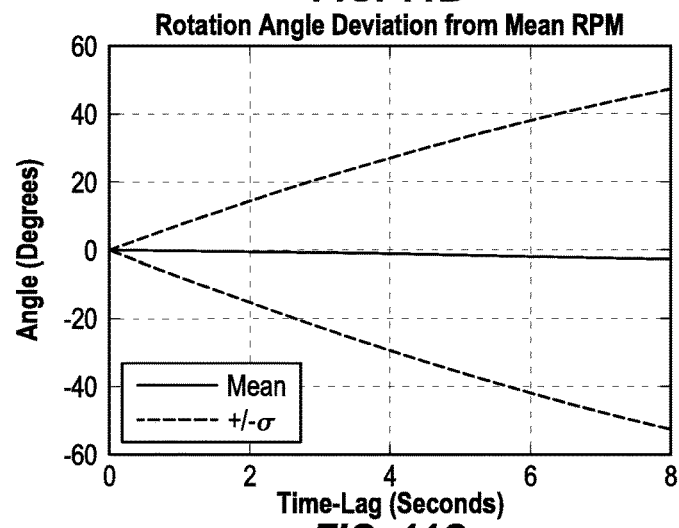
Figure 11D:
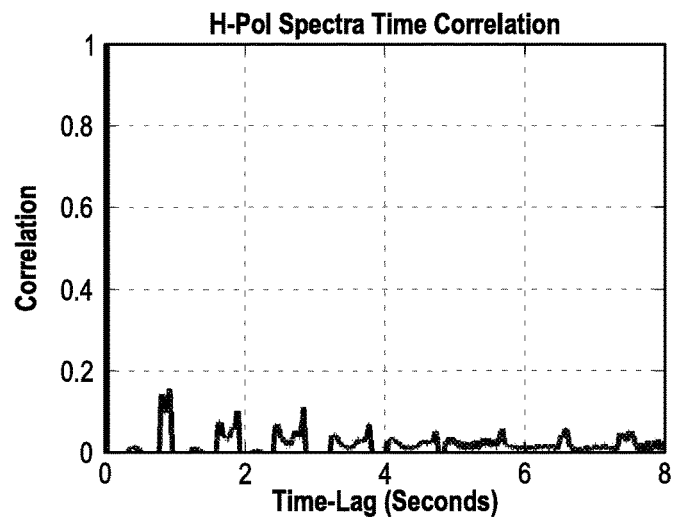
Figure 11E:
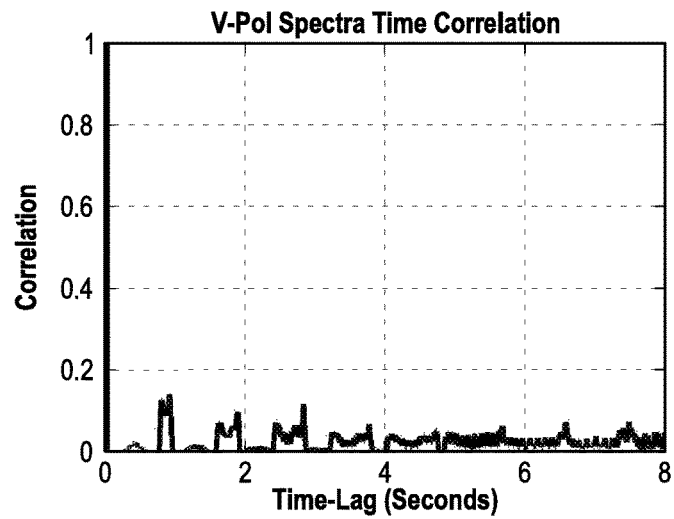
Figure 11F:
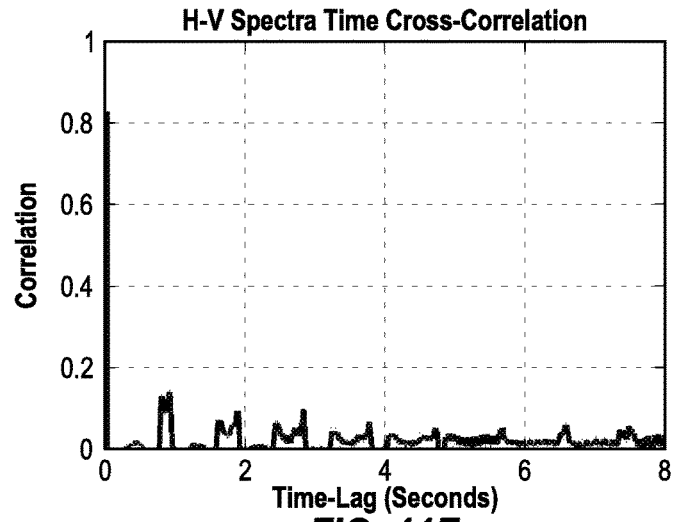
Figure 11G:
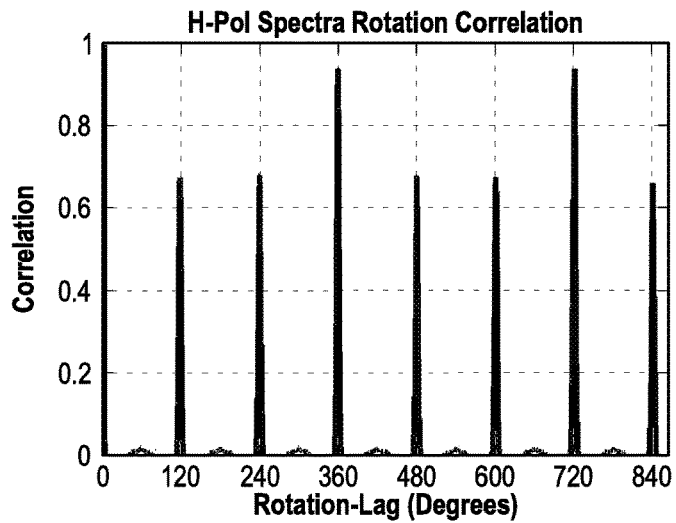
Figure 11H:
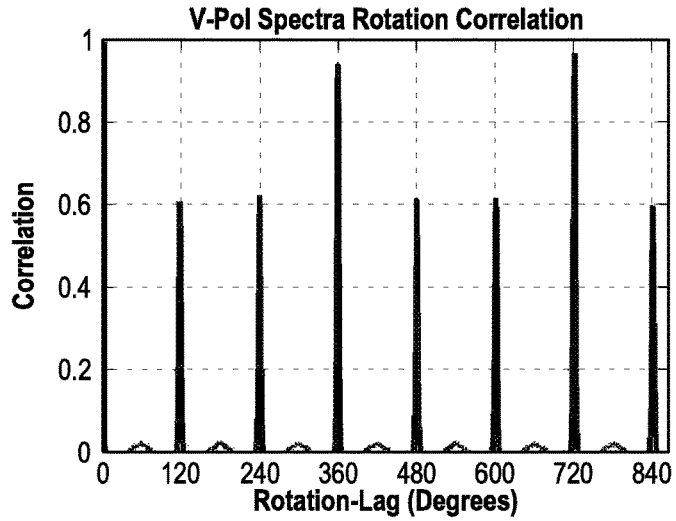
Figure 11I:
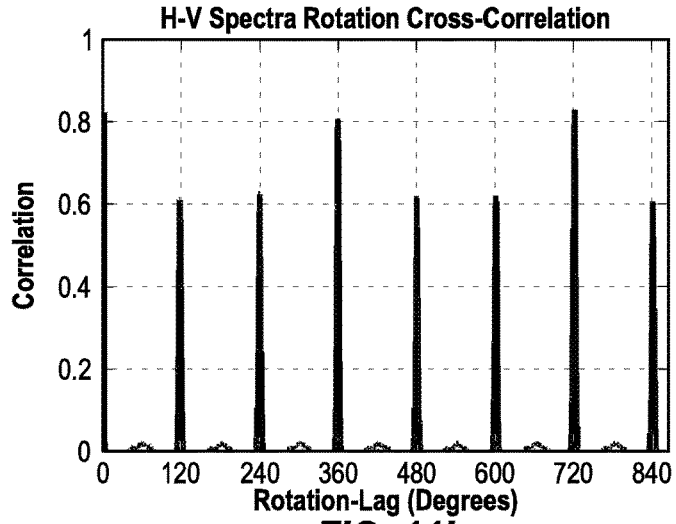
Figure 12A:
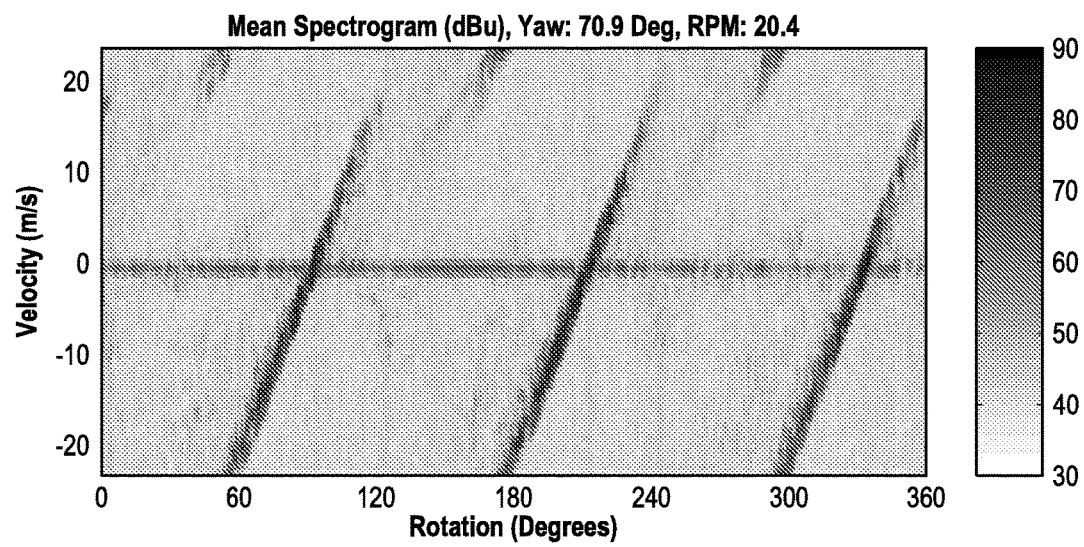
FIGS. 12A-12F show dictionaries for six rotation rates for a representative wind turbine in accordance with an embodiment.
Figure 12B:
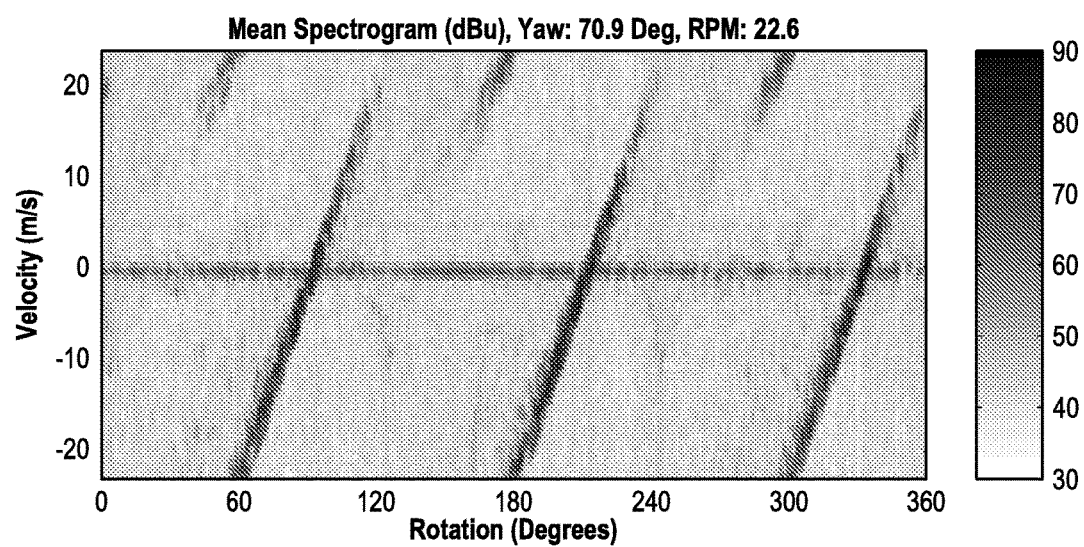
Figure 12C:
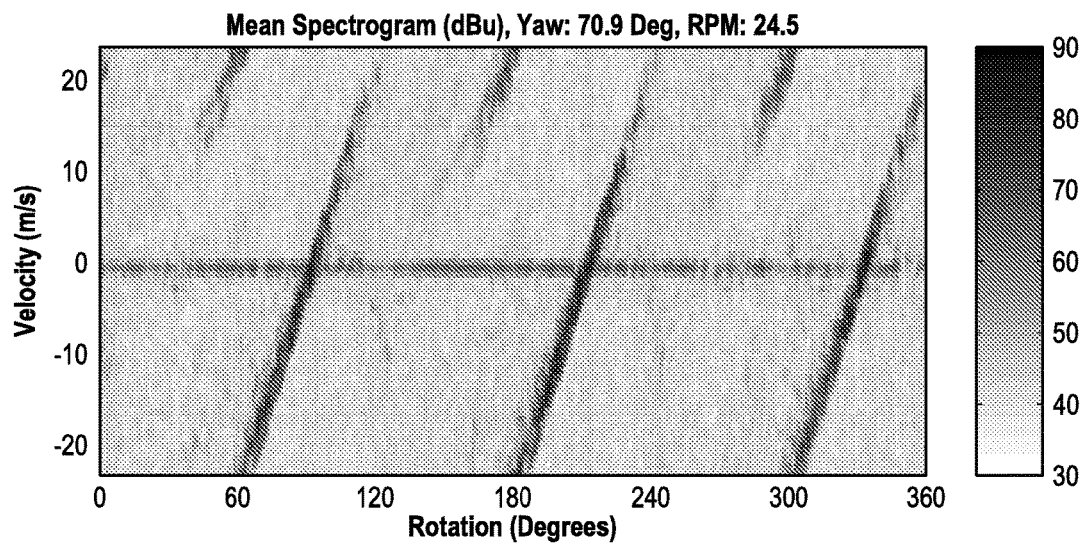
Figure 12D:
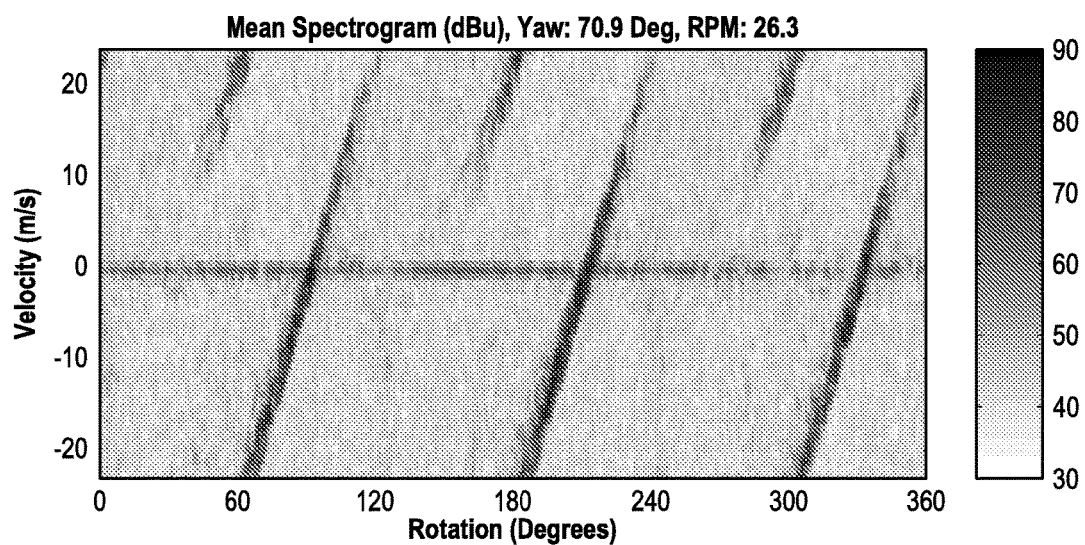
Figure 12E:
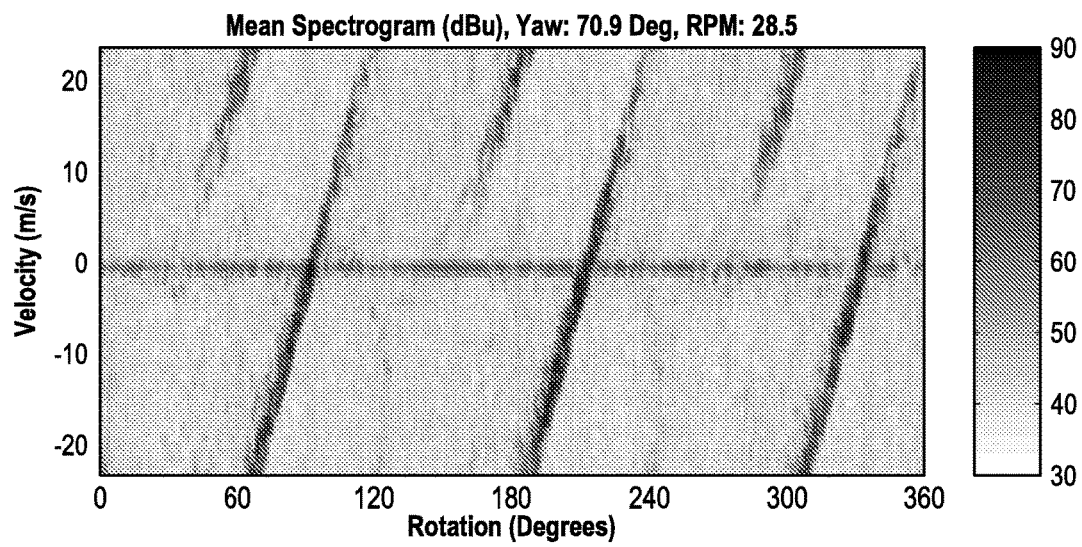
Figure 12F:
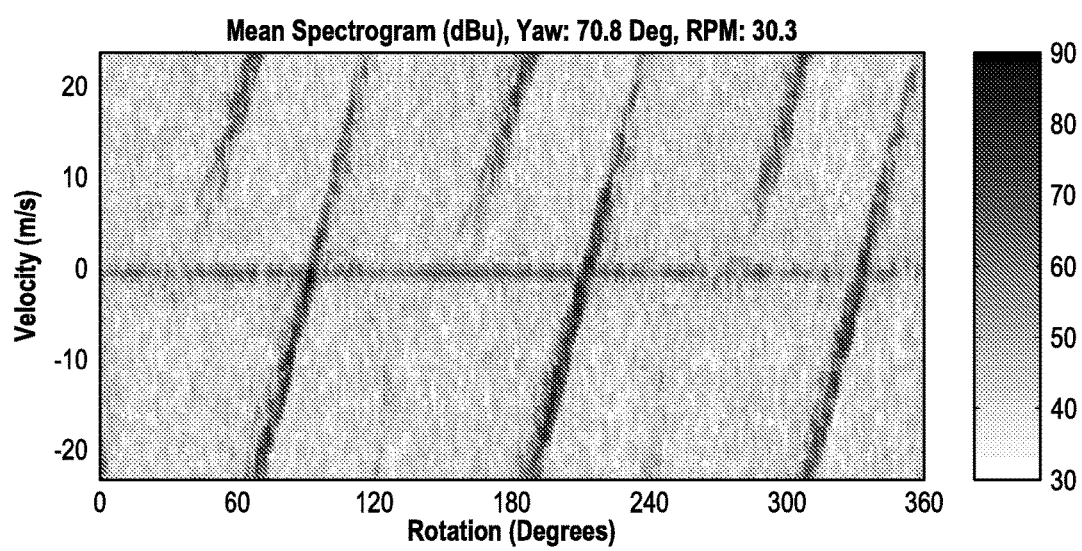
Figure 13A:
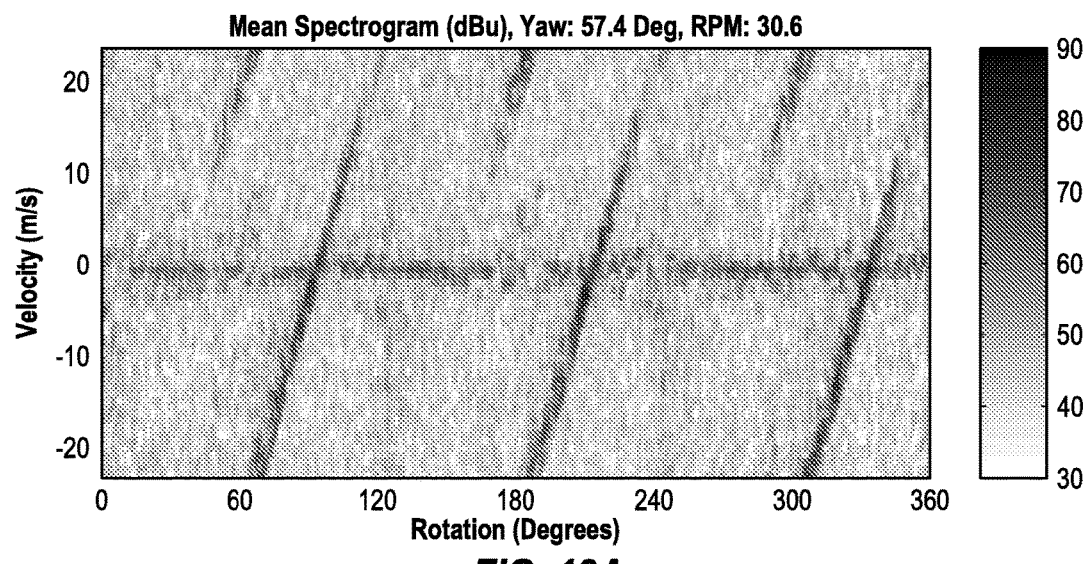
FIGS. 13A-13F show dictionaries for six yaw angles for a representative wind turbine in accordance with an embodiment.
Figure 13B:
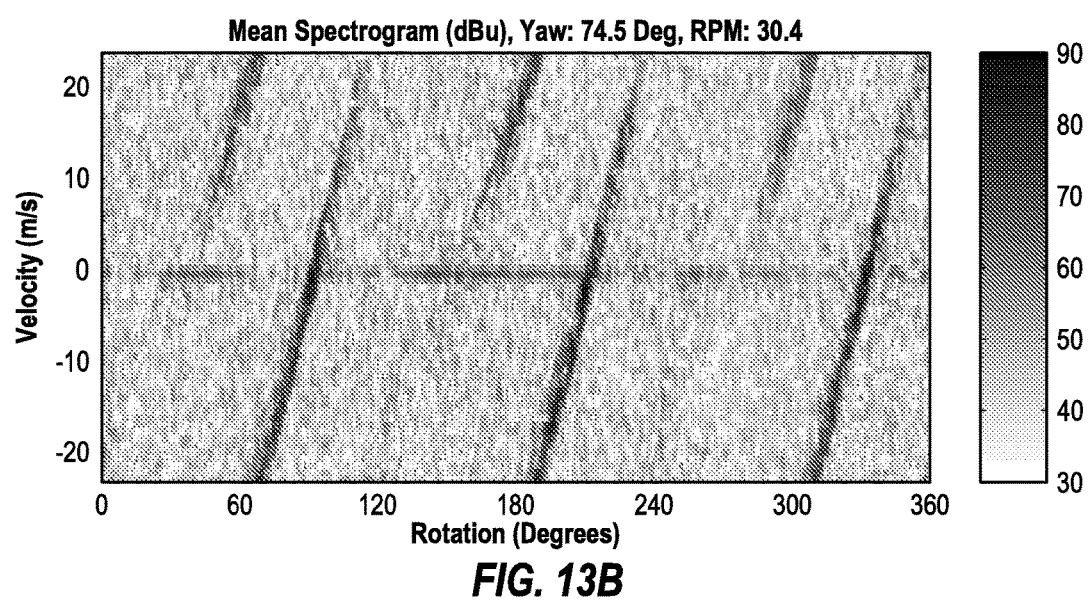
Figure 13C:
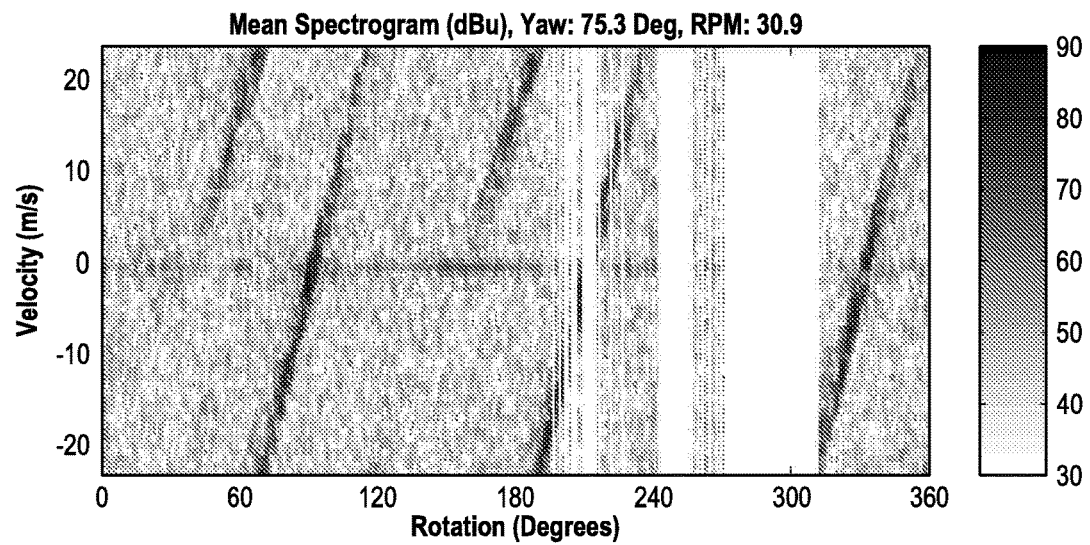
Figure 13D:
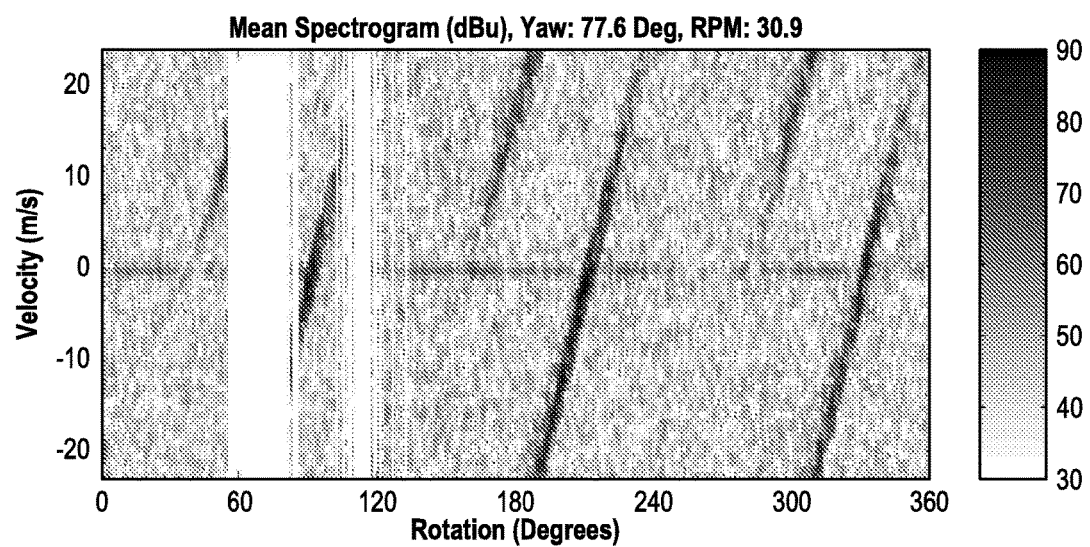
Figure 13E:
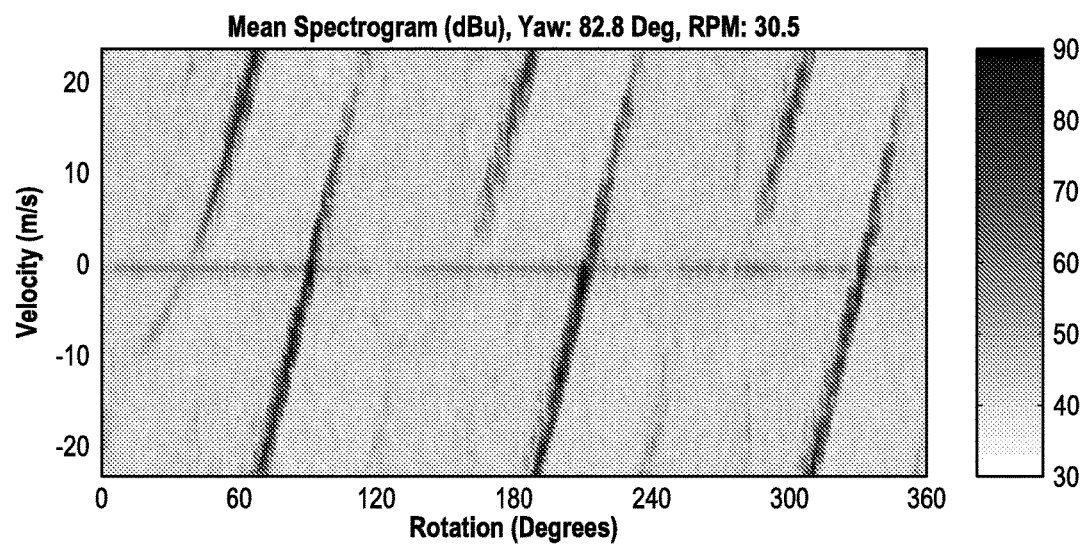
Figure 13F:
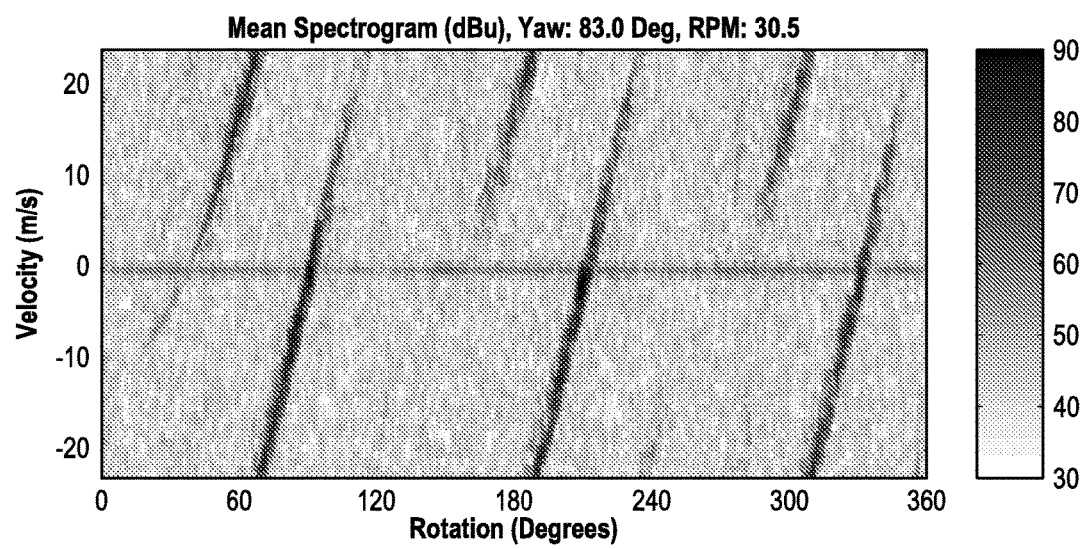

FIGS. 9A-9I show correlation of a representative wind turbine's radar signature as a function of the rotation angle and time. FIG. 9A considers observations for 34 seconds, at a yaw of 70.8 degrees relative to the radar, a constant blade pitch of 3.7 degrees, and a near-constant rotation rate of 20.18 RPM with a standard deviation of 0.06 RPM. A comparison of the temporal correlation of the spectrograms to the correlation of the spectrograms with respect to the change in rotation angles shows good agreement in the overall structure. The correlation of the rotation angles demonstrates higher peak correlations at multiples of the blade-pass period. The correlation at one blade-pass period (approximately 1 second) is similar to that of the correlation at 120 degrees of rotation. This is a result of the slow variation in rotation rate (and therefore, the relationship θ=$\dot{\theta}$t holds for short time-lags). As the time-lag increases slightly, even small errors in the estimate of the rotation angle from time (which is really what the correlation is implementing) are noticed (see FIG. 9C). The decorrelation rate of the wind turbine blade's spectral signature as a function of rotation angle (and the observation window) is less than 1.5 degrees at 20 RPM (see FIGS. 10A and 10B).

Now consider the correlation structure of a representative wind turbine's radar signatures during a ramp in rotation rate, as presented in FIGS. 11A-11I. Using a 34-second observation period the rotation rate of the turbine changes from approximately 25 RPM to 21 RPM over 30 seconds and then remains nearly constant until the observation ends.

For this case, the turbine's yaw angle is constant at 84 degrees with respect to the radar. The ramp in rotation rate results in the time-to-rotation angle relationship no longer being constant, and, as a result, the temporal correlation is very poor. When considering the correlation in rotation angle, the structure shows the expected periodic characteristic in 120-degree intervals, with very high correlation at multiples of a full rotation. The rotation correlation, even with "small" variations in rotation rate, remains very high and is similar to that for a fixed rotation rate as shown in FIGS. 9A-9I.

FIGS. 12A-12F show the mean spectral signature as a function of rotation angle, for six rotation rates at a fixed yaw angle. FIGS. 12A-12F represent rotation rates in two RPM steps from $\dot{\theta}=20$ RPM to $\dot{\theta}=30$ RPM, with each averaged over $[\dot{\theta},\dot{\theta}+1]$ The mean yaw and RPM for each dictionary are shown in each figure's title. Similarly, FIGS. 13A-13F show the mean spectral signature for six yaw angles at a fixed rotation rate. The mean spectral signatures presented are the geometric mean of the spectral echo power at the given state (or the arithmetic mean of the power in decibels). These spectrograms are examples of "dictionaries" that can be used for analysis (and suppression) of a wind turbine's signature.

FIGS. 12A-12F and 13A-13F are radar observations of a representative wind turbine for various states. FIGS. 13A-13F represent relative yaw angles of, respectively, $\phi=57.5$, 74.5, 75.5, 77.5, 82.5, and 83.5 degrees, with all states considering observations of $\phi\pm0.5$ degrees. For FIGS. 13C and 13D, these states do not have a complete set of observations for all rotation angles. As in FIG. 12A-12F, the mean yaw and RPM for each dictionary are shown in each figure's title for each of FIGS. 13A-13F. Considering yaw angles and rotation rates, the general signature as presented is very similar for all cases. Closer inspection shows that as the rotation rate increases (or as the relative yaw angle approaches 90 degrees), the observed peak velocities increase (and more of the turbine's signature is aliased in the Doppler velocity). (Note that where, as here, the number of samples available for each state vary the "texture" of each dictionary may vary.)

Referring again to FIGS. 12A-12F and 13A-13F, the turbine's blade signature is observed at zero-Doppler velocity when the blade's scattering surface is parallel to the radar's observation radial. If the data is well aligned and the windowed data for estimation of the spectra is at a near-constant state, the zero-Doppler signature and rotation angle should be the same for all rotation rates.

Figure 14A:
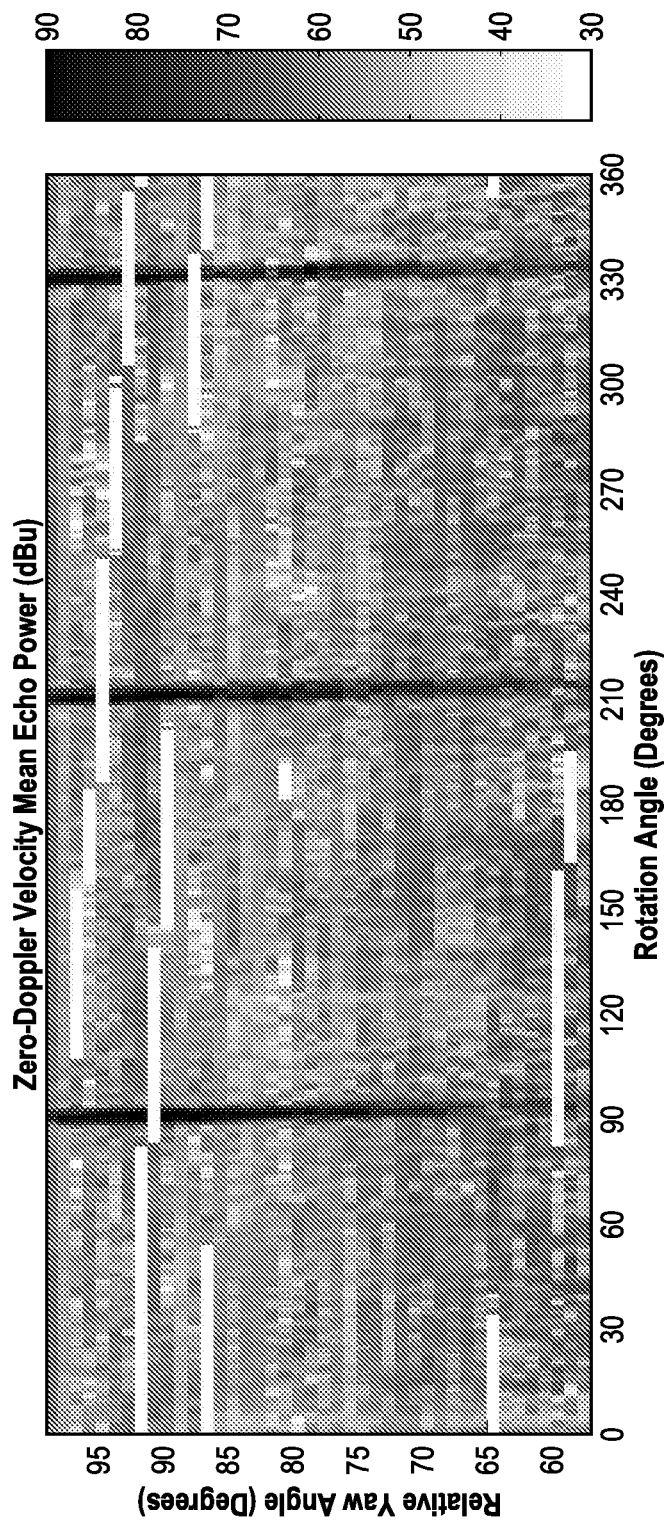
FIGS. 14A-14D show the mean zero-Doppler echo power as a function of rotation angle, averaged over all rotation rates.
Figures 14B, 14C, 14D:
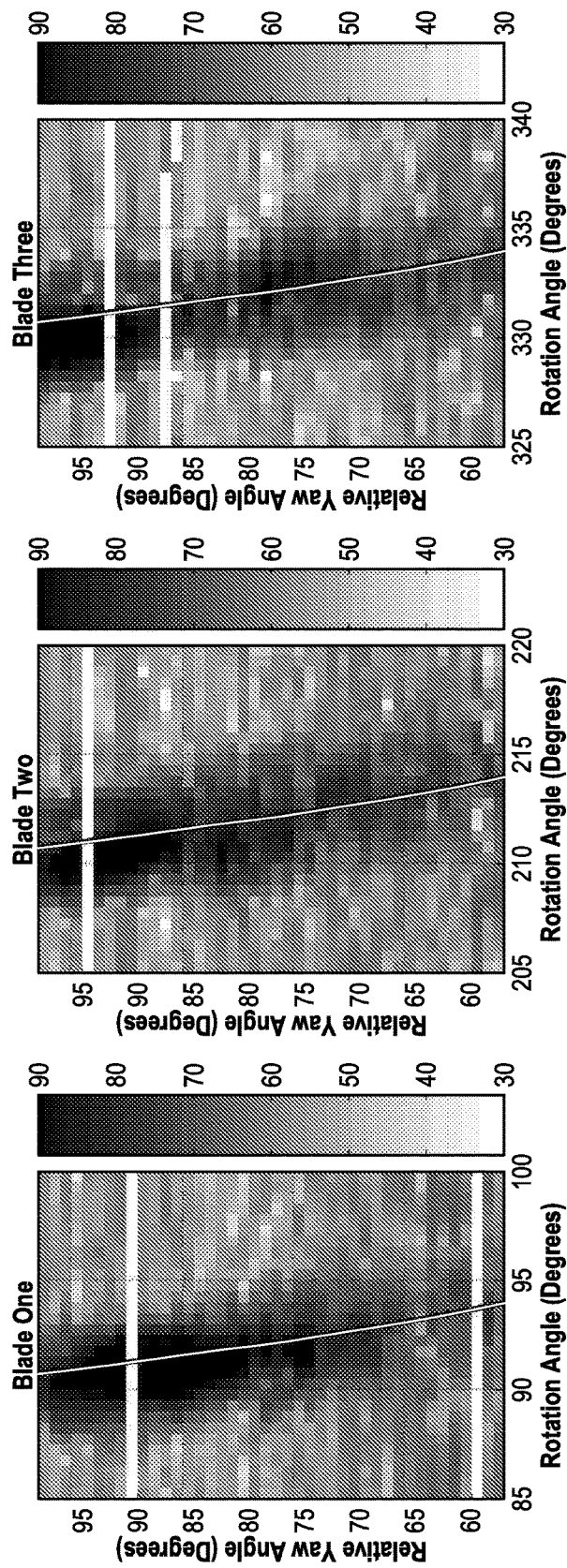

FIGS. 14A-14D present the zero-Doppler signature, as a function of the rotation angle and yaw angle, using all available rotation rates. Specifically, the mean zero-Doppler echo power is presented as a function of the rotation angle, averaged over all rotation rates. FIGS. 14B, 14C, and 14D are the same color scale but zoomed in around each blade's signature to highlight the effect of the yaw angle on the rotation angle of the zero-Doppler velocity's specular reflection. The black lines represent the zero-Doppler velocity contours estimated by the turbine model in Equation 13.

The rotation angle at which the peak zero-Doppler RCS is observed changes as a function of the relative yaw angle. This may be due to the geometry of the representative wind turbine and radar location. It is also likely to be influenced by the fact that the wind turbine's blade is a volume with a complex curved surface. (The point at which the blade scatters will necessarily be a function of this curved surface, which may present itself in different ways as a function of yaw and rotation.) A closer examination of the effect of the yaw angle is presented in FIGS. 14B, 14C, and 14D, for blades 1, 2, and 3, respectively. The absolute rotation angle that presents a specular surface (in the zero-Doppler velocity space) changes as a function of the yaw angle for each blade. The zero-Doppler contours from the model introduced with reference to FIGS. 7 and 8 above are included as solid black lines and show good agreement with the observed trends of zero-Doppler echoes.

Figure 15B:
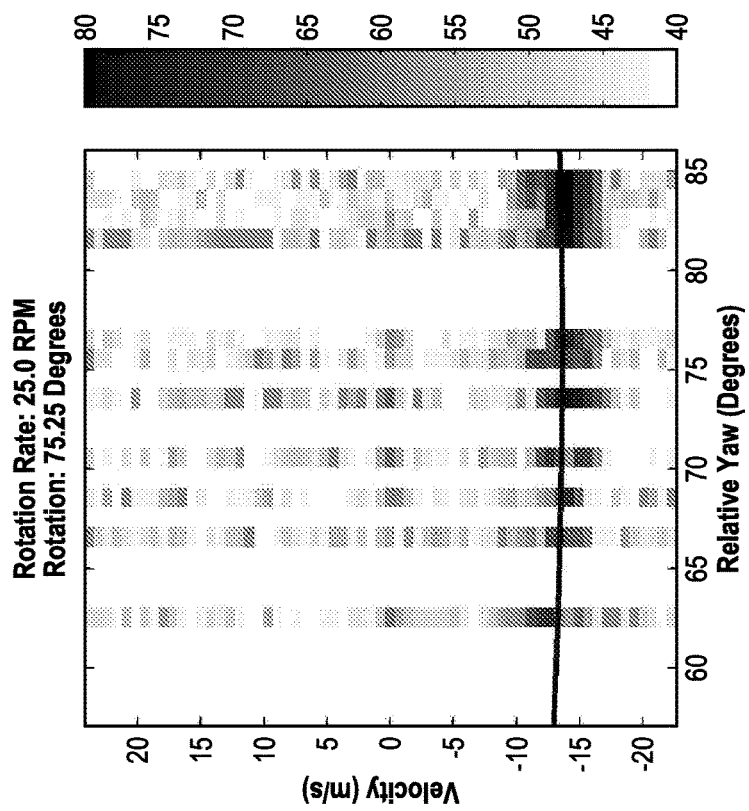
FIGS. 15A-15D show the variation of the spectral signature evaluated at a fixed rotation angle as a function of the relative yaw angle and rotation rate.
Figure 15A:
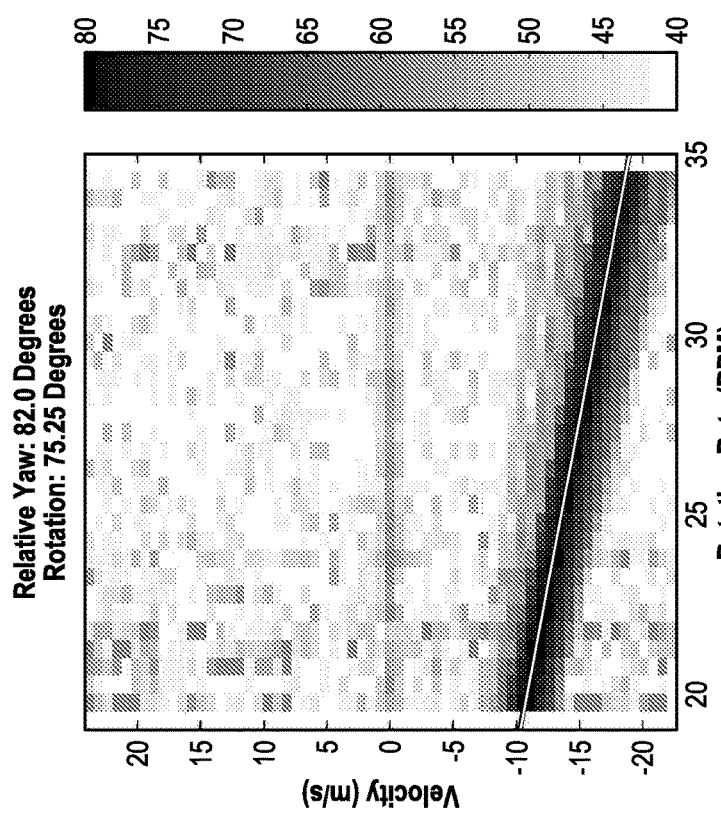
Figure 15D:
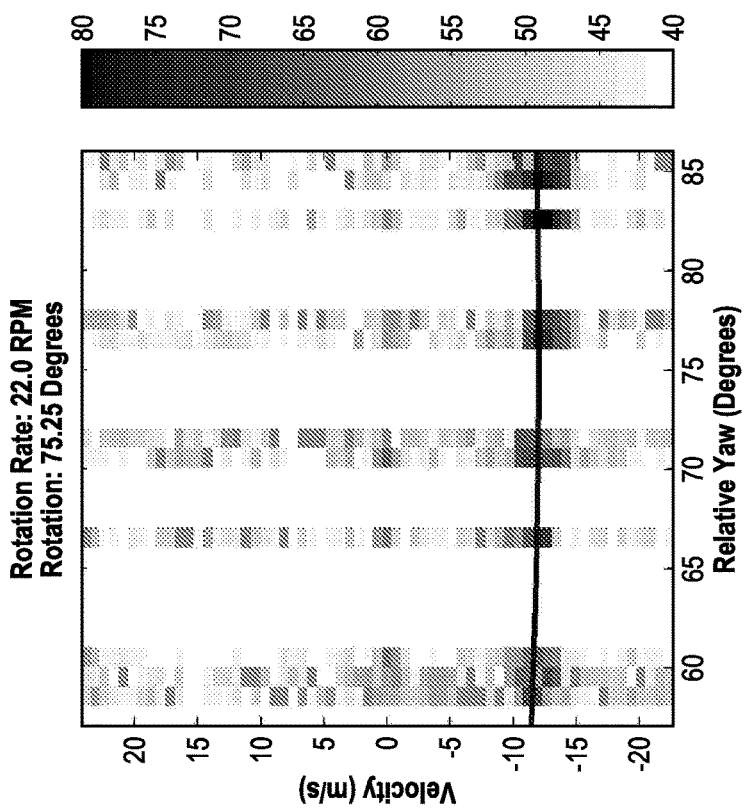
Figure 15C:
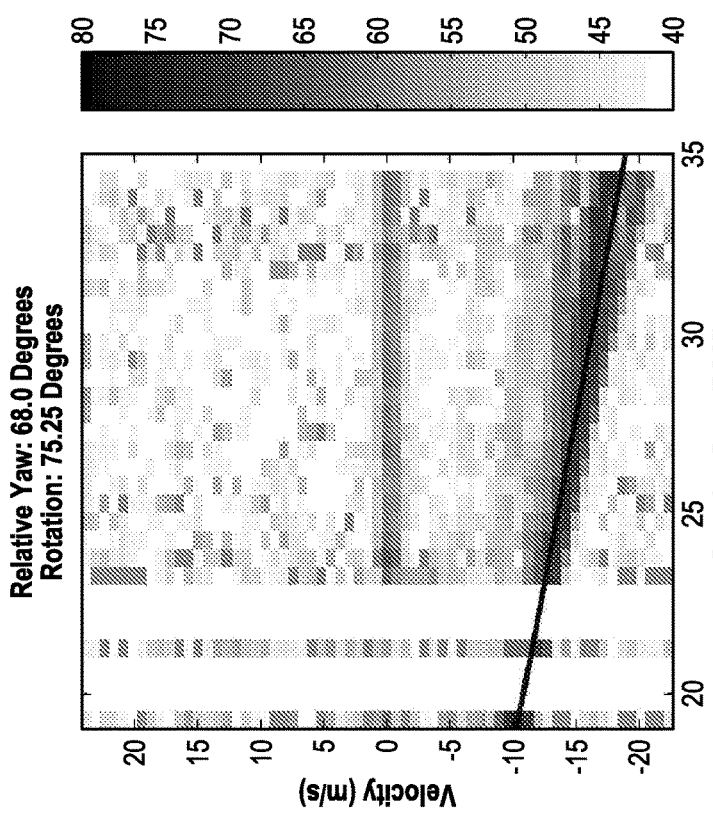

FIGS. 15A-15D show the variation of the spectral signature evaluated at a fixed rotation angle as a function of the relative yaw angle (with two fixed rotation rates) and as a function of the rotation rate (with two fixed yaw angles). The white line (in FIG. 15A) and the black lines (in FIGS. 15B0-15D) are the model's estimated velocity for the observed turbine state. Consider the variation in the spectra for a fixed rotation angle of $\theta=75.25\pm0.25$ degrees. Changes in rotation rate are shown at constant relative yaw angles of $\phi=82$ and $\phi=68$ degrees in FIGS. 15A and 15C, respectively. Similarly, fixed rotation rates of $\dot{\theta}=25$ and $\dot{\theta}=22$ RPM, as a function of the relative yaw angle, are presented in FIGS. 15B and 15D, respectively. Again, the model shows good agreement with the observations. In FIGS. 15A and 15B, some spectral echo power is observed for Doppler velocities between the modeled velocity and zero-Doppler velocity. This is likely due to the fact that the turbine blade is a continuous surface, extending from the turbine's hub to the blade tip, and the surface scatters the radar's signal along its length (although with a varying RCS). The majority of the echo power is observed to be localized to the blade tip's velocity (with some spectral width).

Referring to FIGS. 15A-15D, as the rotation rate and yaw angle change, the turbine's velocity signature is effectively scaled. Using the radial velocity model from Equation 11, consider the effect that rotation rate and yaw angle have on the velocity for a constant rotation angle. Using the ratio of velocity at two different states, denoted with subscripts 0 and 1, and assuming that $\alpha=0$ and $\beta$ are constant, the relationship between the yaw, rotation rate, and velocity for the two states is $$\frac{v_1}{v_0} = \frac{\dot{\theta}\tilde{r}_1 \sin\phi_1}{\dot{\theta}_0\tilde{r}_0 \sin\phi_0}. \tag{15}$$

If the movement of the phase center along the turbine's surface is negligible, then $\tilde{r}_0=\tilde{r}_1$. It is apparent that for the same velocity to be observed in both states, a change in the ratio of the sines of the relative yaw angles is inversely proportional to a change in the ratio of the rotation rates:

$$\frac{\sin\phi_0}{\sin\phi_1} = \frac{\dot{\theta}_1}{\dot{\theta}_0}. \tag{16}$$

Using dictionaries of radar observations, the relationship from Equation 16 can be evaluated. Wind turbine dictionaries are generated with 0.5-degree steps in the yaw angle, 0.5-degree steps in the rotation angle, and 0.5-RPM steps in the rotation rate.

Figures 16A, 16B:
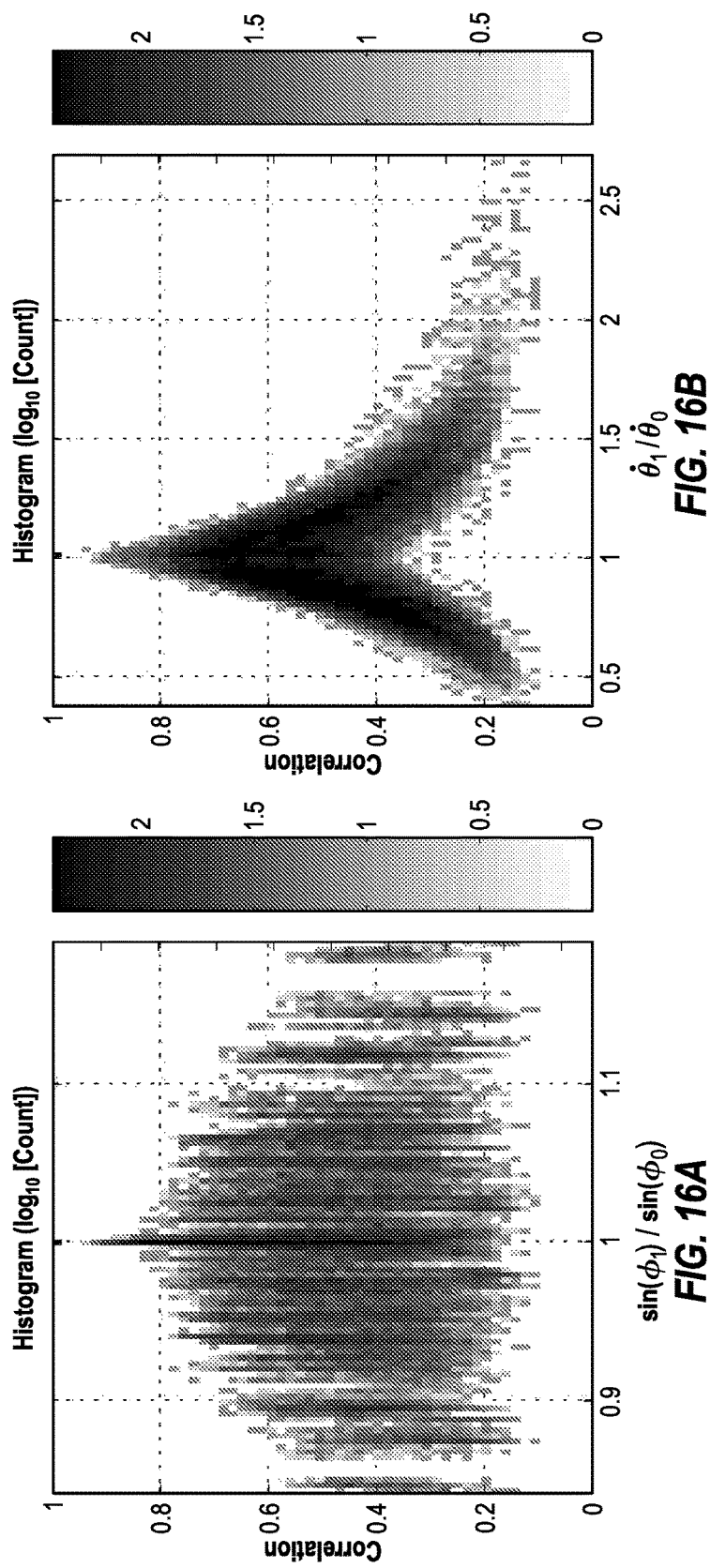
FIGS. 16A-16C show the temporal and rotation correlation of a representative wind turbine radar signature during a rotation rate ramp event.
Figure 16C:
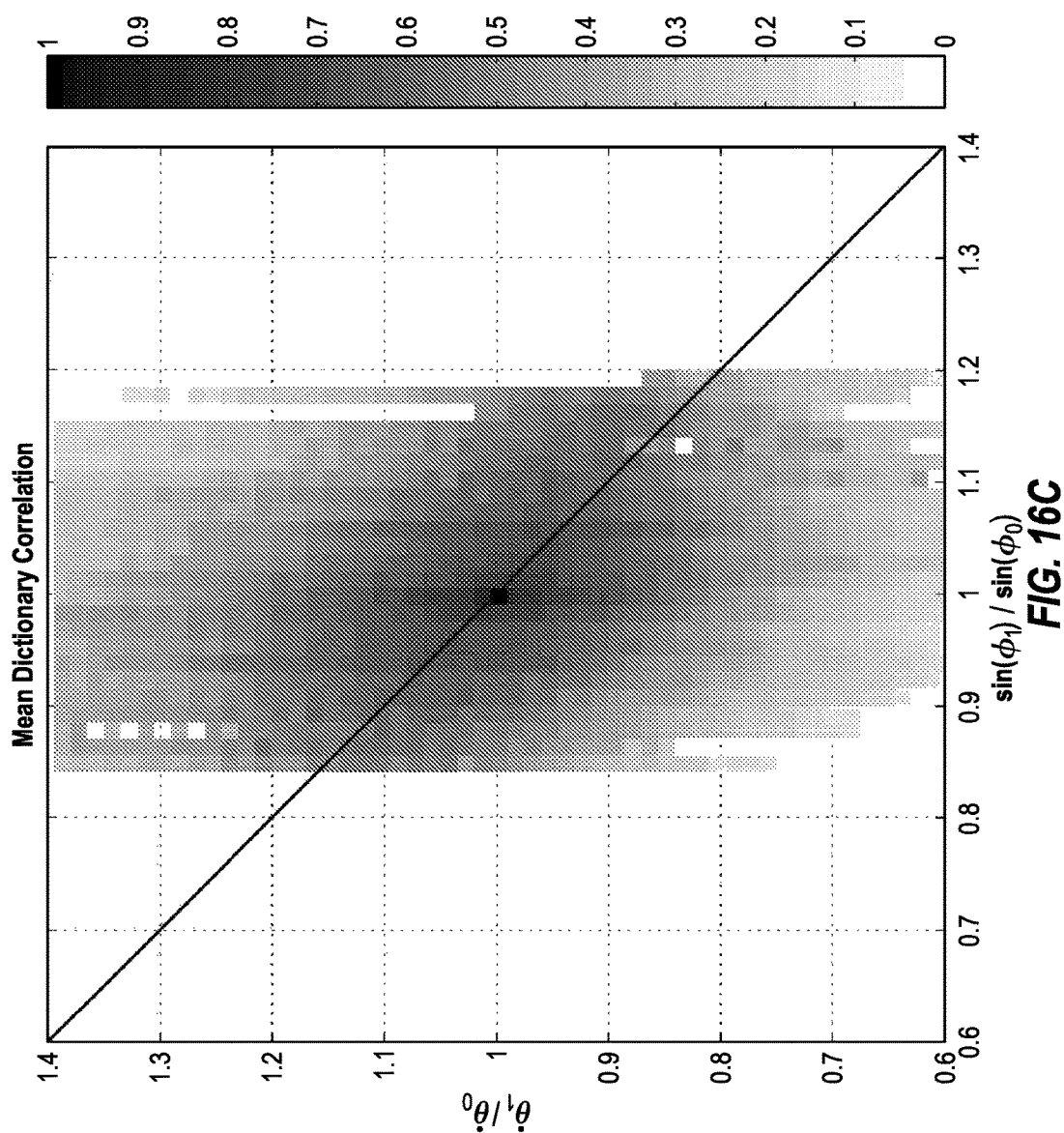
Figure 17A:
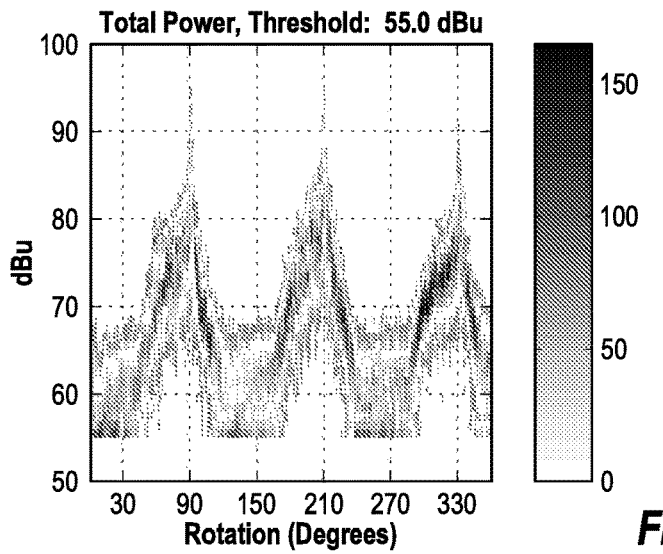
FIGS. 17A-17I provide histograms of the spectral moment estimates of the power, mean velocity, and spectrum width in accordance with an embodiment.
Figure 17B:
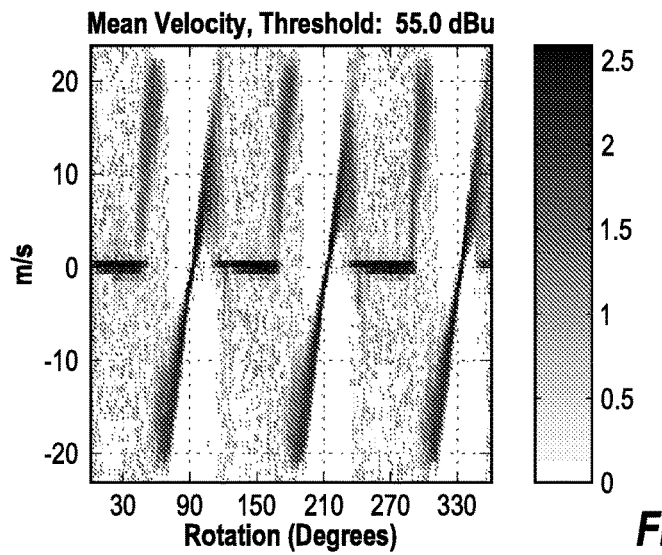
Figure 17C:
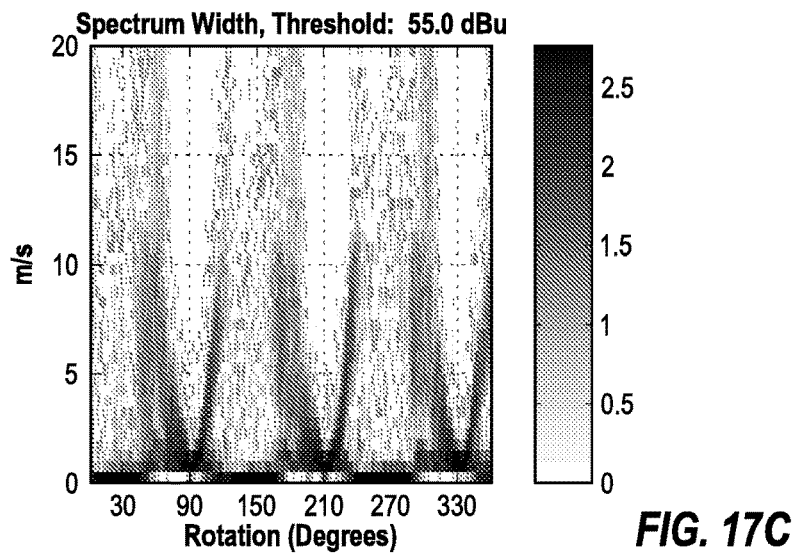
Figure 17D:
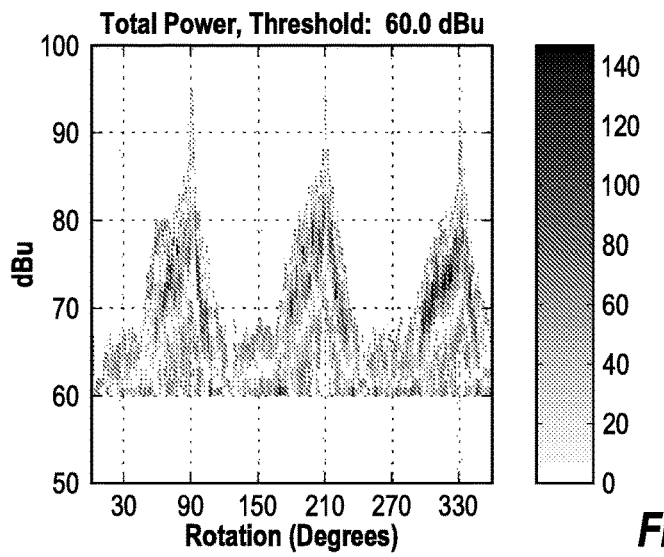
Figure 17E:
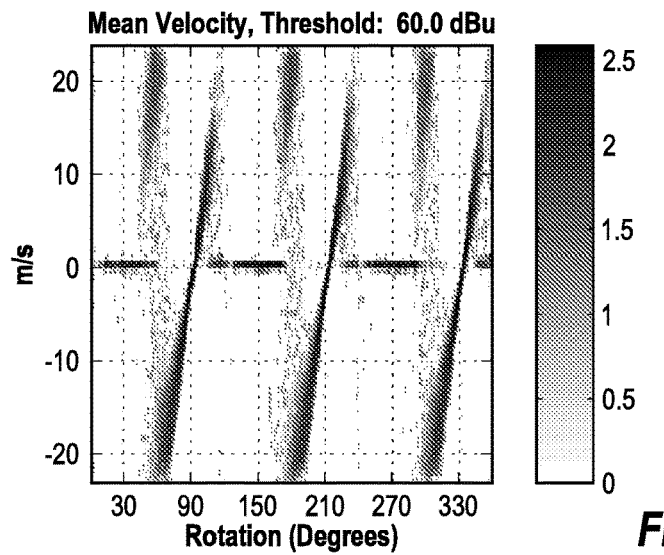
Figure 17F:
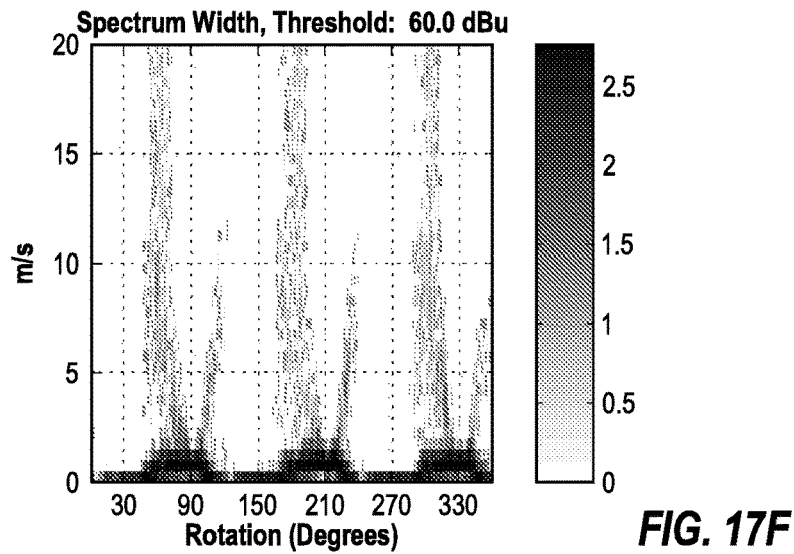
Figure 17G:
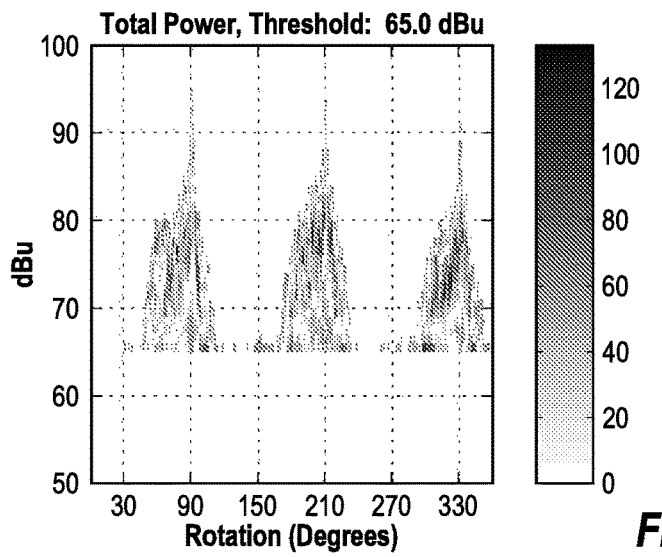
Figure 17H:
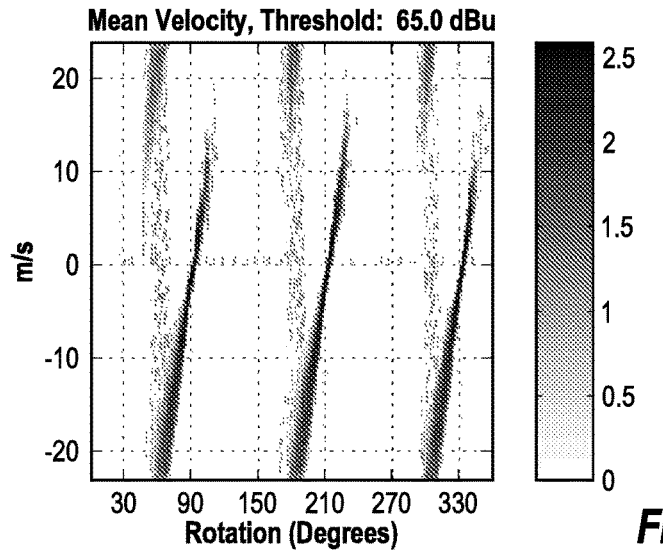
Figure 17I:
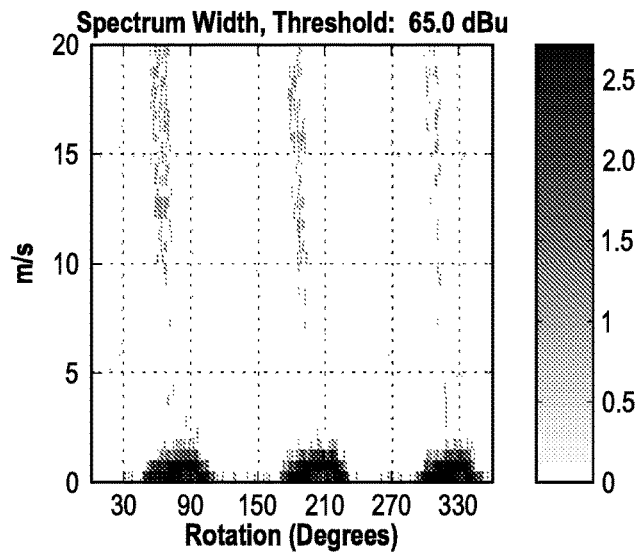
Figure 18A:
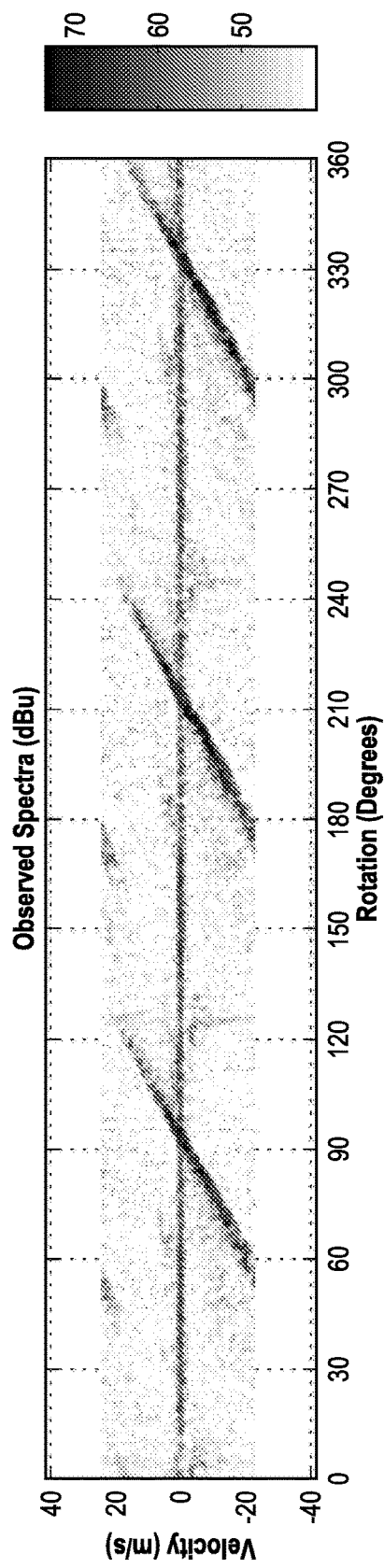
Figure 18B:
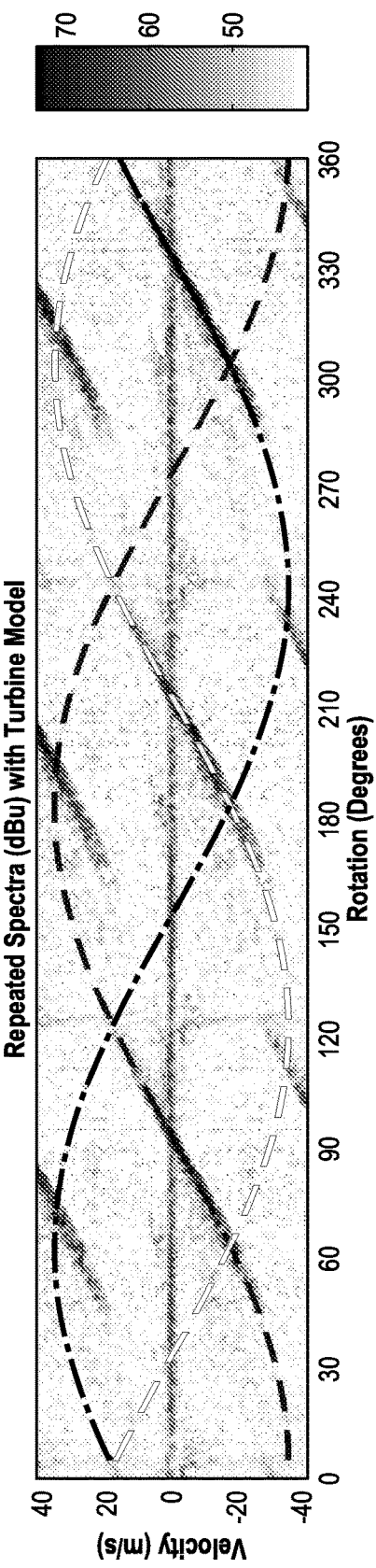
Figure 18E:
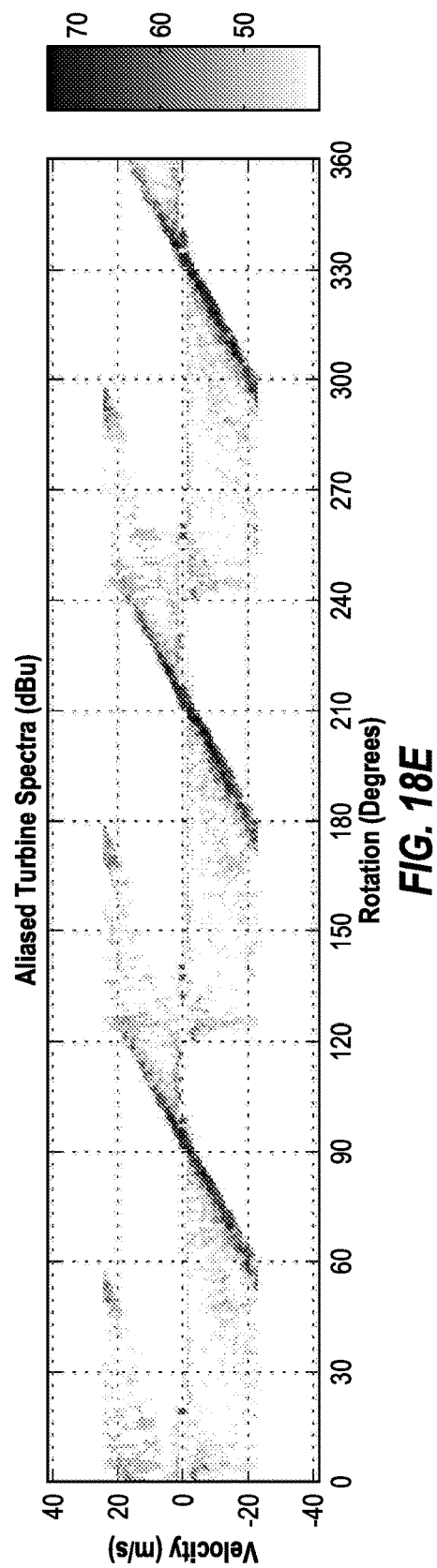

FIGS. 16A-16C show the correlation of a plurality of dictionaries (with the dictionaries' means subtracted). FIG. 16A shows the effect of changes in the relative yaw angle on the correlation of the spectra. Similarly, 16B highlights how changes in the rotation rate affect the spectral signature. The translation of the RCS due to yaw changes, as shown in FIGS. 14A-14D, affect the correlation, but the velocity scaling (due to changes in the yaw or rotation rate) is expected to be more significant (see FIGS. 12A-12F). FIG. 16C compares the correlation of the dictionaries as a function of changes in the yaw and rotation rate. The black line represents a "constant velocity" relationship, and the correlation of the dictionaries matches the trend given by Equation 16.

Given a spectra S, the total echo power, radial mean Doppler velocity, and spectrum width can be estimated. The total echo power (the zeroth moment of S) is $$\hat{P} = \Sigma S[k], \qquad (17)$$

where K is the length of S. The radial mean Doppler velocity (the first moment of S), in meters per second, is $$\hat{v} = \frac{\sum S[k]v[k]}{P}, \qquad (18)$$

where v represents the velocity of the spectra's bins. The spectrum width, the square root of the second central moment of S, is given by $$\hat{\sigma}_v = \sqrt{\frac{\sum S[k](v[k] - \bar{v})^2}{P}}, \qquad (19)$$

which has units in meters per second.

These three spectral moments can be used to characterize a wind turbine's radar signature. For the estimation of these moments, three different thresholds for the spectral power are considered to "isolate" the turbine's signature. (Note that the velocity and spectrum width spectral estimators are sensitive to noise and Doppler velocity aliasing.) Results of the spectral moment estimation for three representative power thresholds are shown in FIGS. 17A-17I, which are histograms of spectral moment estimates of the power (17A-17C), mean velocity (17D-17F), and spectrum width (17G-17I). The histograms (each shown as the logarithm of the number of occurrences) are presented as a function of the turbine's rotation angle and are estimated for all of the complete dictionaries. Three thresholds for the spectral power are used prior to estimation of the moments (and each set of moments is in a column for the various thresholds). As expected, the variations of the mean velocity and spectrum width estimates are reduced as the power threshold increases. Effects from the velocity aliasing are readily observed. Rotation angles where the mean Doppler velocity is near zero generally correspond to the rotation angles where there is no significant echo power from the wind turbine blades and the observation is dominated by stationary scatterers (such as ground clutter). The spectrum widths for rotation angles where the blade's echo is largest are typically within 2 m/s (see FIG. 17I). Doppler aliasing and/or weaker echoes from the turbine blade can result in more significant spectrum width estimates that exceed 10 m/s (see FIGS. 17C and 17F). (Note the three-blade symmetry (i.e., 120-degree rotation) in all moments.)

The maximum blade-tip velocity of the representative turbine, implemented as a CART3 turbine in an example embodiment, (at the rated speed of 37 RPM) is 77.5 m/s. This peak velocity may be observed with either a positive or negative sign, and it may exceed the unambiguous velocity of a representative X-band radar (and, in fact, for most precipitation radar). The overall effect on the observed wind turbine signature is that the signature may be aliased in the Doppler spectra (and possibly overlapping itself). This aliasing further complicates effective suppression of the wind turbine's signature when simultaneously observed with other scatterers (such as precipitation or ground clutter).

In FIGS. 18A-18E, the rotational RCS turbine model is considered as a means to select and isolate the turbine's signature. With the model's mean blade velocity ($\hat{v}_x$, where x is the blade number), additional constraints on the spectrum width ($\hat{\sigma}_v$), and estimates of the background spectral noise power, the wind turbine's signature can be more effectively isolated. For the example case the turbine's yaw angle relative to the radar is 60 degrees, and its rotation rate is 21 RPM. The turbine signature is selected with $\hat{v}_x \pm \hat{\sigma}_v$, where $\hat{\sigma}_v = \pm 5$ m/s and the region from $\hat{v}_x$ to 0 m/s is also retained (because the rest of the blade is moving within this spectral range). (A spectrum width of $\hat{\sigma}_v = 5$ m/s was selected for this case as a compromise based on the observed spectrum widths for the regions with peak RCS in FIGS. 17A-17I.)

For the observation geometry of this case, to further isolate the wind turbine from other scattering signatures, constraints were placed on the absolute rotation angle of each blade for which echo power was expected. For blade 1 (black dashed line in FIGS. 18B and 18C), only rotation angles from 0 to 140 degrees are kept. For blade 2 (black dash-dot line in FIGS. 18B and 18C), it is 240 to 20 degrees (wrapping at 360 degrees), and blade 3 (white dash line in FIGS. 18B and 18C) is 120 to 260 degrees of rotation in order to mitigate aliased spectra for rotation angles where significant echo power is not expected (note that these constraints are observation geometry-dependent). The noise power is estimated as the median power (in dB) of all the spectral bins to be 46.07 dB. Similarly, the median ground clutter power is 59.73 dB (applied to the zero-Doppler velocity). For areas where the spectral powers do not exceed these respective limits, the spectra are discarded. To further reduce spectral estimation "noise", if either neighboring velocity bin within a spectra is omitted using the noise or ground clutter power thresholds, the bin is also ignored.

In FIGS. 18A-18E, the blade's "flash" signature is faintly observed. The reduced echo power of the flash is likely attributed to being observed outside of the antenna's −6 dB mainlobe. (The antenna's pointing angle is likely not centered on the turbine's hub, and the antenna's beamwidth does not encompass the entire swept area of the turbine.) Although the representative wind turbine's physical structure is not exactly the same, the spectral shape exhibits similar characteristics (namely, the blade tips' "halo") as those observed in observations of other commercial turbines, numerical simulations, and scale model observations. As mentioned, the lack of a significant RCS blade flash in these signatures is attributed to the observation geometry (i.e., it is not in the antenna's mainlobe) rather than the turbine's structure.

Figure 19A:
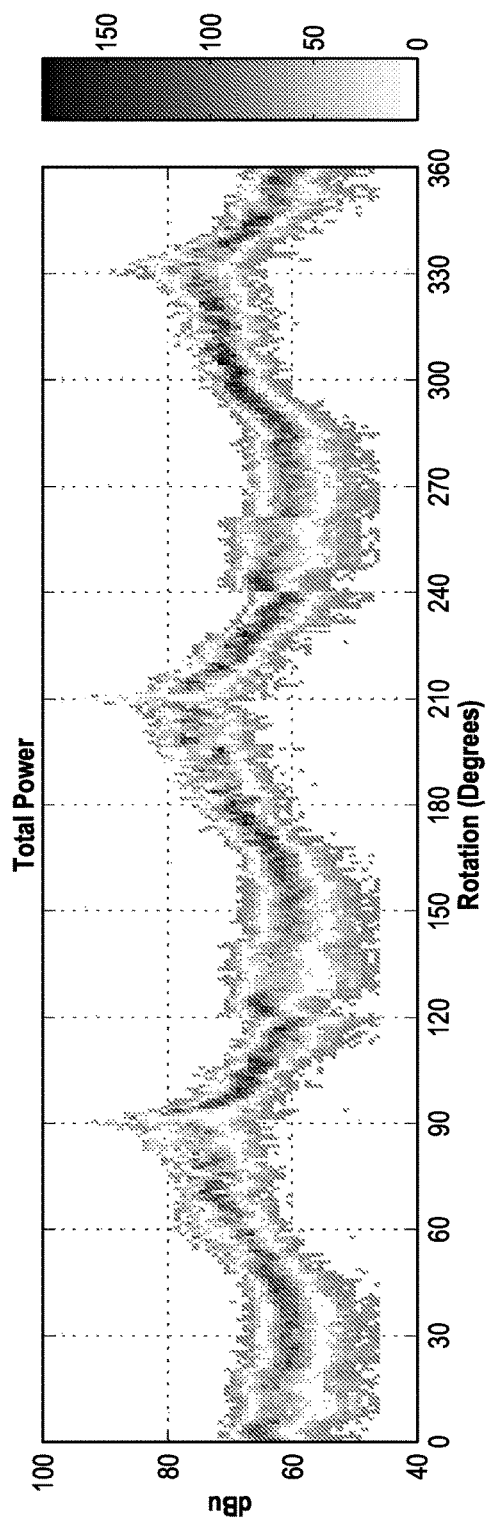
FIGS. 19A-19C provide histograms of spectral moments estimated from the dictionaries after the velocity is unwrapped and a representative wind turbine signature is isolated, leveraging the state telemetry and observation geometry.
Figure 19B:
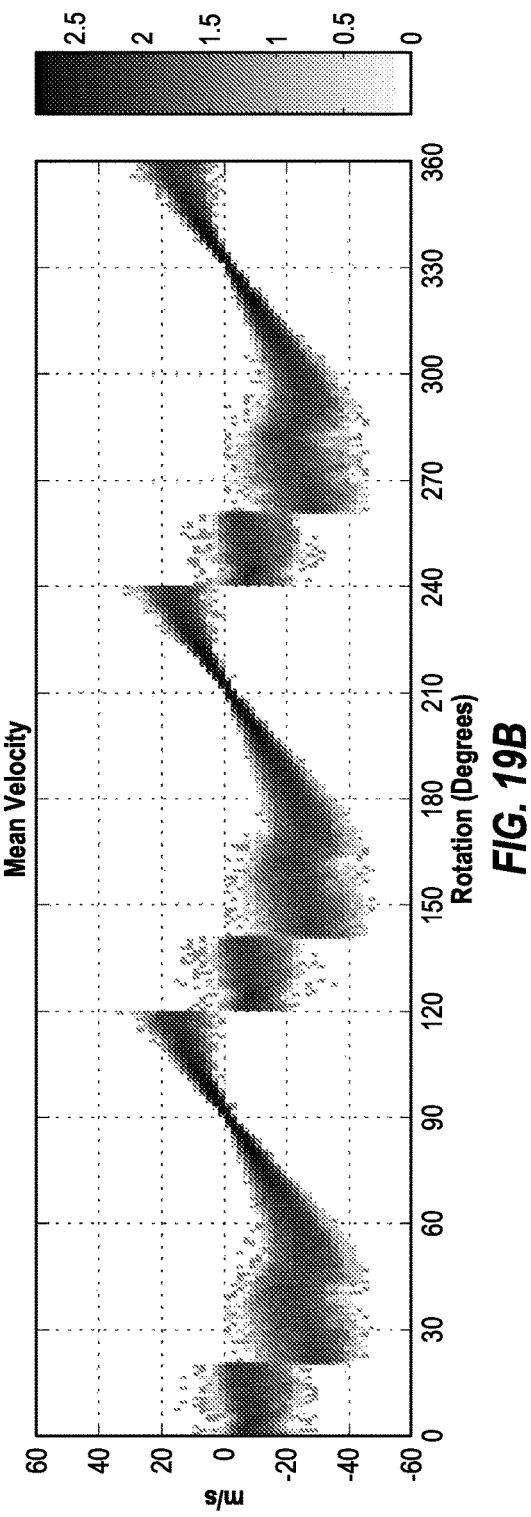
Figure 19C:
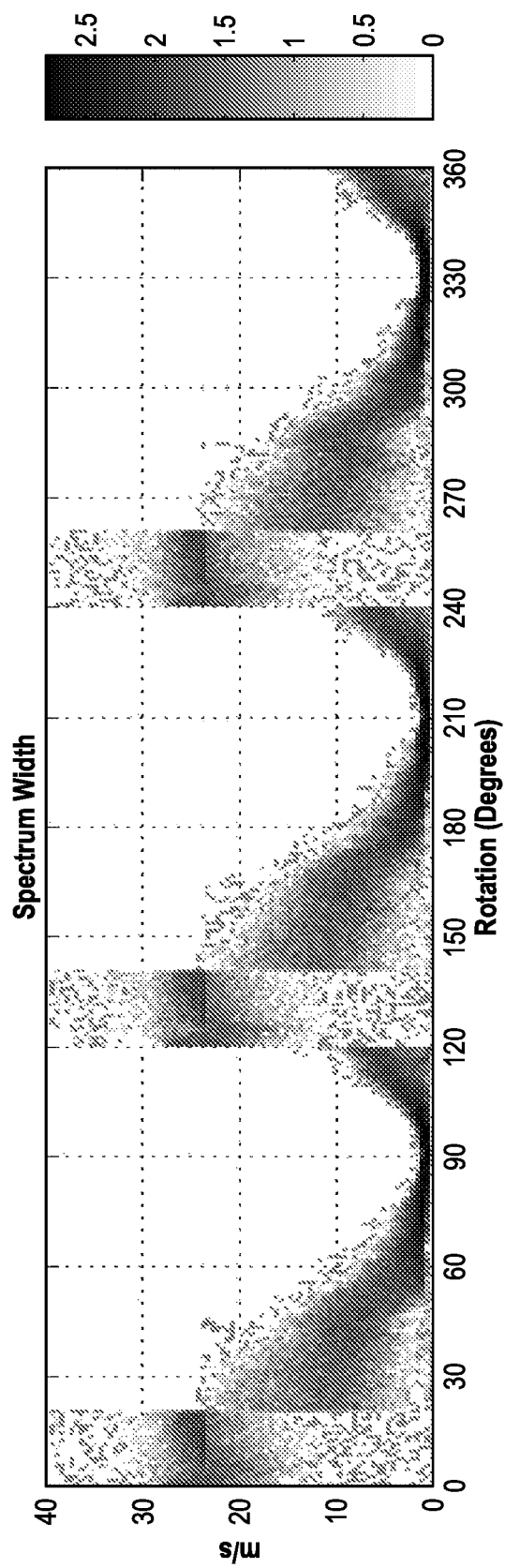

The spectral moments presented in FIGS. 17A-17I are not compensated for aliasing, and the only censoring performed to help isolate the wind turbine's signature is a threshold on the spectral echo power. Using the turbine signature selection technique described here, the spectral moments were recalculated after de-aliasing (i.e., velocity unwrapping) and isolating the wind turbine signature using the turbine model based on its telemetry and the observation geometry. The moment estimates in FIGS. 19A-19C are still censored using the noise power and ground clutter power as before. Comparing FIGS. 17A-17I and 19A-19C shows overall narrower distributions of the spectral moments for all dictionaries. Some discontinuity in the moments (as a function of the rotation angle) is apparent due to the turbine signature isolation technique. For areas of high spectrum width ($\sigma_v$>20), the blade flash is present, or the observation does not contain any significant echo feature (i.e., it is effectively noise, as shown in FIGS. 18A-18E). As the blade's observed RCS increases and becomes significant, the spectrum width decreases, and the mean velocity closely matches the expected velocity ranges for the blades. Again, note the three-blade symmetry in all moment estimates.

A wind turbine's radar signature has been shown to be deterministic for a given state. Errors in the estimated RCS for a given state may still exist in spectral observations but are largely due to unknown or uncompensated for state variables, which may include gravity and wind-induced bending (i.e., blade flex) and turbine motion. Where a wind turbine has relatively short steel blades, as compared to longer, composite blades on larger turbines, the blades are less subject to deformation from dynamic forces during operation.

Two techniques leveraging a turbine's state telemetry are considered to suppress the wind turbine's radar signature. The first uses prior spectral observations in the form of a dictionary. The second technique relies on a simplified scattering model of the turbine as shown above. Both of these techniques can be evaluated for a fixed-pointing observation mode as well as a scanning mode. In the examples that follow, for a fixed-pointing mode of operation, the characterization of the representative turbine and the turbine observations to be suppressed are from the same radar observation volume. For the scanning radar cases, the turbine's signature may not be contained in the volume under observation, or the magnitude of the observed signature may be modified by the antenna's pattern.

Suppression of a wind turbine's signature in an observation spectra ($S_x$) can be achieved using an inverse filter. With the wind turbine's state telemetry, the filter basis can be selected from prior observations of the same state (i.e., a dictionary). With the appropriate dictionary spectra ($S_D$), the filtered spectra ($S_f$) with the wind turbine suppressed, is $$S_f = \frac{S_x}{S_D} = \frac{S_s + S_D}{S_D} = \frac{S_s}{S_D} + 1, \quad (20)$$

where $S_s$ is the signal's spectra. (The signal may be any signature that is not a wind turbine or noise.) Note that here, the dictionaries' spectra include both clutter and noise spectral power ($S_D = S_c + S_n$). The resulting spectra, $S_f$, closely represents a signal-to-noise ratio (SNR). The inverse filter, in logarithmic units, is a simple subtraction:

$$S_f^{(dB)} = 10\log_{10}\left(\frac{S_x}{S_D}\right) = S_x^{(dB)} - S_D^{(dB)}. \quad (21)$$

If the propagation channel and turbine are unchanged, no additional scaling or modification to the dictionary is required before being used as $S_D$.

Figure 20C:
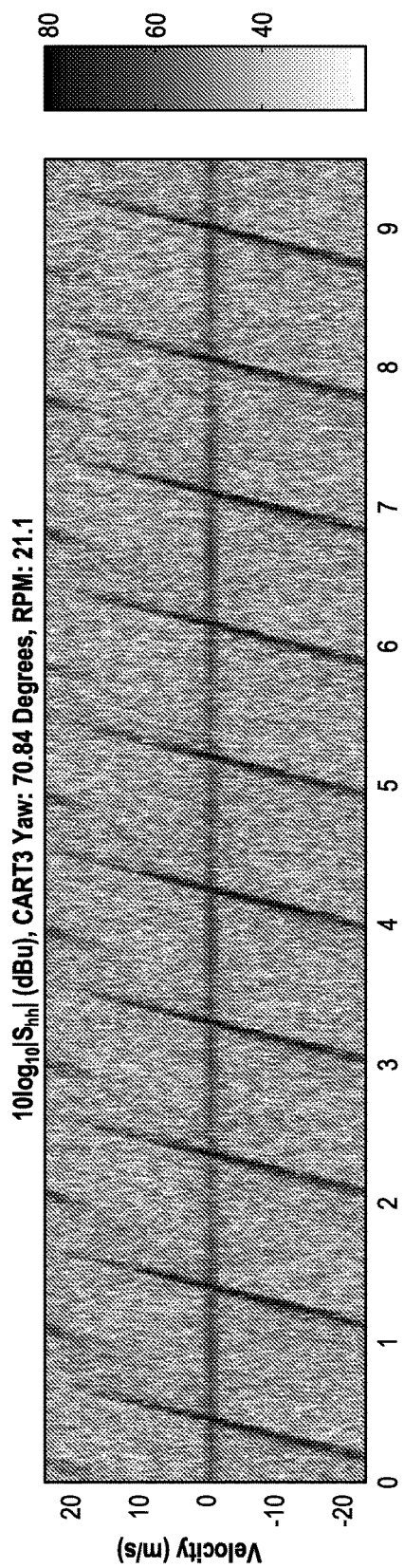
Figure 20D:
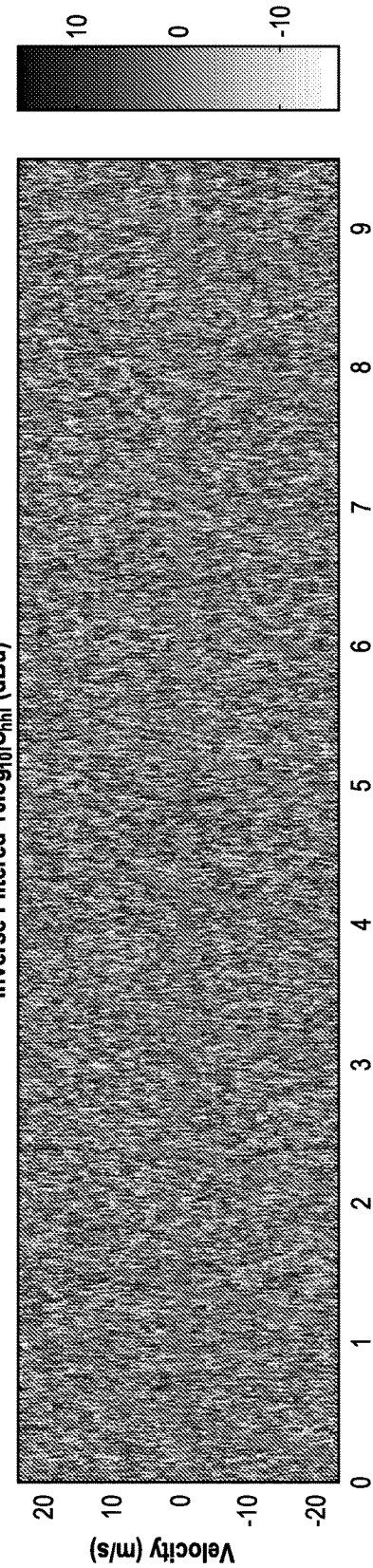

FIGS. 20A-20D show fixed-pointing observations of a wind turbine in a near constant state. FIG. 20C is a 9.5-second, fixed-pointing observation of the turbine while its state is nearly constant (except for the rotation angle). The dictionary (the mean of the spectral power observations in decibels) for the same rotation rate and yaw angle, as a function of the rotation angle, is shown in FIG. 20A. Similarly, the standard deviation of the spectral observation used to create the dictionary (in decibels) is included in FIG. 20B. The low standard deviations where the turbine's signature has the highest power highlight the consistency of the RCS observations. (Compare these areas to those dominated by noise and represented by higher standard deviations in the spectral observations.) Using the telemetry from the turbine, the dictionary is directly referenced to suppress the turbine's signature. The resulting inverse-filtered spectrogram is presented in FIG. 20D. Again, recall that the result of the inverse filter is an SNR-like result. The filtered spectrogram shows a near 0 dB residual power, indicating excellent suppression of the wind turbine signature for this case.

Figure 21A:
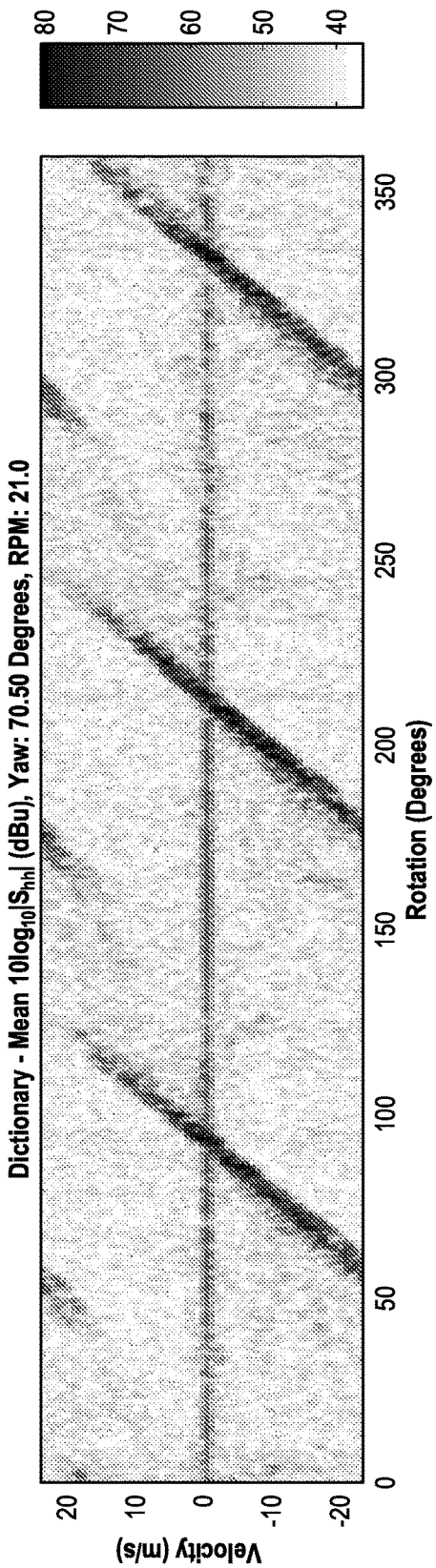
FIGS. 21A-21D show a 3-degree-per-second scan in azimuth of an example three-blade controls advanced research turbine (CART3) with the CART3's signature suppressed using a dictionary derived from fixed-pointing observations of the same state in accordance with an embodiment.
Figure 21B:
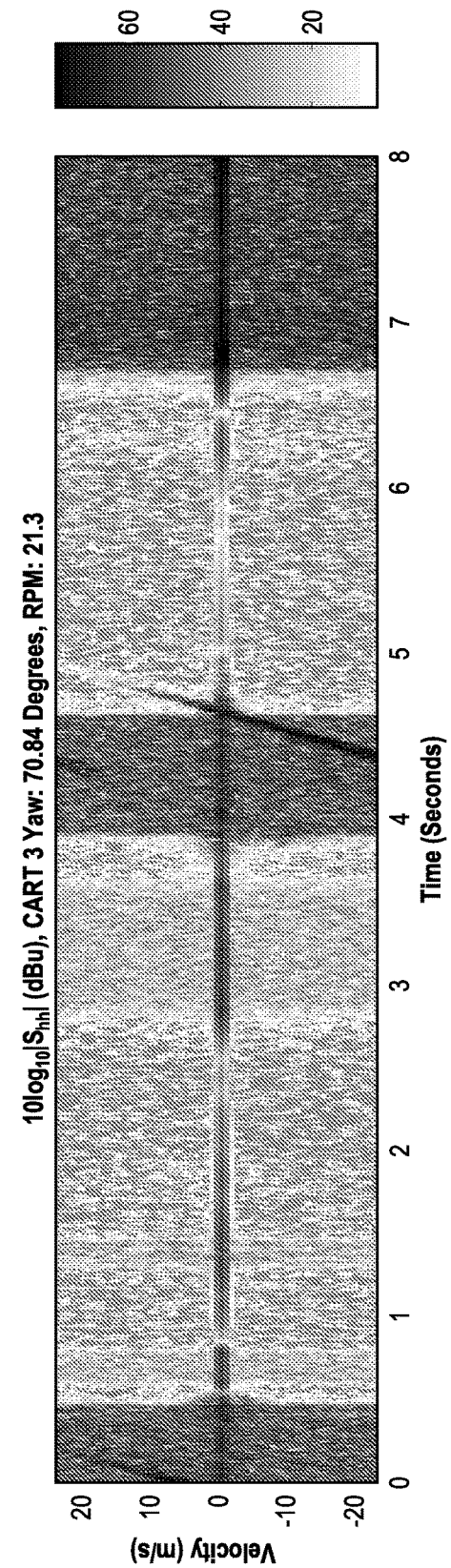
Figure 21C:
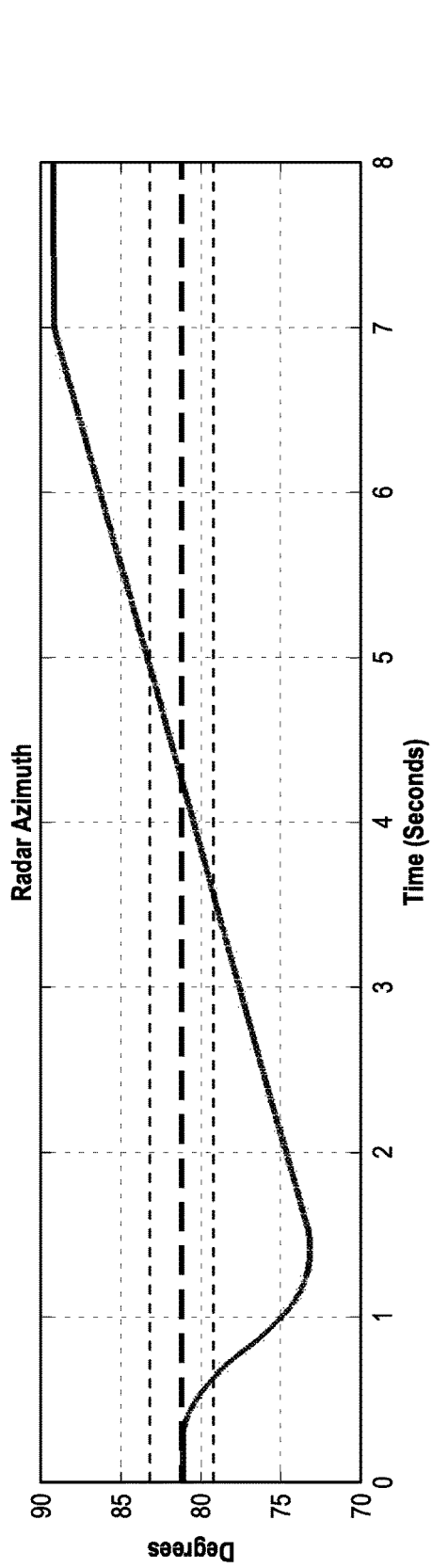
Figure 21D:
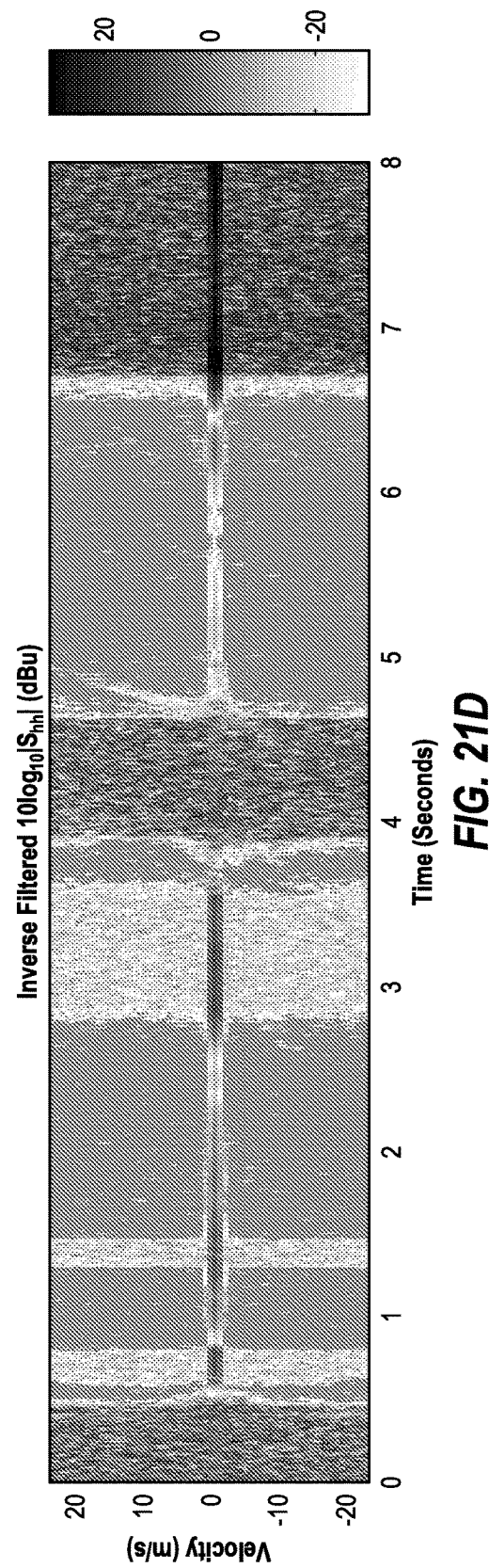

FIGS. 21A-21D show a 3-degree-per-second scan in azimuth of a representative wind turbine with the turbine's signature suppressed using a dictionary derived from fixed-pointing observations of the same state. In FIG. 21B, the radar is scanned in azimuth at 3 degrees per second. The radar's elevation is held constant at the same used for fixed-pointing observations (1.3 degrees). When no precipitation was present during the observation the turbine's state was nearly constant. The dictionary used for suppression is derived from fixed-pointing observations (FIG. 21A) and is representative of the same turbine states during the scan. Because the radar is scanning, the antenna's beamwidth acts as a "window" for the observed volume, and therefore, only ±2 degrees in azimuth around the turbine's azimuth (see FIG. 21C) use the dictionary for suppression. The remaining observations are suppressed by the noise power estimated from the dictionary. The noise power is estimated by the median of the logarithmic power of all spectral bins to be 44.34 dB. FIG. 21D shows the filter results after suppression of the wind turbine signature and the dictionary-estimated noise power. (Note that, in reality, the noise power is azimuth-dependent.) The wind turbine's signature is almost completely suppressed. A slight feature that resembles a residual signature of the wind turbine is seen between 4.5 and 5 seconds. This is an artifact of the change in noise power, and the residual SNR for this is less than 0 dB (indicating it has been suppressed).

Figure 22A:
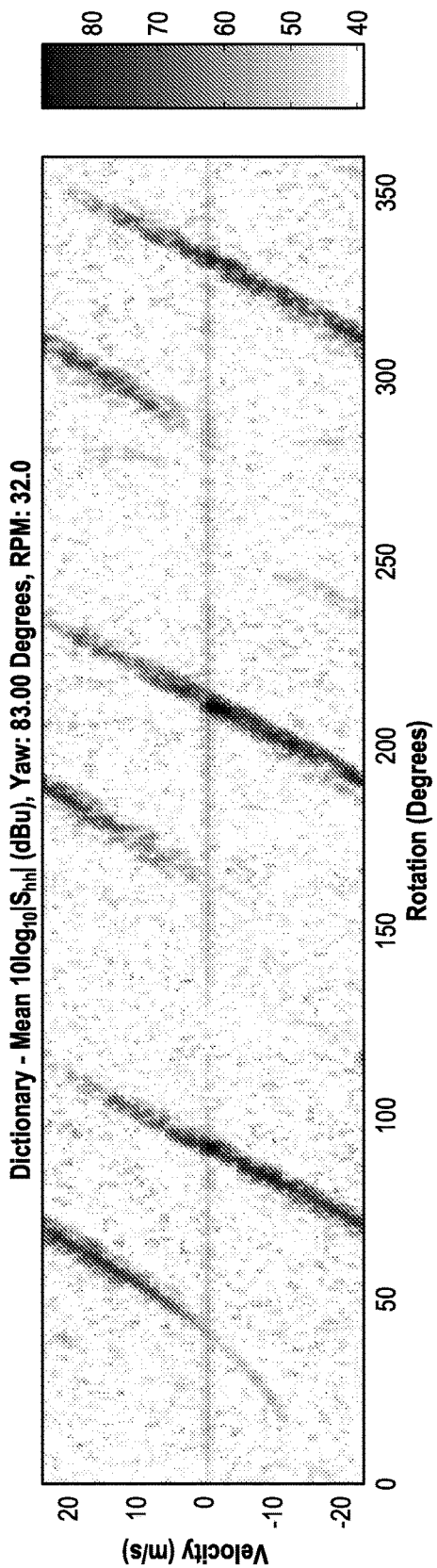
FIGS. 22A-22D show a scanned observation of the CART3 with precipitation using a dictionary used for suppression from a nearby state that exhibits similar velocity ranges in accordance with an embodiment.
Figure 22B:
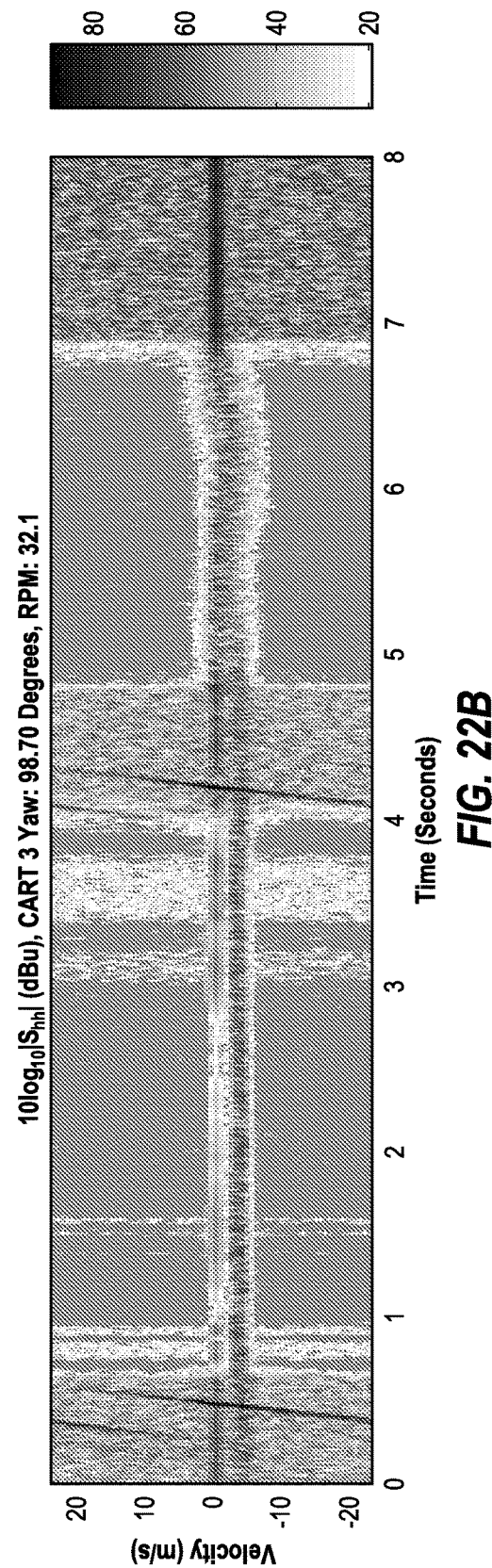
Figure 22C:
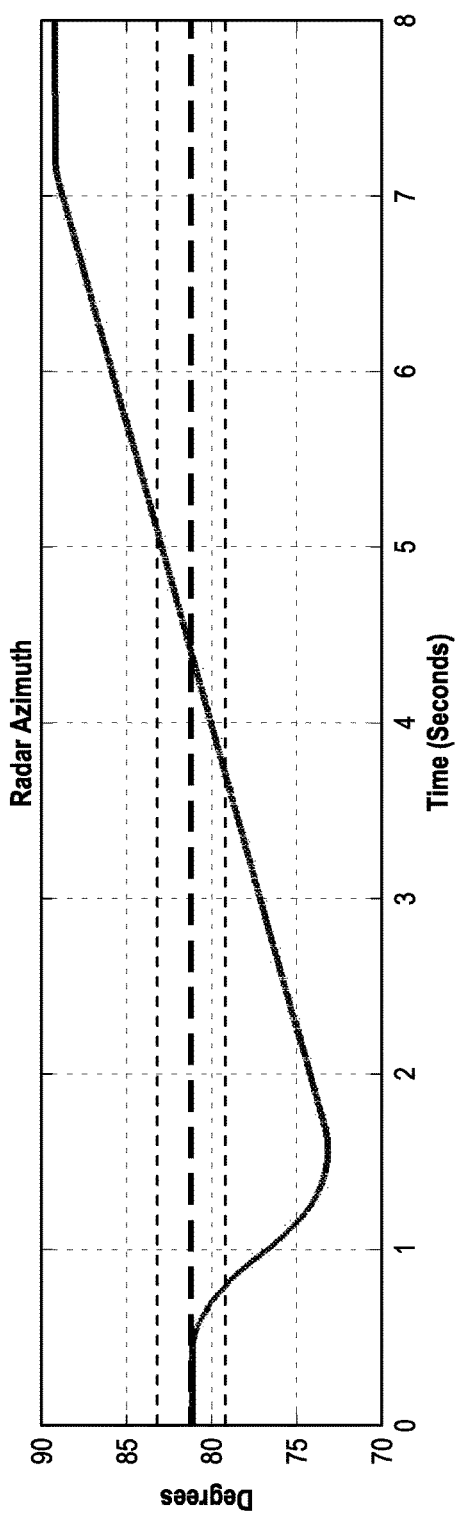
Figure 22D:
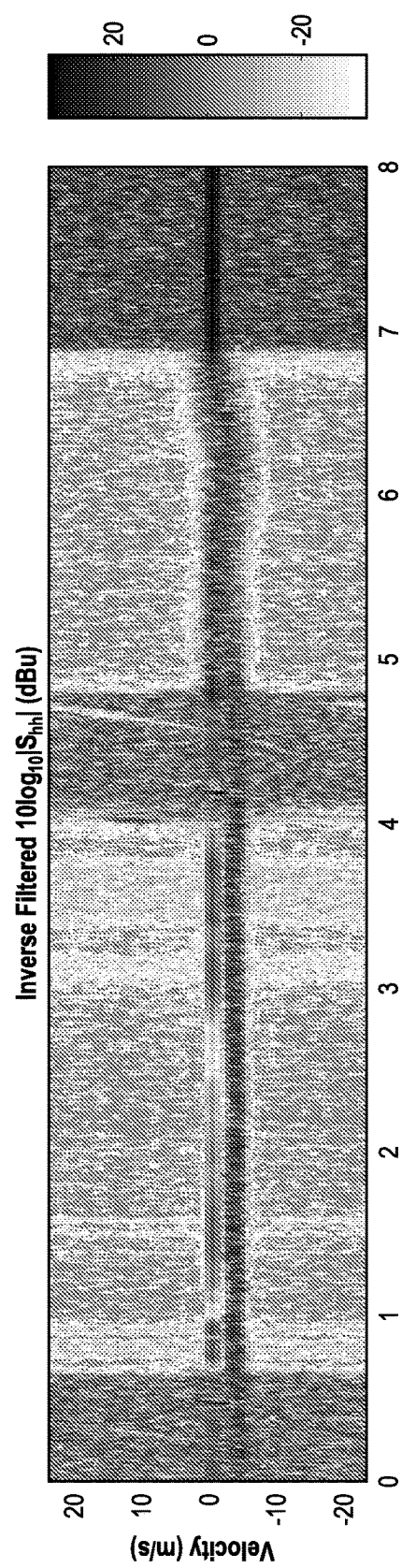
Figure 23A:
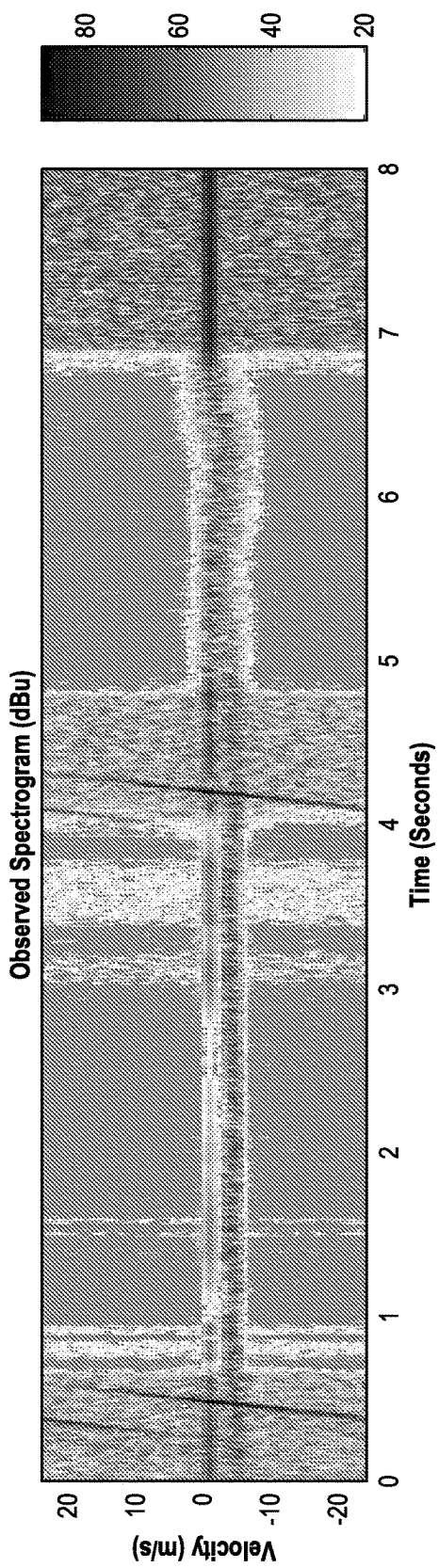
FIGS. 23A-23D provide before and after spectral moment estimates for the observations and filter results presented in FIGS. 20A-20D in accordance with an embodiment.
Figure 23B:
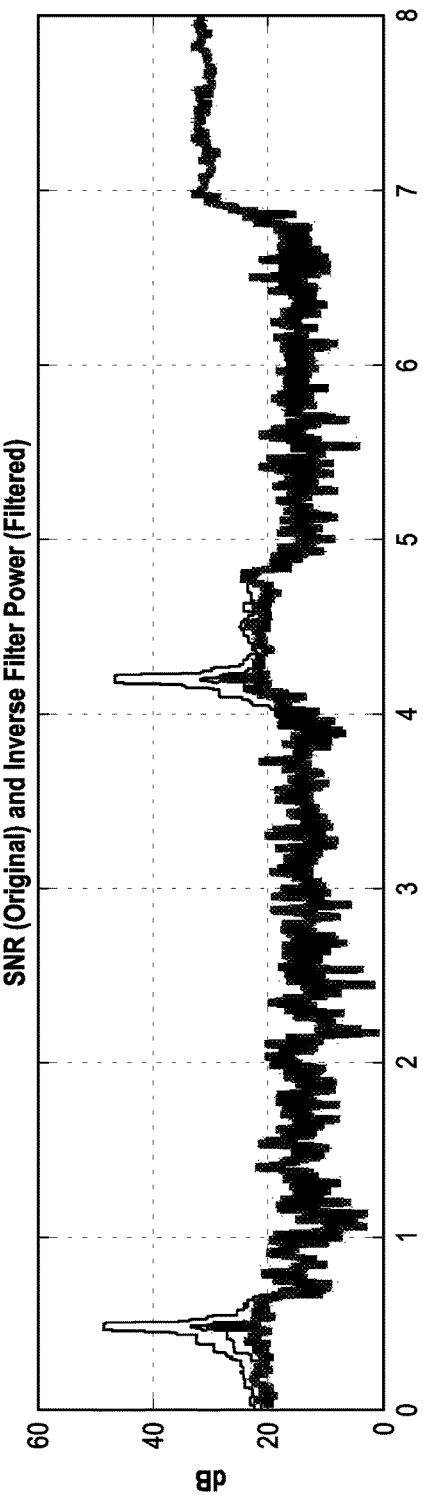
Figure 23C:
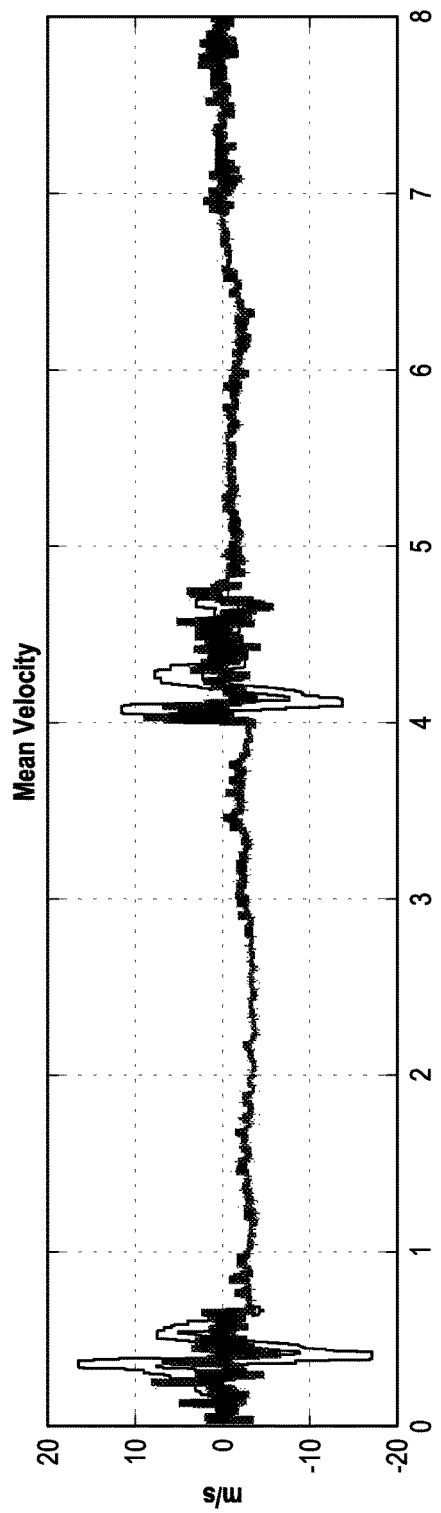
Figure 23D:
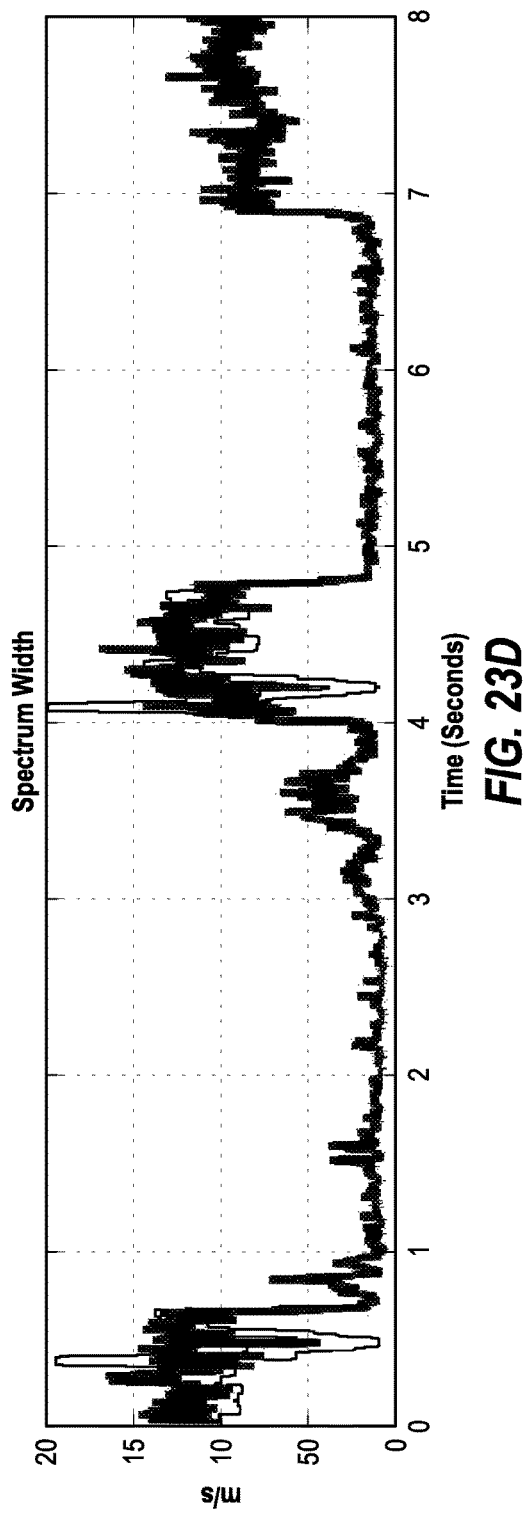

FIGS. 22A-22D show a scanned observation of a representative wind turbine with precipitation using a dictionary used for suppression from a nearby state that exhibits similar velocity ranges. FIG. 22B shows a 3-degree-per-second scanning case with snow in the observation volume. The effects of a mismatched dictionary are considered here. During the scan, the turbine operated at a relative yaw angle of 98.7 degrees and rotation rate of 32.1 RPM. No dictionary was available at this state, but a nearby state was available, with a relative yaw of 83±1 degrees and RPM of 32±0.5 (FIG. 22A). This state was selected following the relationship presented in Equation 16. To compensate for the difference in state, 1.0 degrees was added to the turbine's rotation angle for the scanning observations prior to lookup in the dictionary. This adjustment is approximated using Equation 13 and FIGS. 14A-14D. The noise power was estimated to be 44.84 dBu. For this case, only azimuths within ±1 degree of the turbine's direction are suppressed with the dictionary. The rest of the observations are normalized by the dictionary's noise power. The filtered result is shown in FIG. 22D. The effects of the mismatch between the turbine's signature at the two states (the scan and the dictionary) can be noticed when considering the near-zero Doppler velocity region around 0.5 seconds and 4.2 seconds.

The effects of applying the dictionary to observations where the turbine is not within the antenna's mainlobe are also observed in the filter result, from 4.5 to 5 seconds. Overall, even with this mismatched dictionary, the turbine's signature is significantly suppressed, with little adverse impact on the filtered spectrogram.

Spectral moment estimates before and after filtering are shown in FIGS. 23A-23D. The powers in 23B are presented as a ratio (SNR-like) because of the inverse filter's structure. Estimated noise power from the dictionary is used to normalize the before-filtering power (blue) and the spectral power from FIG. 22D for the after-filter result (red). The change in noise power during the scan is apparent in all spectral moments (as the noise floor results in an increase in the reflectivity-weighting for the velocity and spectrum width estimates). The turbine's signature is suppressed by 15 dB or more, and both the velocity's and spectrum width's biases are reduced.

Figure 7A:
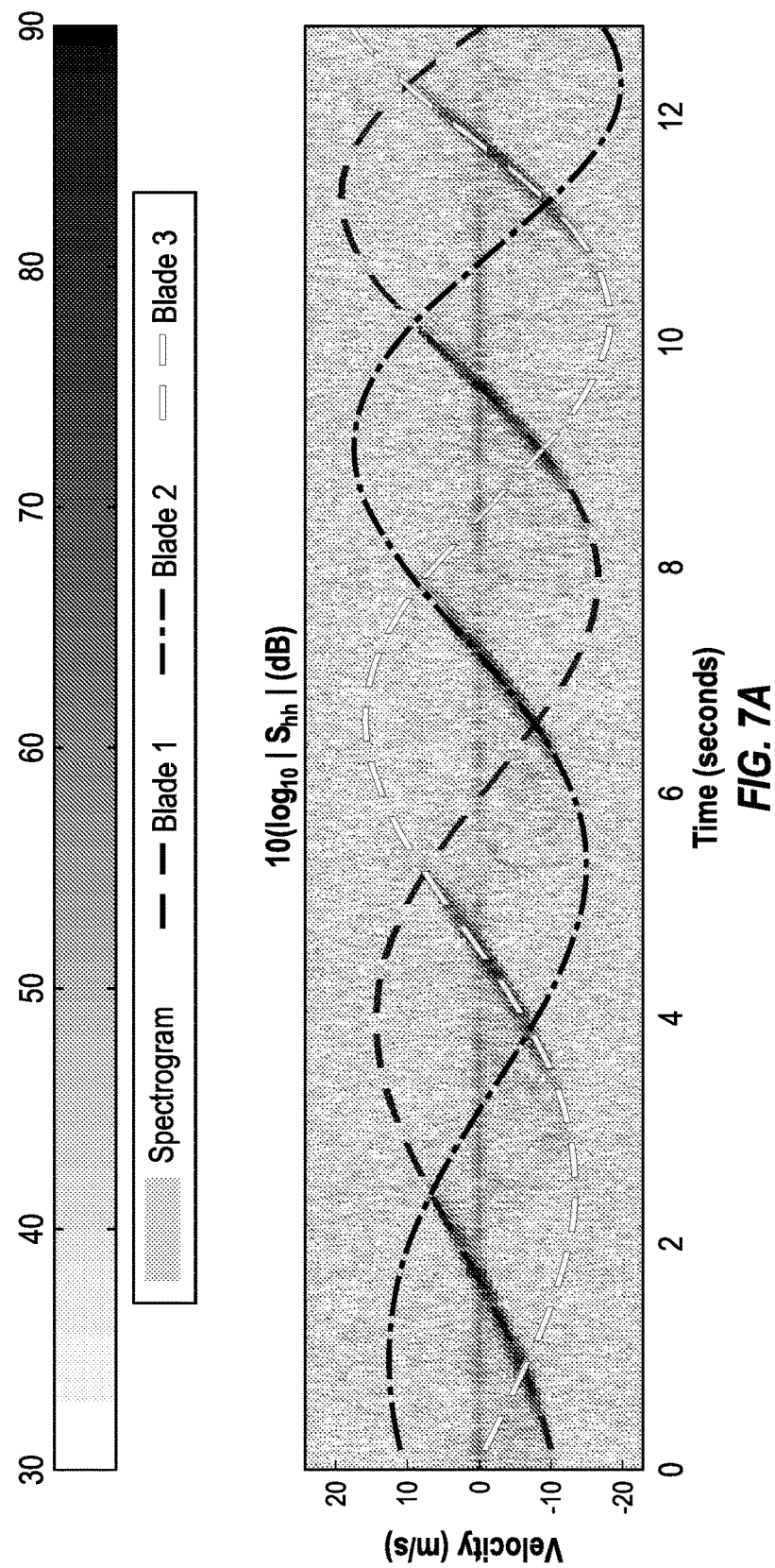
FIGS. 7A-7E show velocity model estimates overlaid on radar observations during a rotation rate ramp-up event for a representative wind turbine.
Figure 7B:
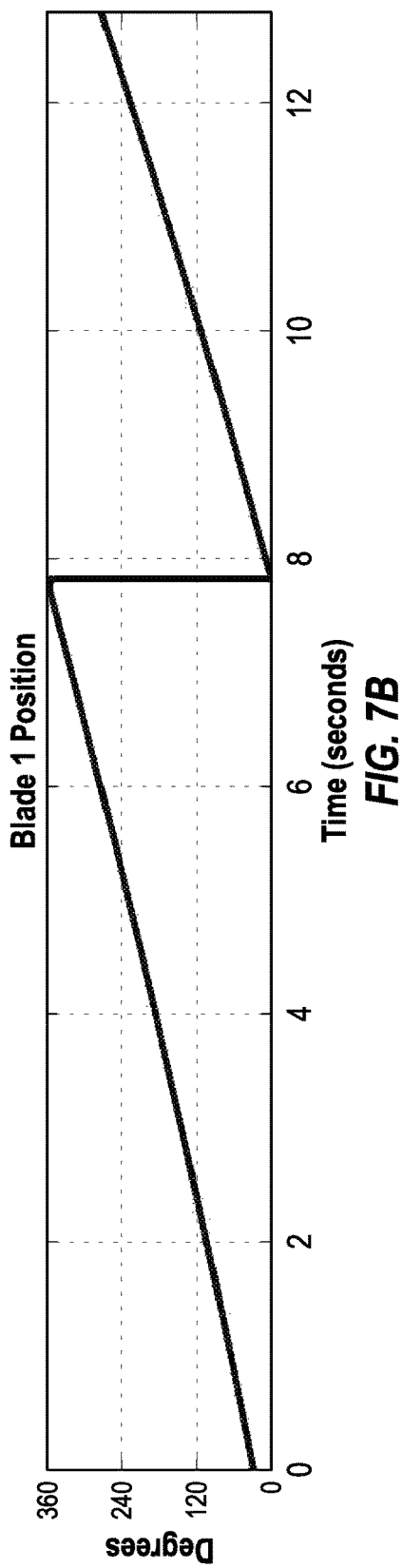
Figure 7C:
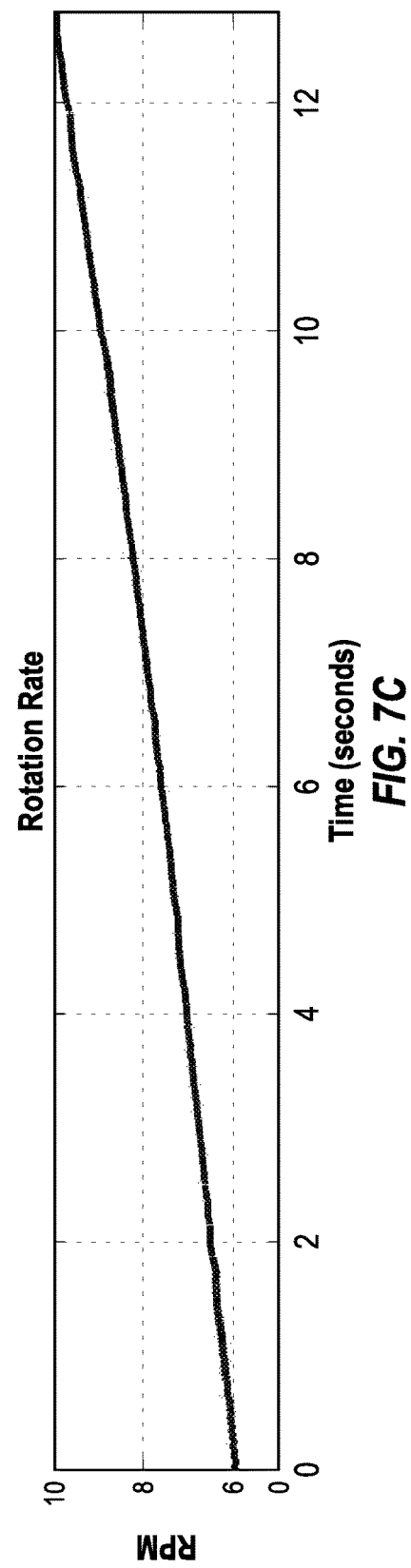
Figure 7D:
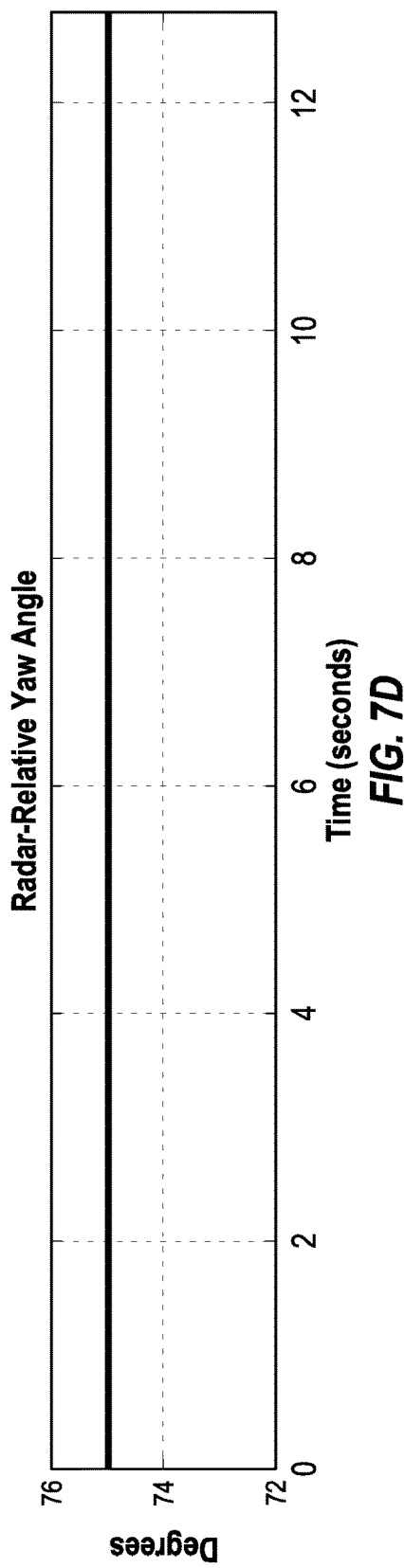
Figure 7E:
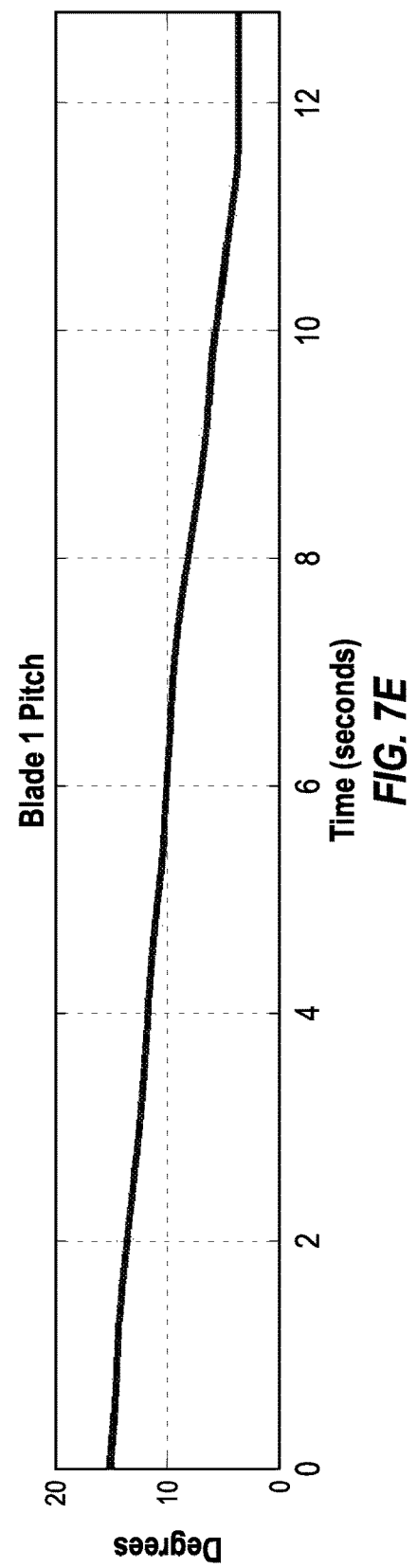
Figure 8:
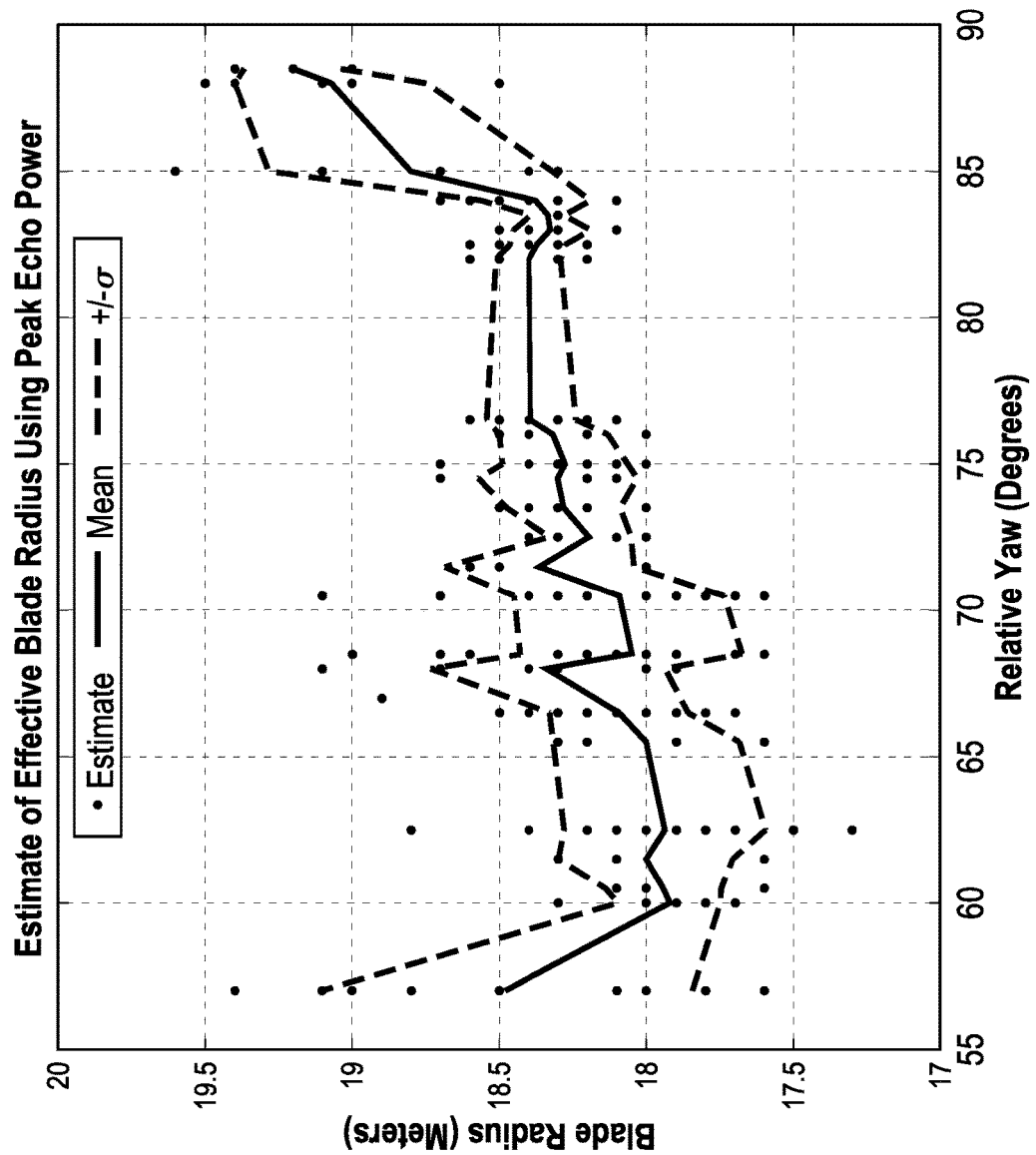
FIG. 8 shows estimates of effective blade radius using full 360-degree rotations for all available yaw and rotation rate states.

The wind turbine model developed with respect to FIGS. 7A-8 is considered to enable suppression of the turbine's signature. With the turbine's state telemetry, a dynamic "notch" filter can be constructed. The rotation limits for isolating the turbine's signature are similar to those discussed above, but the spectra between the blade's velocity and zero-Doppler velocity are not considered as turbine echo. Only the spectral observations within $\hat{\sigma}_v = \pm 7.5$ m/s around the modeled velocity are retained (with constraints on the rotation angle). Again, this region of interest is selected to mitigate the wind turbine's signature within the radar observations without significantly impacting other scatter signatures. Any spectral signature detected as being a wind turbine is replaced with the noise floor estimate, and in this way, it effectively acts as a notch filter.

As an estimate of the noise floor is necessary from previous scanning cases in FIGS. 21A-22D, the noise power is shown to be azimuth-dependent and may vary by more than an order of magnitude. To implement spectra-by-spectra noise estimation, an exponential power distribution for noise is assumed, as well as that a substantial portion of a given spectra is noise-only. The mean ($\mu_y$) for an exponential distribution with value Y at percentile P can be estimated as $$\mu_y = \frac{-y}{\ln(1 - P(y \le y))}. \qquad (22)$$

Estimates of noise power using the fifth to 30th percentiles of the spectra's power (in κ% steps) are averaged to give the final estimate for the spectra's noise power.

Figure 24A:
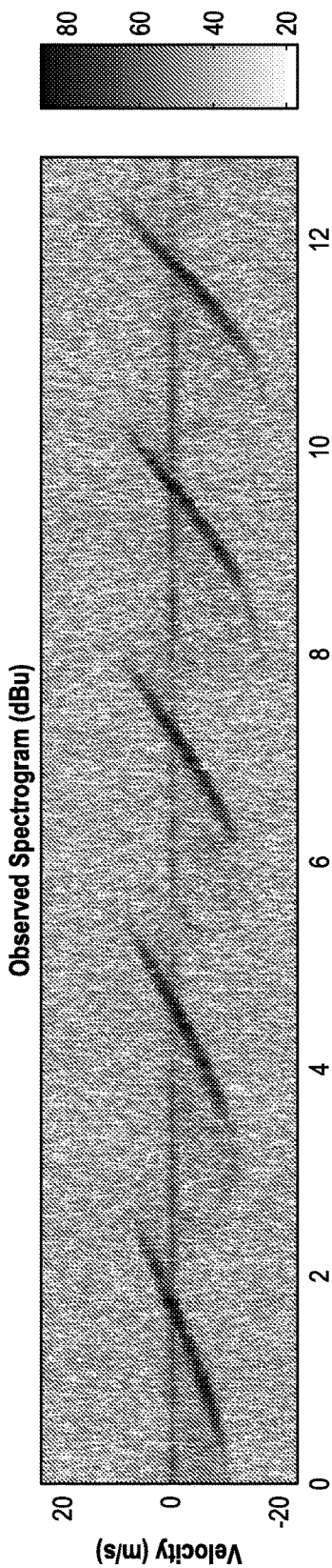
FIGS. 24A-24D provide a representative modeled radar signature in accordance with an embodiment.
Figure 24B:
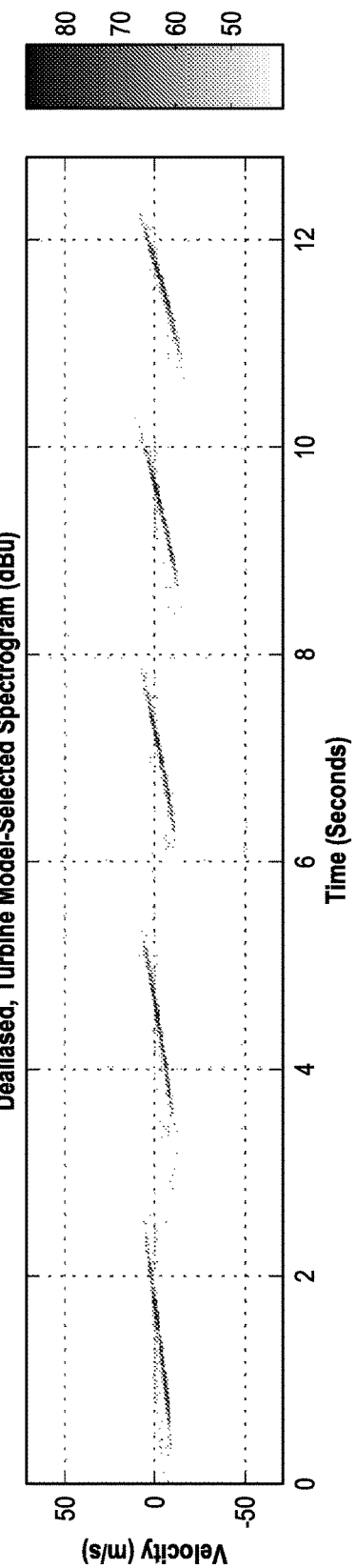
Figure 24C:
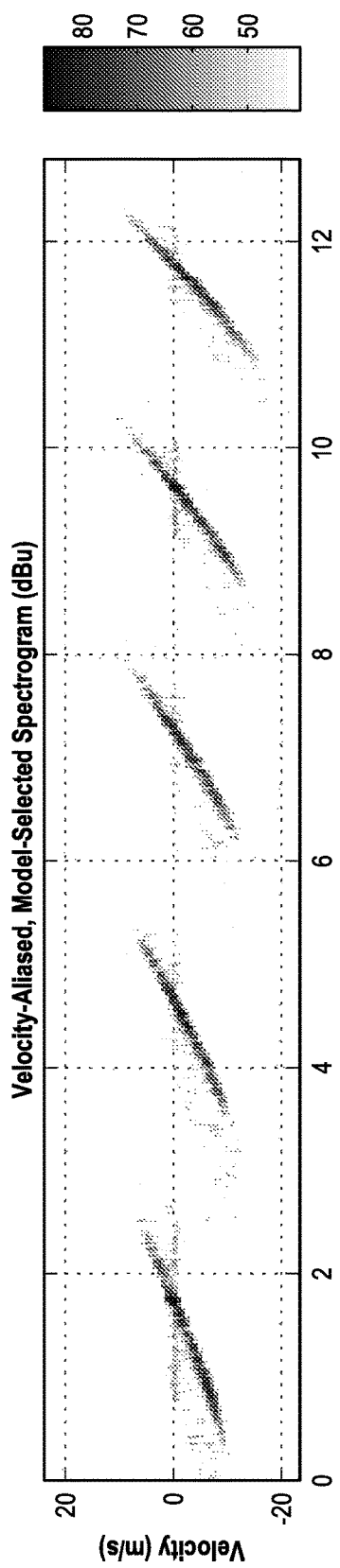
Figure 24D:
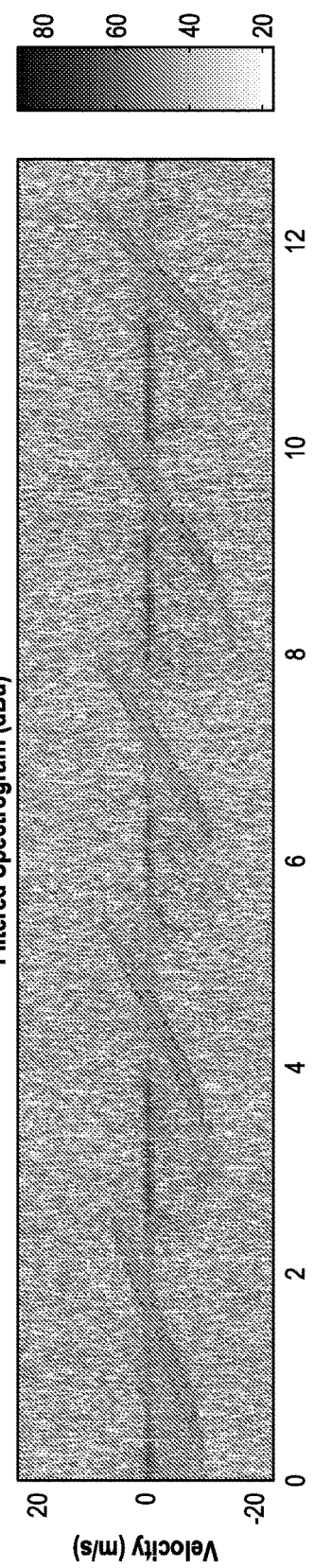
Figure 25A:
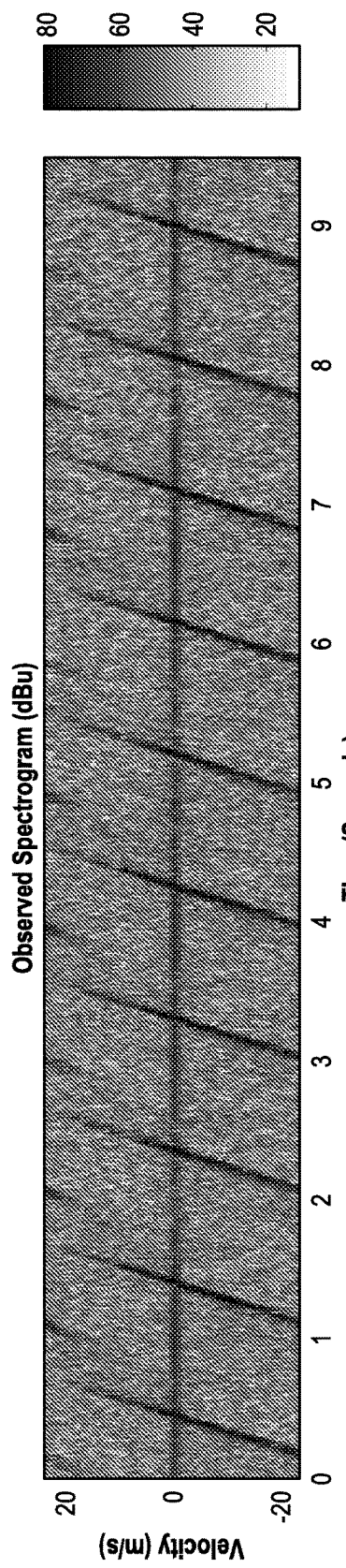
Figure 25B:
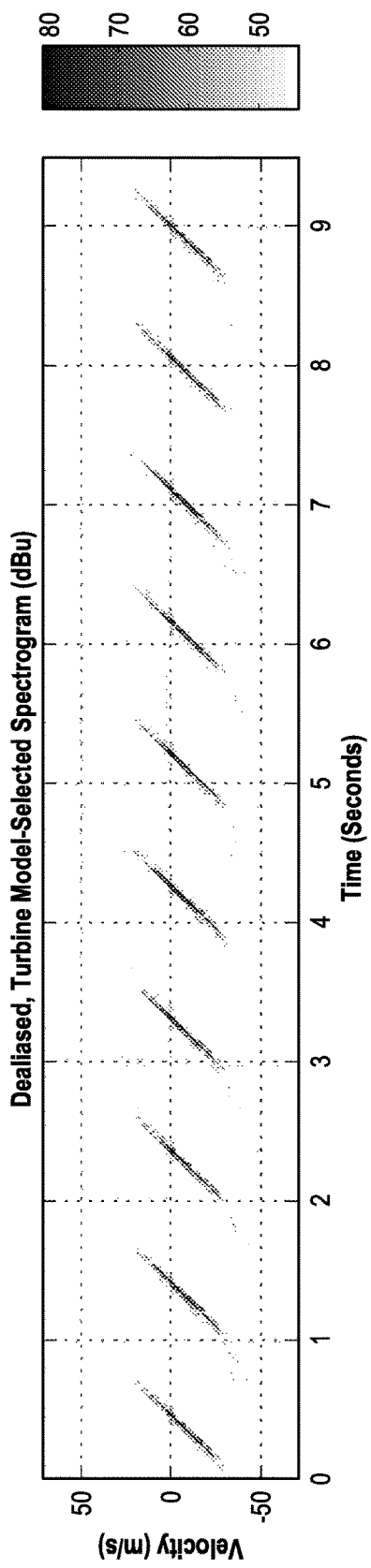

Using the turbine model and the representative wind turbine's state telemetry, the filter procedure is evaluated here for two fixed-pointing cases. The first case, in FIGS. 24A-24D, considers a rotation rate ramp-up event. The original spectra from FIG. 24A are dealiased (in this case, velocity aliasing is not observed) and selected according to the modeled velocity and rotation angles to isolate the wind turbine signature shown in FIG. 24B. The turbine's signature is then aliased back to the radar's available unambiguous velocity to produce FIG. 24C. The areas where power is shown represent the areas to be notch-filtered and replaced by the estimated noise power. After filtering, the resulting spectrogram is shown in FIG. 24D. Here, it is easily seen that almost all of the rotating turbine signature is suppressed to the noise level.

Figure 26A:
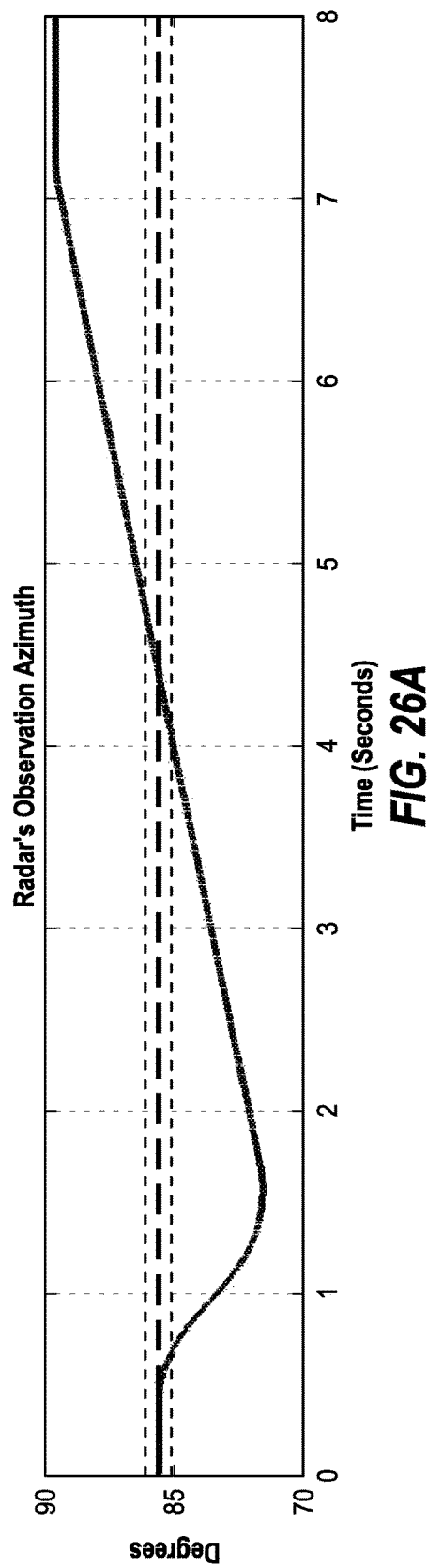
Figure 26B:
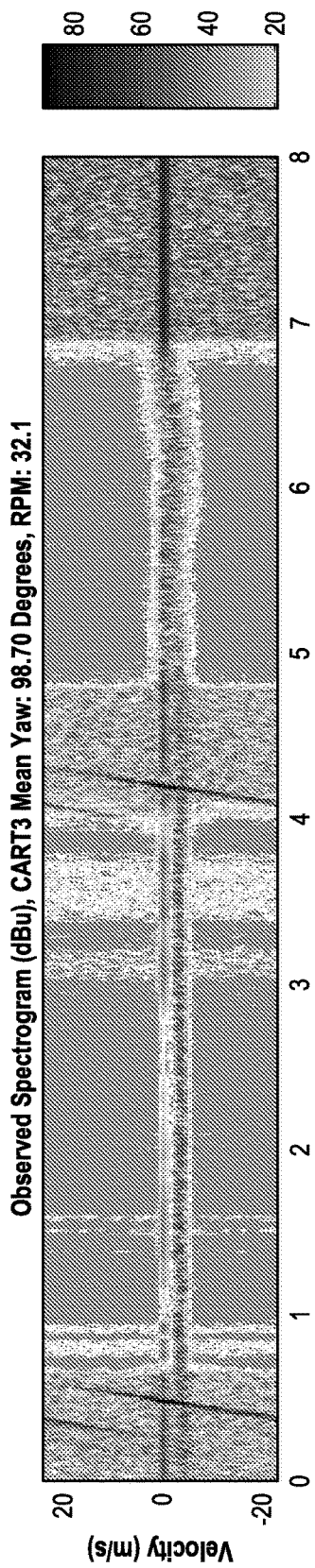
Figure 26C:
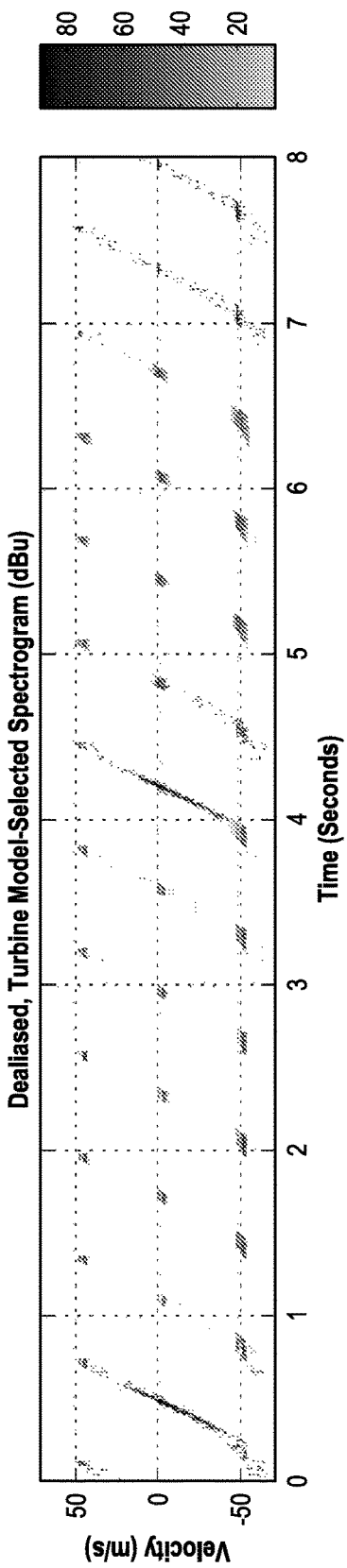
Figure 27A:
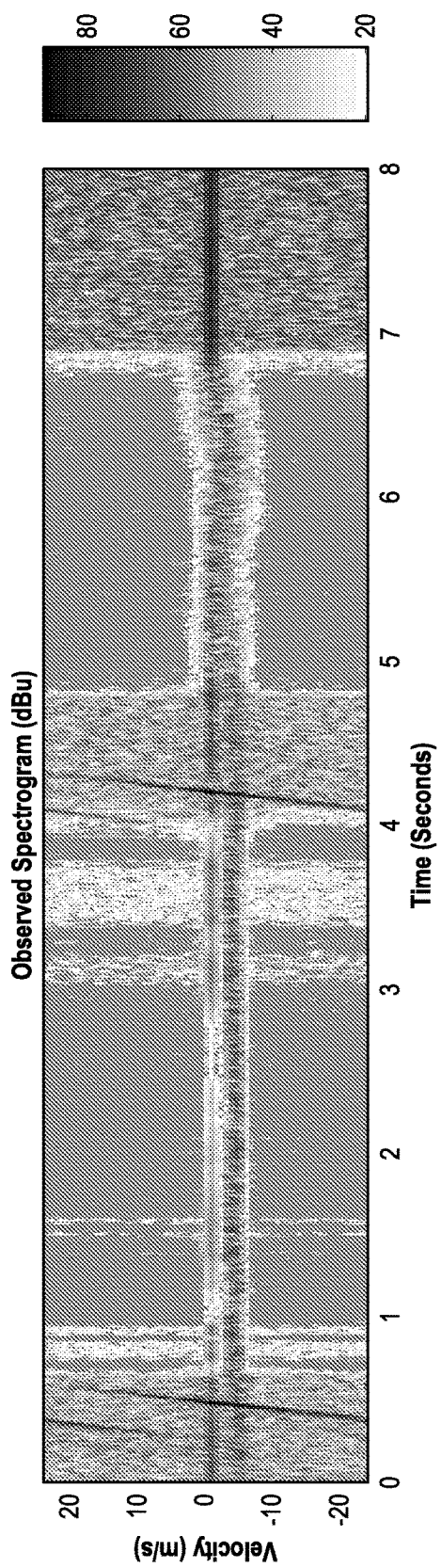
FIGS. 27A-27D provide before and after spectral moment estimates using a representative turbine model and representative turbine telemetry to suppress the rotating representative turbine's radar signature.
Figure 27B:
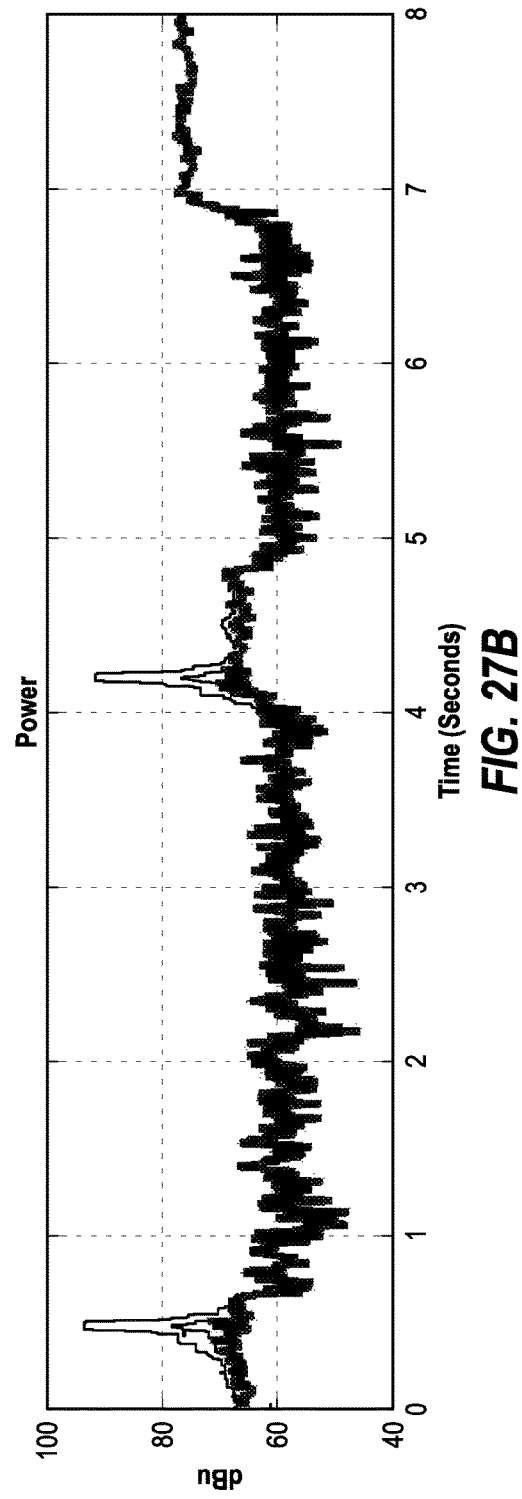
Figure 27C:
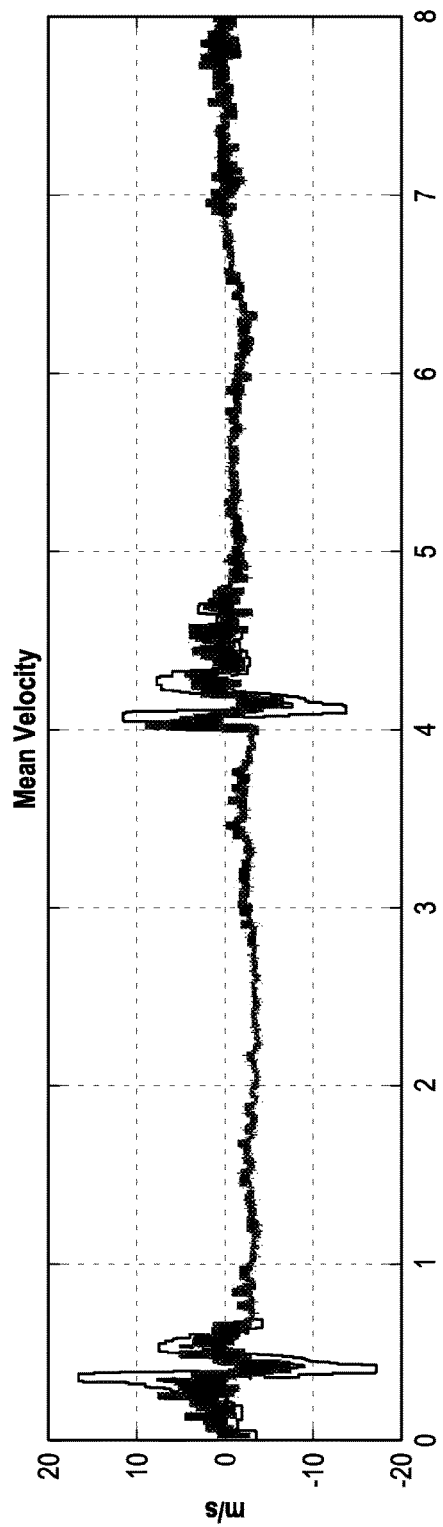
Figure 27D:
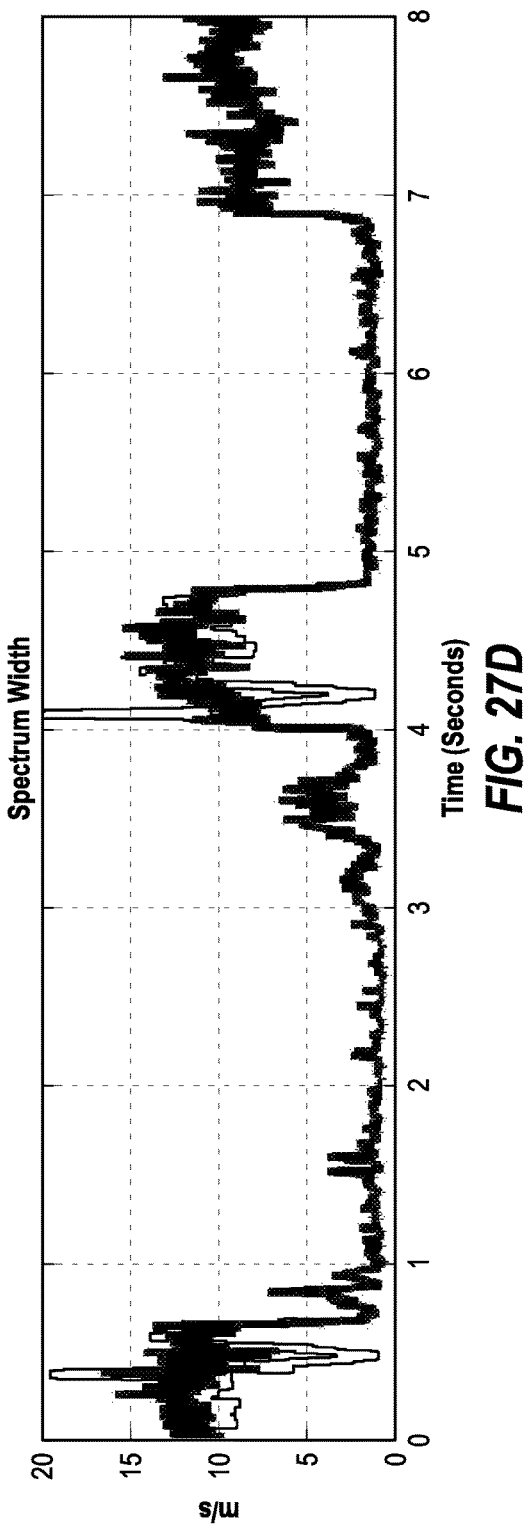

The same filter procedure was performed on another fixed-pointing observation, as shown in FIGS. 25A-25D. This case shows evidence of velocity aliasing but, again, demonstrates excellent suppression of the turbine's rotating signature. This is the same observation that was considered for suppression using a dictionary in FIGS. 20A-20D. Comparing the dictionary and model suppression demonstrates similar results between the two methods (with the exception of the zero-Doppler velocity ground clutter). Slightly better performance is observed when suppressing the turbine using the dictionary, but this is primarily due to a minor overestimate of noise power coupled with the model's conservative identification of the spectral bins to associate with the turbine's signature. FIGS. 26A-26E provide scanning observations of a representative wind turbine coincident with snow. A scanning observation of the representative wind turbine coincident with snow is shown in FIG. 26B. Graph A shows the radar's observation azimuth during the scan. This is the same scanning case presented in FIG. 22 for suppression via a dictionary, but instead, here the turbine signature is filtered using the wind turbine model. FIG. 26C and FIG. 26D highlight the selection of the turbine's signature in the observations. FIG. 26E is the filtered spectrogram with the turbine signature suppressed using the notch-filter for spectral bins selected as the turbine from FIG. 26D.

The turbine model is used instead of a dictionary to select and suppress the turbine's signature, as shown in FIGS. 26A-26E. As with the dictionary suppression, observations at azimuths within ±1 degree of the turbine's direction were filtered (see FIGS. 26A and 26D). The same procedure used in the fixed-pointing cases for selecting the spectral bins to be filtered is used here. Again, the noise power is estimated spectra by spectra using the exponential power distribution model from Equation 22. FIG. 26E shows the residual echo power (in dBu, not dB as with the dictionary case) after notch-filtering via the wind turbine model with the turbine's telemetry. The turbine's signature is not apparent in these observations except as areas that appear to have slightly elevated (or spatially consistent) noise power. Very little of the precipitation's echo power is lost to the filter.

FIGS. 27A-27D show the spectral moment estimates before and after suppressing a representative wind turbine's signature using the turbine model for the scanning case with precipitation considered in FIGS. 26A-26E. By using the model to suppress the wind turbine signature, more than 20 dB of the peak echo power is suppressed, and again, the biases in velocity and spectrum width due to the turbine's signature are significantly reduced. Comparing these results to those from the suppression using the (mismatched) dictionary in FIGS. 23A-23D, both show similar characteristics in the post-suppression moment estimates.

Figure 28:
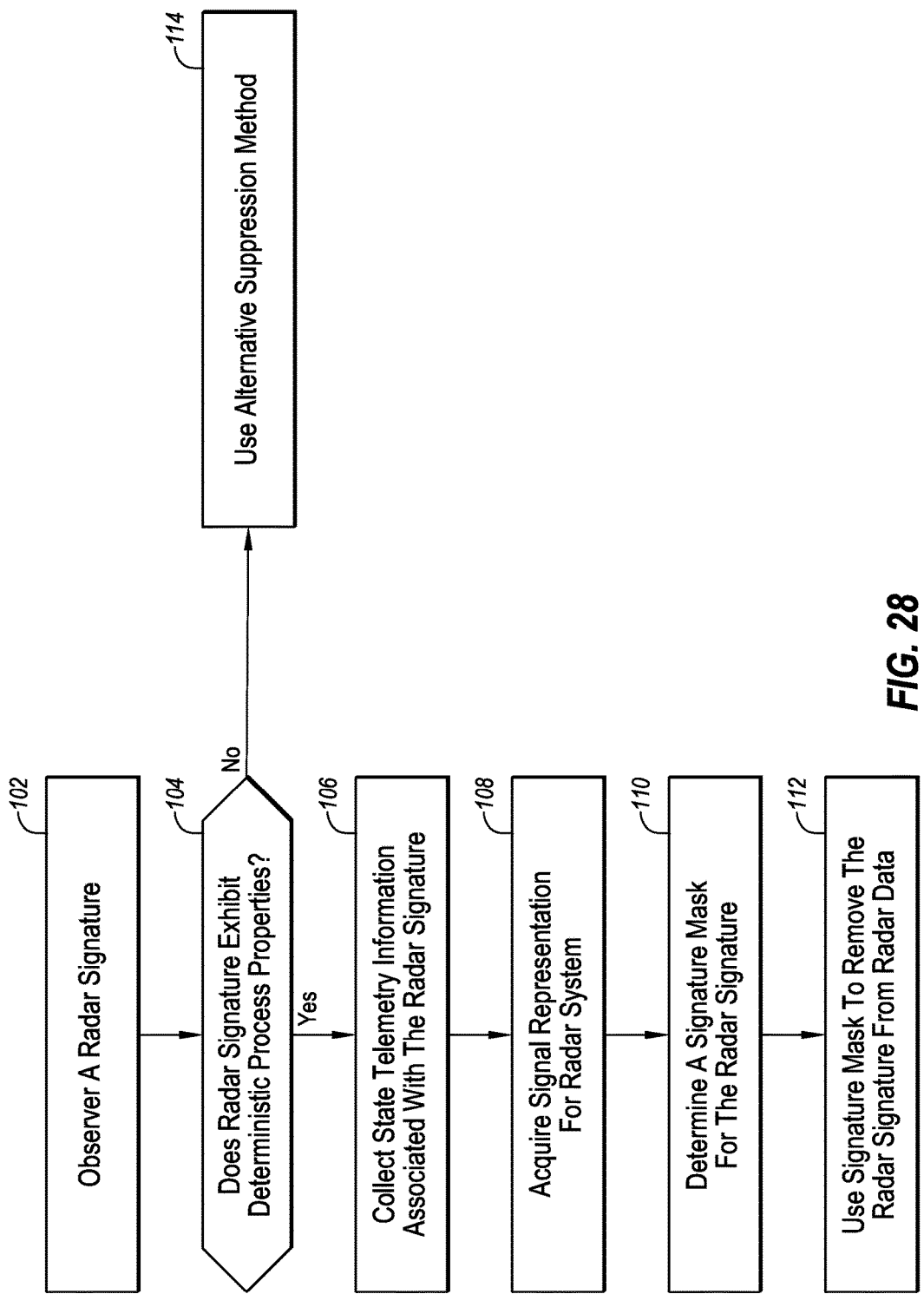
FIG. 28 is a logic diagram of an example of a method of removing a radar signature for a deterministic process in accordance with an embodiment.

FIG. 28 is a logic diagram of an example of a method of removing a radar signature for a deterministic process. The method begins at step 102 with a radar system observing one or more radar signatures and determining in step 104 whether at least one of the signatures exhibits deterministic properties. Signals exhibiting these properties can be viewed as multiple interleaved stationary processes, and can be modeled as a deterministic process or processes. The method continues with the radar system collecting state telemetry at step 106 for each object exhibiting these properties. The state telemetry may be collected directly from the object, such as, for example, when a wind turbine is the object and the wind turbine controller directly or indirectly provides the state telemetry to the radar system, or it may be determined by observation.

The radar system then provides radar I/Q data (sometimes called level 0 data) in step 108 according to an appropriate synchronization clock, and using an appropriate model, synthesizes an object's radar signature mask. Alternatively, the expected radar signature for each state may be provided using a lookup table of multiple dictionaries where each of the dictionaries provides a radar signature for a given state of the object. A characterized radar signature is determined in step 110. The method then continues at step 112 with the radar system using the characterized radar signature to remove (suppress) the radar signature from radar data. The characterized radar signature can be removed by a simple subtraction or by any other appropriate method.

As disclosed above, the dictionaries act as lookup tables for a given state. Although ideally one has a dictionary for each possible state, in reality these can be discretized to a finite number. For example, if an object (in this case a wind turbine) can operate at yaw angled from 0-360 and RPM from 0-40, and is discretized in 1 degree yaw and 1 RPM steps, there would be 360*40=14400 dictionaries. Intermediate states may be estimated using a model and reduced further.

As discussed above the models described above estimate the "tip halo" velocity, yet the blade tip halo is not always the dominant echo produced by the wind turbine. The blade "flash" happens when the blade is perpendicular to radar wave direction of travel, all points on the blade return echoes at the same time creating the maximum power return (compare to a mirror flashing a light). The tip halo and blade flash effect become one feature when you are looking nearly face-on at the radar. Other suitable models for some embodiments may incorporate blade flash in the model, but is not always necessary to consider when it is not a dominant feature in the data. Similarly, models for wind turbines with larger blades may benefit by accounting for a change in apparent radius with the change in rotation angle (due to longer blades flexing more). When estimating spectra, aliasing is a known effect and several methods for anti-aliasing have been used. Any such techniques known in the art may be applied herein as appropriate.

Radar signatures can optionally be interpolated and/or reconstructed using an appropriate process to compensate for circumstances where, for example, a radar signal was erroneously mitigated in spectral regions coincident to an observed time varying signature, such as a wind turbine.

Clock synchronization may be accomplished using a GPS clock or any other method that provides a sufficient level of accuracy. The necessary level of accuracy will depend on the rate that state information is changing, accordingly for a wind turbine rotating at typical operating speeds accuracy from about 1 millisecond or less to a few milliseconds is required for the rotation angle. For some objects, such as a wind turbine, rotation rate and yaw angle may not require the same level of accuracy, potentially only within seconds or even longer time frames. While in most cases it is most convenient to collect state information for all parameters at the same frequency with the same degree of time accuracy, this is not strictly required. The method of FIG. 28 continues at step 112 with the radar system using the characterized radar signature to remove (suppress) the radar signature from radar data.

The method of FIG. 28 may also be used to remove radar signatures from multiple objects exhibiting as deterministic processes. Radar signatures from each of the multiple objects may be processed separately using prior observation or models and combined for removal. Alternatively the objects can be removed based on prior observations of the objects together. While the radar systems characterized above are stationary, mobile radar systems, such as radar on land vehicles, aerial vehicles etc., may also utilize the disclosed teaching. In some embodiments, the disclosed teaching may be implemented in mobile radar systems where the motion's effect on the Doppler frequency is accounted for.

Radar systems may operate using fixed-point and scanning modes in a similar fashion. While in scanning mode additional accommodation may be required based on the narrow window of azimuths available to the antenna. Accordingly, the disclosed method may be determined to be applied only when the object is under observation. Given that the observed object and radar system locations are known, the radar's azimuth and elevation angles with respect to the turbine are known. A region can be defined around a turbine to be mitigated in which to apply this technique. The size and weighting of this window by this region are dictated by radar system parameters and the geometry of the scene. When using dictionaries each dictionary may be designed to include a spatial component (i.e., azimuth and elevation for ground-based radar). The spatial diversity of the dictionaries will include the antenna's and scene's geometry effects.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more of its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices operating in a digital domain or an analog domain, or a combination of both. Such a processing device may be a microprocessor, micro-controller, digital signal processor, microcomputer, analog computer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, processing circuit, and/or processing unit may be, or further include, memory and/or an integrated memory element, which may be a single memory device, a plurality of memory devices, and/or embedded circuitry of another processing module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a radar system, the method comprising:
   determining whether an observed radar signature varies substantially deterministically;
   when the observed radar signature varies substantially deterministically, collecting state telemetry information associated with the observed radar signature and a signal representation for the radar system, wherein the state telemetry information includes rotation angle, yaw angle and rotation rate for an object responsible for the observed radar signature and further wherein the signal representation for the radar system includes data sufficient to determine an I/Q for the radar system;
   based on the state telemetry information and the signal representation, determining a characterized radar signature for the object responsible for the observed radar signature; and
   based on the characterized radar signature, substantially removing the observed radar signature from radar data.

2. The method of claim 1, wherein the collecting state telemetry information associated with the observed radar signature and the signal representation for the radar system includes collecting the state telemetry information and the signal representation that are synchronous.

3. The method of claim 1, wherein the characterized radar signature comprises one or more dictionaries of previously observed spectral observations of the object responsible for the observed radar signature.

4. The method of claim 3, wherein each of the one or more dictionaries is associated with a single telemetry state for the object responsible for the observed radar signature.

5. The method of claim 1, wherein the characterized radar signature comprises a plurality of dictionaries of previously observed spectral observations of the object responsible for the observed radar signature, and wherein each dictionary of the plurality of dictionaries is based on a single telemetry state and further wherein a total number of dictionaries of the plurality of dictionaries is limited to a finite number based on a desired precision for the characterized radar signature.

6. The method of claim 1, further comprising determining a signature mask for the object responsible for the observed radar signature based at least partially on one or more geometric models, wherein the one or more geometric models uses the rotation angle, the yaw angle and the rotation rate for the object responsible for the observed radar signature.

7. The method of claim 6, wherein the signature mask for the object responsible for the observed radar signature is an approximation based on the one or more geometric models.

8. The method of claim 1, wherein the collecting state telemetry information associated with the observed radar signature includes receiving at least a portion of the state telemetry information from the object responsible for the observed radar signature.

9. The method of claim 1, wherein when the observed radar signature varies cyclically with time, the method further comprises determining whether the observed radar signature operates according to a multiple interleaved stationary process.

10. The method of claim 1, wherein the collecting state telemetry information associated with the observed radar signature includes determining at least one of rotation angle, yaw angle and rotation rate based on information received from a sensor.

11. The method of claim 10, wherein the sensor comprises an image sensor.

12. The method of claim 1, wherein the removing the observed radar signature by the radar system includes at least one of setting reflectivity power for the observed radar signature to zero and converting reflectivity power for the observed radar signature to noise.

13. The method of claim 12, wherein the removing the observed radar signature by the radar system is limited to substantially a time period during which the object responsible for the observed radar signature is within a scanning window of the radar system.

14. The method of claim 1, wherein the removing the observed radar signature by the radar system includes using an inverse filter that can be expressed as $$S_f^{(dB)} = 10\log_{10}\left(\frac{S_x}{S_D}\right) = S_x^{(dB)} - S_D^{(dB)},$$

wherein:
$S_f^{(dB)}$ is a filtered spectra in logarithmic units;
$S_x^{(dB)}$ is an observation spectra in logarithmic units; and
$S_D^{(dB)}$ is a dictionary spectra in logarithmic units.

15. The method of claim 1 further comprising:
determining whether an other observed radar signature varies substantially deterministically;
when the other observed radar signature varies substantially deterministically, collecting other state telemetry information associated with the other observed radar signature and an other signal representation for the radar system;
based on the other state telemetry information and the other signal representation, determining an other characterized radar signature for an other object responsible for the other observed radar signature;
combining the other characterized radar signature for the other object and the characterized radar signature for the object; and
based on the combination of the other characterized radar signature for the other object and the characterized radar signature for the object, substantially removing the observed radar signature and the other observed radar signature from the radar data.

16. A radar system comprising:
a transceiver for sending and receiving radar signals;
an interface for interfacing with the transceiver; and
a processing module operably coupled to the interface, wherein the processing module is operable to:
determine whether an observed radar signature varies substantially deterministically;
when the observed radar signature varies substantially deterministically, receive state telemetry information associated with the observed radar signature and a signal representation for the radar system, wherein the state telemetry information includes rotation angle, yaw angle and rotation rate for an object responsible for the observed radar signature and further wherein the signal representation for the radar system includes data sufficient to determine an I/Q for the radar system;
based on the state telemetry information and the signal representation, determine a characterized radar signature for the object responsible for the observed radar signature; and
based on the characterized radar signature, substantially remove the observed radar signature from radar data.

17. The radar system of claim 16, wherein the state telemetry information associated with the observed radar signature and the signal representation for the radar system are substantially synchronous.

18. The radar system of claim 16, wherein the characterized radar signature comprises one or more dictionaries of previously observed spectral observations of the object responsible for the observed radar signature.

19. The radar system of claim 18, wherein each of the one or more dictionaries is associated with a single telemetry state for the object responsible for the observed radar signature.

20. The radar system of claim 16, wherein the characterized radar signature comprises a plurality of dictionaries of previously observed spectral observations of the object responsible for the observed radar signature, and wherein each dictionary of the plurality of dictionaries is based on a single telemetry state and further wherein a total number of dictionaries of the plurality of dictionaries is limited to a finite number based on a desired precision for the characterized radar signature.

21. The radar system of claim 16, wherein the processing module is further operable to determine a signature mask for the object responsible for the observed radar signature based at least partially on one or more geometric models, wherein the one or more geometric models uses the rotation angle, the yaw angle and the rotation rate for the object responsible for the observed radar signature.

22. The radar system of claim 21, wherein the processing module is further operable to approximate an expected radar signature for the object responsible for the observed radar signature using the one or more geometric models.

23. The radar system of claim 16, wherein the state telemetry information associated with the observed radar signature includes information received from the object responsible for the observed radar signature.

24. The radar system of claim 16, wherein the processing module is further operable to when the observed radar signature varies cyclically with time, determine whether the observed radar signature operates according to a multiple interleaved stationary process.

25. The radar system of claim 16, wherein at least one of rotation angle, yaw angle and rotation rate is received from a sensor that is geographically remote from the radar system.

26. The radar system of claim 16, wherein the observed radar signature is removed by the radar system by at least one of setting reflectivity power for the observed radar signature to zero and converting reflectivity power for the observed radar signature to noise.

27. The radar system of claim 16, wherein the radar system is operating in a scanning mode and the observed radar signature is removed by the radar system during a time period during which the object responsible for the observed radar signature is within a scanning window of the radar system.

28. The radar system of claim 16, wherein the observed radar signature is removed by the radar system using an inverse filter that can be expressed as $$S_f^{(dB)} = 10\log_{10}\left(\frac{S_x}{S_D}\right) = S_x^{(dB)} - S_D^{(dB)},$$

wherein:

$S_f^{(dB)}$ is a filtered spectra in logarithmic units;
$S_x^{(dB)}$ is an observation spectra in logarithmic units; and
$S_D^{(dB)}$ is a dictionary spectra in logarithmic units.

29. A method for execution by one or more processing modules of a radar system to create a radar signature mask for a radar signature that varies substantially deterministically, the method comprising:
 collecting state telemetry information associated with an observed radar signature, wherein the state telemetry information includes rotation angle, yaw angle and rotation rate for an object responsible for the observed radar signature;
 acquiring spectral power data for the radar system, wherein the spectral power data for the radar system is synchronized to the state telemetry information; and
 based on the state telemetry information and the spectral power data for the radar system, synthesizing a signature mask for the object responsible for the observed radar signature.

30. The method of claim 29, wherein the state telemetry information further includes elevation of the object responsible for the observed radar signature.

31. The method of claim 29, wherein the spectral power data for the radar system is synchronized to the state telemetry information using time information received from a global navigation satellite system.

32. The method of claim 29, wherein the state telemetry information further includes blade pitch for the object responsible for the observed radar signature.

* * * * *